United States Patent
Sakaguchi et al.

(10) Patent No.: US 12,353,209 B2
(45) Date of Patent: Jul. 8, 2025

(54) AGRICULTURAL SUPPORT SYSTEM, AND DEVICE AND METHOD TO GENERATE TRAVEL ROUTE FOR HAILED AGRICULTURAL MACHINE

(71) Applicant: KUBOTA CORPORATION, Osaka (JP)

(72) Inventors: Kazuo Sakaguchi, Sakai (JP); Kenji Tamatani, Sakai (JP); Yusuke Takahashi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 262 days.

(21) Appl. No.: 18/093,188

(22) Filed: Jan. 4, 2023

(65) Prior Publication Data

US 2024/0219908 A1 Jul. 4, 2024

(51) Int. Cl.
*G05D 1/02* (2020.01)
*G05D 1/00* (2006.01)

(52) U.S. Cl.
CPC ......... *G05D 1/0212* (2013.01); *G05D 1/0011* (2013.01); *G05D 1/0088* (2013.01)

(58) Field of Classification Search
CPC ........ G05D 1/00; G05D 1/0212; G05D 1/001; G05D 1/0088; G05D 2105/15; G05D 1/0011; G05D 1/2246; G05D 1/646; G05D 1/6987; G05D 1/648; G05D 2107/21; G05D 2109/10; A01D 41/1278; A01D 90/16; A01D 41/02; A01D 34/008; A01B 69/00; A01B 69/004; A01B 69/005; A01B 69/008; A01B 39/06; A01B 3/50–62
See application file for complete search history.

(56) References Cited

U.S. PATENT DOCUMENTS

| | | | | |
|---|---|---|---|---|
| 6,336,051 B1* | 1/2002 | Pangels | ................ | A01B 79/005 700/207 |
| 7,742,860 B2* | 6/2010 | Diekhans | ............. | A01B 69/007 701/410 |
| 12,025,986 B2* | 7/2024 | Kurogi | ..................... | G05D 1/65 |
| 2004/0193348 A1* | 9/2004 | Gray | .................... | G05D 1/0219 701/50 |
| 2004/0193349 A1* | 9/2004 | Flann | ................... | A01B 69/008 701/50 |
| 2015/0319913 A1* | 11/2015 | Foster | ................... | A01B 69/00 701/26 |

(Continued)

FOREIGN PATENT DOCUMENTS

| | | | | | |
|---|---|---|---|---|---|
| EP | 3919999 A1 | * | 12/2021 | ............. | A01B 69/00 |
| EP | 4393286 A1 | * | 7/2024 | ........... | A01B 69/008 |

(Continued)

OTHER PUBLICATIONS

JP 2020022429 A machine translation (Year: 2020).*

(Continued)

*Primary Examiner* — Angelina M Shudy
(74) *Attorney, Agent, or Firm* — Keating & Bennett, LLP

(57) ABSTRACT

An agricultural support system includes a terminal to hail a self-driving agricultural machine to a hailing point, and a processor to generate, in an area excluding an already-worked area of the agricultural machine, a travel route for the agricultural machine to head toward the hailing point.

11 Claims, 30 Drawing Sheets

(56) References Cited

U.S. PATENT DOCUMENTS

| | | | | |
|---|---|---|---|---|
| 2016/0174453 | A1* | 6/2016 | Matsuzaki | A01B 69/00 701/2 |
| 2017/0135277 | A1* | 5/2017 | Hiramatsu | G05D 1/0246 |
| 2017/0139418 | A1* | 5/2017 | Hiramatsu | A01B 69/008 |
| 2017/0168501 | A1* | 6/2017 | Ogura | G05D 1/0016 |
| 2017/0322550 | A1* | 11/2017 | Yokoyama | G05D 1/0022 |
| 2018/0053412 | A1* | 2/2018 | Iagnemma | H04M 1/72403 |
| 2019/0227561 | A1* | 7/2019 | Hiramatsu | G05D 1/0278 |
| 2019/0343036 | A1* | 11/2019 | Prankl | G07C 5/008 |
| 2020/0064144 | A1* | 2/2020 | Tomita | B62D 6/00 |
| 2020/0231386 | A1* | 7/2020 | Shiu | B66F 9/063 |
| 2020/0319649 | A1* | 10/2020 | Unesaki | G06Q 50/02 |
| 2021/0365040 | A1* | 11/2021 | Tomono | B25J 11/00 |
| 2022/0151156 | A1* | 5/2022 | Bidram | A01G 25/167 |
| 2022/0159899 | A1* | 5/2022 | Nishii | G07C 5/06 |
| 2022/0167545 | A1 | 6/2022 | Ishikawa et al. | |
| 2022/0201921 | A1* | 6/2022 | Sasamoto | G05D 1/0219 |
| 2022/0232750 | A1 | 7/2022 | Shirafuji et al. | |
| 2022/0397906 | A1* | 12/2022 | Sneyders | A01B 69/008 |
| 2023/0015153 | A1* | 1/2023 | Morimoto | A01B 69/008 |
| 2023/0030848 | A1* | 2/2023 | Buckland | A01B 69/001 |
| 2023/0124026 | A1* | 4/2023 | Hansen | G05D 1/0274 701/25 |
| 2023/0165192 | A1* | 6/2023 | Nishii | G05D 1/0088 |
| 2023/0200299 | A1* | 6/2023 | Suzuki | A01D 41/1278 701/50 |
| 2023/0255130 | A1* | 8/2023 | Suzuki | G05D 1/0044 701/26 |
| 2023/0263093 | A1* | 8/2023 | Suffolk | H02J 7/0044 701/23 |
| 2023/0315109 | A1* | 10/2023 | Suzuki | G05D 1/0219 701/50 |
| 2023/0329138 | A1* | 10/2023 | Ueno | A01B 79/005 |
| 2023/0376039 | A1* | 11/2023 | Nishii | A01B 69/008 |
| 2024/0004390 | A1* | 1/2024 | Iwase | G05D 1/648 |
| 2024/0004396 | A1* | 1/2024 | Akamine | G05D 1/0219 |
| 2024/0045430 | A1* | 2/2024 | Kudo | A01B 69/008 |
| 2024/0049633 | A1* | 2/2024 | Vandike | A01D 41/127 |
| 2024/0077876 | A1* | 3/2024 | Iwase | G05D 1/0219 |
| 2024/0107931 | A1* | 4/2024 | Yamaguchi | A01B 69/00 |
| 2024/0219924 | A1* | 7/2024 | Kim | G05D 1/241 |
| 2024/0219925 | A1* | 7/2024 | Barboi | G05D 1/0016 |
| 2024/0264608 | A1* | 8/2024 | Sasaki | G05D 1/644 |

FOREIGN PATENT DOCUMENTS

| | | | | | |
|---|---|---|---|---|---|
| JP | 09154315 | A | * | 6/1997 | |
| JP | 2014-032489 | A | | 2/2014 | |
| JP | 2017174229 | A | * | 9/2017 | A01B 69/001 |
| JP | 2018050491 | A | | 4/2018 | |
| JP | 2018147421 | A | * | 9/2018 | |
| JP | 2019135963 | A | * | 8/2019 | |
| JP | 2019174890 | A | * | 10/2019 | |
| JP | 2020022429 | A | * | 2/2020 | A01B 69/008 |
| JP | 2020-184974 | A | | 11/2020 | |
| JP | 2021-040497 | A | | 3/2021 | |
| JP | 2022098513 | A | | 7/2022 | |
| JP | 7560412 | B2 | * | 10/2024 | |
| WO | WO-2017159615 | A1 | * | 9/2017 | A01B 69/001 |

OTHER PUBLICATIONS

WO-2017159615-A1 machine translation (Year: 2017).*
JP-2019135963-A machine translation (Year: 2021).*
JP-2017174229-A machine translation (Year: 2017).*
JP-09154315-A machine translation (Year: 1997).*
JP-2019174890-A machine translation (Year: 2019).*
JP-2018147421-A machine translation (Year: 2018).*
JP-7560412-B2 machine translation (Year: 2024).*

* cited by examiner

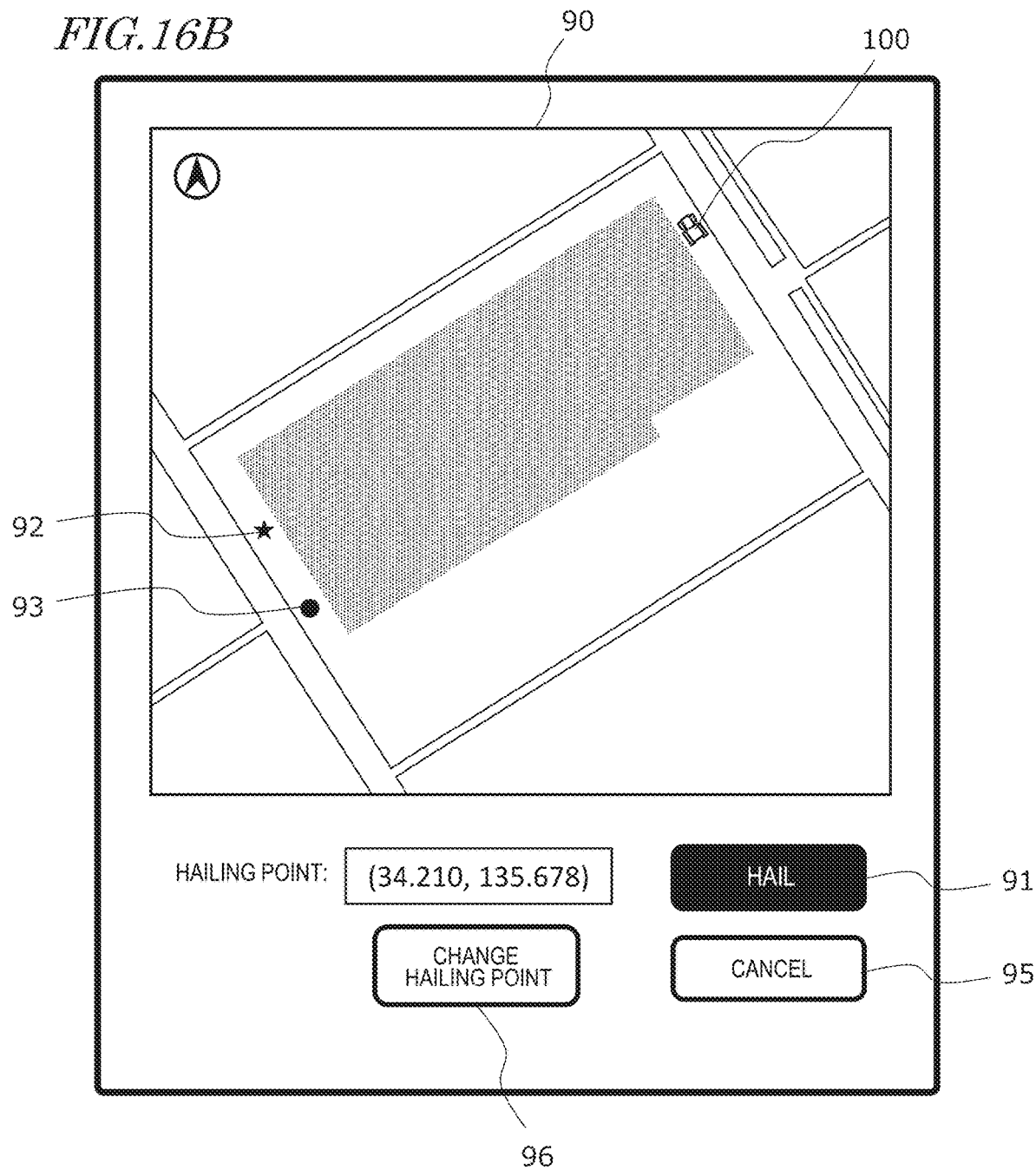

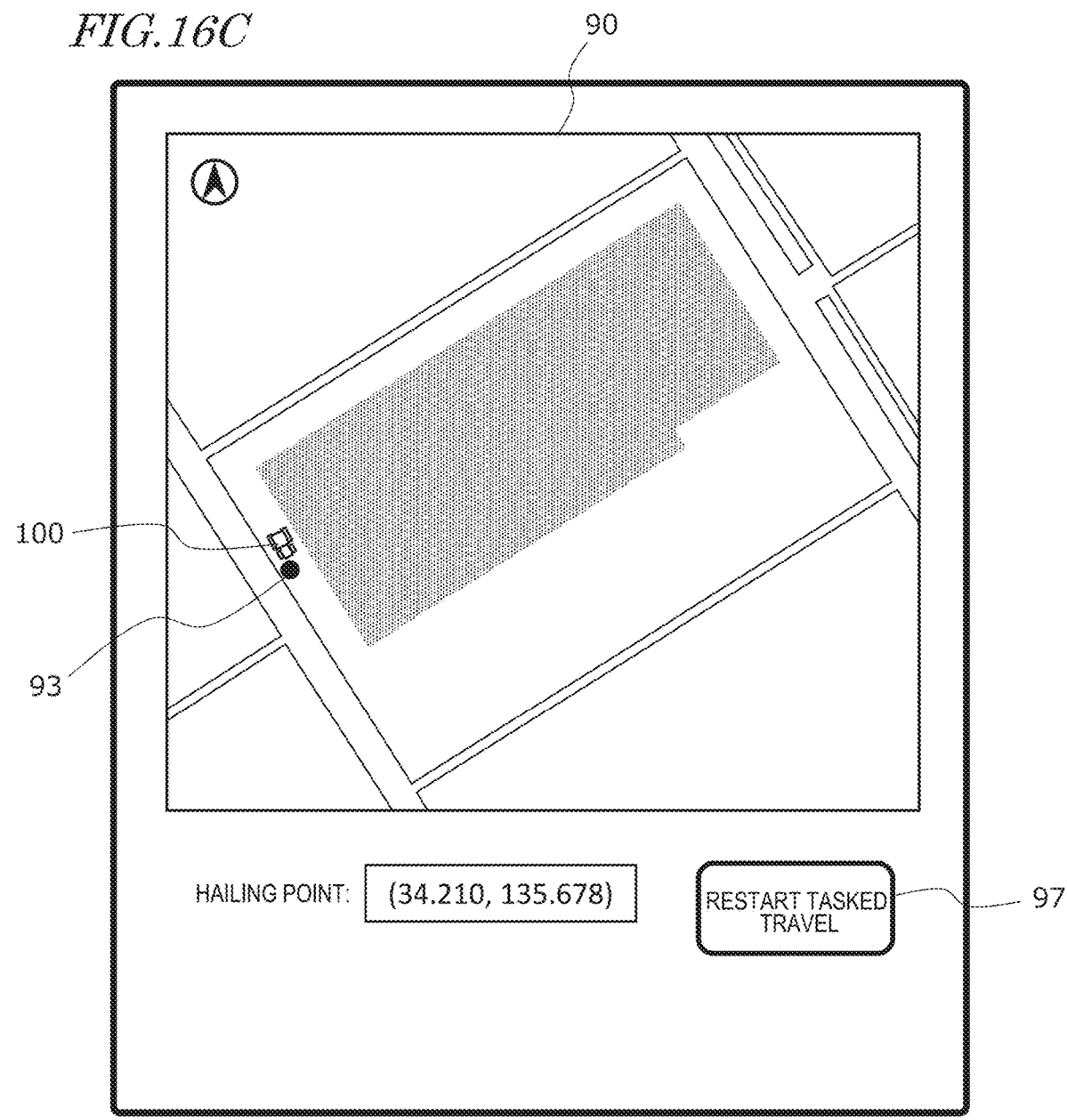

AGRICULTURAL SUPPORT SYSTEM, AND DEVICE AND METHOD TO GENERATE TRAVEL ROUTE FOR HAILED AGRICULTURAL MACHINE

BACKGROUND OF THE INVENTION

1. Field of the Invention

The present disclosure relates to an agricultural support system, and a device and a method for a travel route for an agricultural machine that has been hailed.

2. Description of the Related Art

Research and development have been directed to the automation of agricultural machines to be used in fields. For example, work vehicles, such as tractors, combines, and rice transplanters, which automatically travel within fields by utilizing a positioning system, e.g., a GNSS (Global Navigation Satellite System), are coming into practical use.

Japanese Laid-Open Patent Publication No. 2020-22429 discloses a self-traveling control system for a harvester that harvests crops while automatically traveling in a field, and stores the collected harvest in a storage. In this self-traveling control system, the harvester harvests the crops in the field while automatically traveling along a previously-set travel path. The harvester measures the stored amount of harvest in the storage, and once the stored amount becomes equal to or greater than a predetermined amount, stops the harvesting work, and performs an operation for discharging the harvest. When discharging the harvest, the harvester leaves the travel path, calculates a discharging path for arriving at a discharge position to perform discharging work, and performs self-traveling along the discharging path. The discharging path is generated based on the previously-set discharge position, the position of the machine when its self-traveling was stopped in order to discharge the harvest, and the harvesting status of the field. Specifically, as the discharging path, a path for arriving at the discharge position without going through any unworked ground (where the harvesting work is not completed) is generated. Japanese Laid-Open Patent Publication No. 2020-22429 states that similar techniques can also be used for refilling a fuel, in addition to discharging the harvest.

Japanese Laid-Open Patent Publication No. 2021-40497 discloses an agricultural machine that performs refilling of materials such as fertilizers, agrochemicals, seedlings, and seeds at a refill position, this refill position being set on a turning route that is included in an intended travel route. With this agricultural machine, as the driver manipulates switches during self-traveling, it is possible to change the refill position from a position on one turning route to a position on another turning route within the intended travel route.

SUMMARY OF THE INVENTION

Preferred embodiments of the present invention provide novel techniques for enabling agricultural machines to be hailed to a desired point along an appropriate path.

An agricultural support system according to a preferred embodiment of the present disclosure includes a terminal to hail a self-driving agricultural machine to a hailing point, and a processor to generate, in an area excluding an already-worked area of the agricultural machine, a travel route for the agricultural machine to head toward the hailing point.

A processing system according to another preferred embodiment of the present disclosure includes one or more processors, and a memory storing a computer program. The computer program causes the one or more processors to perform, from a terminal device that hails a self-driving agricultural machine to a hailing point, receiving a hailing signal including positional information of the hailing point, or accepting from a user a manipulation of hailing the agricultural machine to the hailing point; and, based on the hailing signal or the manipulation by the user, generating a travel route to be taken by the agricultural machine in order to head toward the hailing point in an area excluding an already-worked area of the agricultural machine.

General or specific aspects of various preferred embodiments of the present disclosure may be implemented using a device, a system, a method, an integrated circuit, a computer program, a non-transitory computer-readable storage medium, or any combination thereof. The non-transitory computer-readable storage medium may be inclusive of a volatile storage medium, or a non-volatile storage medium. The device may include a plurality of devices. In the case where the device includes two or more devices, the two or more devices may be disposed within a single apparatus, or divided over two or more separate apparatuses.

According to preferred embodiments of the present disclosure, it is possible to hail an agricultural machine to a desired point along an appropriate path.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 16B is a diagram showing an example of a GUI that allows the hailing point to be changed after a hailing operation is performed.

FIG. 16C is a diagram showing an example of a GUI for causing the work vehicle to restart tasked travel.

DETAILED DESCRIPTION OF THE PREFERRED EMBODIMENTS

Figure 1:
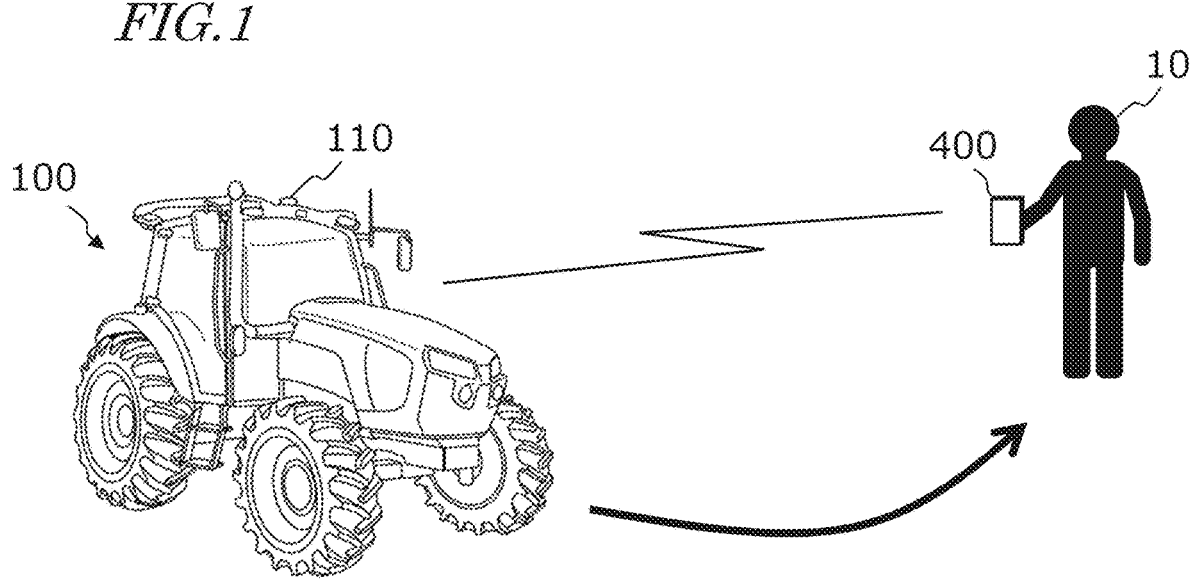
FIG. 1 is a diagram for describing an overview of an agricultural support system according to an illustrative embodiment of the present invention.

Hereinafter, preferred embodiments of the present disclosure will be described more specifically. Note however that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, component elements having identical or similar functions are denoted by identical reference numerals.

The following preferred embodiments are only exemplary, and the techniques according to the present disclosure are not limited to the following preferred embodiments. For example, numerical values, shapes, materials, steps, and orders of steps, layout of a display screen, etc., that are indicated in the following preferred embodiments are only exemplary, and admit of various modifications so long as it makes technological sense. Any one implementation may be combined with another so long as it makes technological sense to do so.

Overview of Preferred Embodiments

First, an overview of preferred embodiments of the present disclosure will be described.

An agricultural support system according to a preferred embodiment of the present disclosure includes a terminal to hail a self-driving agricultural machine to a hailing point, and a processor to generate, in an area excluding an already-worked area of the agricultural machine, a travel route for the agricultural machine to head toward the hailing point.

In the present disclosure, an "agricultural machine" means a machine for agricultural applications. Examples of agricultural machines include tractors, harvesters, rice transplanters, vehicles for crop management, vegetable transplanters, mowers, seeders, spreaders, and mobile robots for agriculture. Not only may a work vehicle (such as a tractor) function as an "agricultural machine" alone by itself, but also an implement that is attached to or towed by a work vehicle may together in combination with the work vehicle function as an "agricultural machine". For the ground surface within a field, an agricultural machine performs agricultural work such as tilling, seeding, preventive pest control, manure spreading, planting of crops, or harvesting. Such agricultural work or tasks may be referred to as "groundwork", or simply as "work" or "tasks". The travel of a vehicle-type agricultural machine performed while the agricultural machine also performs agricultural work may be referred to as "tasked travel".

As used herein, "self-driving" means controlling the movement of an agricultural machine by the action of a controller, rather than through manual operations of a driver. An agricultural machine that performs self-driving may be referred to as a "self-driving agricultural machine" or a "robotic agricultural machine". During self-driving, not only the movement of the agricultural machine, but also the operation of agricultural work may also be controlled automatically. In the case where the agricultural machine is a vehicle-type machine, traveling of the agricultural machine via self-driving will be referred to as "self-traveling". The controller may control at least one of: steering that is required in the movement of the agricultural machine; adjustment of the moving speed; and beginning and ending a move. In the case of controlling a work vehicle having an implement attached thereto, the controller may control raising or lowering of the implement, beginning and ending of an operation of the implement, and so on. A move based on self-driving may include not only moving of an agricultural machine that goes along a predetermined path toward a destination, but also moving of an agricultural machine that follows a target of tracking. An agricultural machine that performs self-driving may also have the function of moving partly based on the user's instructions. Moreover, a self-driving agricultural machine may operate not only in a self-driving mode but also in a manual driving mode, where the agricultural machine moves through manual operations of the driver. When performed not manually but through the action of a controller, the steering of an agricultural machine will be referred to as "automatic steering". A portion or an entirety of the controller may reside outside the agricultural machine. Control signals, commands, data, etc., may be communicated between the agricultural machine and a controller residing outside the agricultural machine. An agricultural machine that performs self-driving may move autonomously while sensing the surrounding environment, without any person being involved in the controlling of the movement of the agricultural machine. An agricultural machine that is capable of autonomous movement is able to travel within the field or outside the fields (e.g., on roads) in an unmanned manner. During an autonomous move, operations of detecting and avoiding obstacles may be performed.

A "terminal" or "terminal device" is a device for hailing an agricultural machine to a desired position, and may be referred to as a "hailing device" or a "hailing terminal". A terminal device may be a mobile device such as a smartphone, a tablet computer, a laptop computer, or a remote control, or a stationary computer such as a desktop personal computer (PC). A terminal device may be used in a field in which an agricultural machine performs agricultural work, or at a remote place from a field in which an agricultural machine performs agricultural work.

When a terminal device is used in a field where an agricultural machine performs agricultural work, the terminal device may be used, e.g., while the agricultural machine is performing agricultural work, in order to hail the agricultural machine to the position of the terminal device or surrounding area. In this case, the terminal device may include a positioning device such as a GNSS receiver. The terminal device may be configured to, in response to a manipulation of a user who presses a specific button on a terminal device, transmit a hailing signal including positional information of the terminal device to the agricultural machine. By manipulating the terminal device, the user is able to hail the agricultural machine to a "hailing point". The hailing point may be set at a point within a radius of several meters around the position where the user has manipulated the terminal device (referred to as the "manipulation point"), for example. For instance, the same position as the manipulation point, or a position that is several meters away from the manipulation point, may be set as the hailing point. The terminal device allows a point that coincides with the manipulation point to be input as the hailing point, or allows a predetermined position that is several meters away from the manipulation point as the hailing point. This allows a hailing point to be set at the position of the terminal device or in its neighborhood.

Instead of its own positional information, the terminal device may be configured to transmit a hailing signal including information of a position that is designated by the user to the agricultural machine. For example, the user may activate application software that is installed on the terminal device, cause a map of the field to be indicated on a display of the terminal device, and perform a manipulation of designating a desired point on the map to hail the agricultural machine to that point. In response to this manipulation, by regarding the point that is designated by the user as a hailing point, the terminal device can transmit a hailing signal including positional information of to the agricultural machine. In response to this hailing signal, the agricultural machine moves toward the hailing point indicated by the positional information. In this case, the terminal device and the user do not need to be present at a remote position from the agricultural machine. A user riding on the agricultural machine may manipulate the terminal device to designate a desired point, and move the agricultural machine to that point. The terminal device may be mounted in the agricultural machine.

In the case where the terminal device is used at a remote place from a field in which the agricultural machine performs agricultural work, the terminal device may be a computer for monitoring purposes that is at the home or the office of a user who monitors the agricultural machine, for example. The computer for monitoring purposes may be a stationary-type computer, or a mobile computer such as a smartphone, a tablet computer, or a laptop computer. In this case, too, the user may activate application software that is installed on the terminal device, cause a map of the field to be indicated on the display, and perform a manipulation of designating a desired point on the map to hail the agricultural machine to that point. Consequently, the agricultural machine can be hailed to a desired point through a remote manipulation using the terminal device.

A "processor" or "processing unit" is a device to generate a path along which the agricultural machine moves. In the following description, the processing unit may be referred to as a "path generating device". The processing unit may be a computer that includes one or more processors and one or more memories, for example. In that case, the processor can generate a path by executing a computer program that is stored in the memory (s). The processing unit may be mounted in the agricultural machine, or set in a remote place from the agricultural machine. One of the electronic control units (ECU) mounted in the agricultural machine may function as the processing unit. Alternatively, an external computer, e.g., a server, that communicates with the agricultural machine via a network may function as the processing unit. Furthermore, the terminal device may function as the processing unit. In other words, a processor in the terminal device may generate a travel route to the hailing point, and transmit a hailing signal including information of the travel route to the agricultural machine. In that case, the terminal device can be said to internalize or be provided in the aforementioned processing unit. Thus, the terminal device and the processing unit do not need to be separate and distinct devices. Instead, a single device may function as both the terminal device and the processing unit.

An "already-worked area" means an area of a field in which agricultural work by an agricultural machine has been performed. For example, in the case where the agricultural machine is an assembly of a tractor and an implement that is linked to the tractor, an area where agricultural work has been performed by the implement qualifies as an already-worked area. The already-worked area may be continuously recorded to a storage device while the agricultural machine is performing agricultural work. The storage device to store the already-worked area may be provided in the agricultural machine, or an on-line storage or any other device that is connected to the agricultural machine via a network. In the case where a plurality of agricultural machines perform agricultural work in a field, the area where the agricultural work was performed by any of the agricultural machines may be recorded as an already-worked area. The already-worked area may be determined based on positional information of the agricultural machine and a previously-set working breadth of the agricultural machine, for example. The positional information of the agricultural machine may be generated by a positioning device (including a GNSS receiver, etc.) included in the agricultural machine, for example. The positional information of the agricultural machine may be generated by an external computer, e.g., a server, that communicates with the agricultural machine. In that case, the external computer consecutively receives output data from a GNSS receiver, an inertial measurement unit (IMU), and like devices provided in the agricultural machine, calculates the position of the agricultural machine based on such data, and transmits positional information thereof to the agricultural machine. The operation of determining an already-worked area and storing to the storage device may be performed by the aforementioned processing unit (i.e., path generating device), or another device. For example, an ECU mounted in the agricultural machine or a server or other computer that communicates with the agricultural machine may record the already-worked area.

According to the above preferred embodiment, a user of the agricultural machine, e.g., a supervisor, may manipulate the terminal device in order to hail the agricultural machine to a hailing point. The user may hail the agricultural machine to a desired point in order to: refill agricultural materials (e.g., seeds, agrochemicals, fertilizers, or seedlings) that are necessary for the agricultural machine to perform agricultural work in the field; ride on the agricultural machine; or check the state of the agricultural machine, for example. As a result, the user can perform refilling or other tasks without having to move to the position of the agricultural machine. Moreover, the hailing point can be changed as the user moves or manipulates the terminal device. Therefore, a greatly improved convenience can be provided over a system (e.g., Japanese Laid-Open Patent Publication No. 2020-22429) where the position to which the agricultural machine is supposed to move (a discharge position or a refill position) is fixed, or a system (e.g., Japanese Laid-Open Patent Publication No. 2021-40497) where a refill position of materials is determined at the time of generating a path for the agricultural machine.

Furthermore, according to the above preferred embodiment, a travel route as a path along which the agricultural machine moves in order to head toward the hailing point is generated in an area excluding an already-worked area of the agricultural machine. As a result, the agricultural machine can be hailed to a desired hailing point in such a manner that the agricultural machine will not step on any ground surface of the already-worked area where agricultural work such as tilling, seeding, or planting has been performed. This makes it less likely for loss of the effects of the work or damaging of the crops to occur.

The agricultural support system may further include a controller to control the operation of the agricultural machine so that the agricultural machine moves along a travel route. By transmitting a control signal to a drive device (e.g., a prime mover, a transmission, or a steering device) included in the agricultural machine, the controller causes the agricultural machine to move along the travel route. The controller may be an ECU or any other device that is included in the agricultural machine, or an external computer (e.g., a server) that communicates with the agricultural machine. The controller may cover the aforementioned functionality of the processing unit, i.e., the function of generating a travel route.

When the agricultural machine receives a hailing call, the controller may cause the agricultural machine to move along the travel route while controlling the agricultural machine to at least partly stop agricultural work. For example, the controller may cause the agricultural machine to move along the travel route while controlling the agricultural machine to completely stop agricultural work. Alternatively, the controller may cause the agricultural machine to move along the travel route while controlling the agricultural machine to perform agricultural work in a partial section in which it moves.

The agricultural support system may further include a storage device to store as the already-worked area an area in which agricultural work has been performed by the agricultural machine. The terminal device may be configured to transmit a hailing signal including positional information of the hailing point to the processing unit. The processing unit is able to generate a travel route based on the positional information and the already-worked area stored in the storage device.

While the agricultural machine is moving along a previously-set target path, the processing unit may determine the already-worked area and cause the already-worked area to be stored to the storage device based on a position of the agricultural machine as identified by a positioning device and a working breadth of the agricultural machine. The process of causing the already-worked area to be stored to the storage device may be performed not only by the processing unit, but by another device.

When a hailing call is received from the terminal device while the agricultural machine is moving along a previously-set target path, the processing unit may determine as the travel route a path including a portion of the target path that is located in the traveling direction of the agricultural machine. The reason is that, since no work has been performed for the portion of the target path that is located in the traveling direction of the agricultural machine, no problem will be caused by the agricultural machine stepping on the ground surface.

The processing unit can generate a travel route from standpoints (1) and (2) as follows, for example.
  (1) When the already-worked area does not exist between a position of the agricultural machine when receiving a hailing call from the terminal device and the hailing point, determine as the travel route a linear path that leads toward the hailing point.
  (2) When the already-worked area exists between the position of the agricultural machine and the hailing point, determine as the travel route a path that leads toward the hailing point along an outer periphery of the already-worked area.

Herein, whether or not the already-worked area exists between the position of the agricultural machine and the hailing point may be determined based on whether a straight line that connects between the position of the agricultural machine and the hailing point overlaps the already-worked area or not. What is meant by "the position of the agricultural machine" is a reference position that is set on the agricultural machine. For example, in the case where the agricultural machine includes a GNSS receiver and the position (i.e., mounted position) of the GNSS receiver is defined as a reference position, the mounted position of the GNSS receiver corresponds to the position of the agricultural machine. Alternatively, in the case where a position that is several meters (m) or so away from the mounted position of the GNSS receiver is determined as a reference position in the agricultural machine, the position that is several meters or so away from the mounted position corresponds to the position of the agricultural machine. A "linear path" means a path which is mostly a straight line, and may partly include a curved or bent-line portion. For example, a path that goes forward by a minute predetermined distance (e.g., about 1 m) from the position at the time of receiving a hailing call, and turns around and then linearly goes toward the hailing point also qualifies as a "linear path".

The agricultural machine may be controlled to travel along a target path that includes a plurality of parallel main paths and one or more turning paths interconnecting the plurality of main paths, for example. In that case, if a hailing call is received from the terminal device while the agricultural machine is moving along one of the plurality of main paths and if the already-worked area exists between the position of the agricultural machine when receiving the hailing call and the hailing point, the processing unit may determine as the travel route a shorter one of: a path that, after going straight along the main path from the position of the agricultural machine, leads toward the hailing point along the outer periphery of the already-worked area; and a path that turns from the position of the agricultural machine when hailed toward an opposite side of the already-worked area, goes straight in an opposite direction, and thereafter leads toward the hailing point along the outer periphery of the already-worked area. Through such an operation, a travel route for arriving at the hailing point in a short time can be determined based on the positional relationship between the agricultural machine, the hailing point, and the already-worked area.

Thus, when receiving a hailing call, the processing unit may generate two or more paths that lead toward the hailing point without going through the already-worked area, and determine a shortest path among such paths as the travel route.

As mentioned above, the terminal device may be a mobile terminal including a GNSS receiver. In that case, the mobile terminal may transmit to the processing unit a hailing signal including positional information of the mobile terminal which is generated based on a signal that is output from the GNSS receiver. A point indicated by the positional information (i.e., a point indicated by the positional information at the time of manipulating the mobile terminal), or a position that is several meters away from the point indicated by the positional information can be determined as the hailing point.

The terminal device may be a monitoring computer for remote-monitoring the agricultural machine. In response to a manipulation by a user, the monitoring computer may transmit to the processing unit a hailing signal including positional information of the hailing point.

A processing system according to another preferred embodiment of the present disclosure includes one or more processors, and a memory to store a computer program. The computer program causes the one or more processors to perform: from a terminal device that hails a self-driving agricultural machine to a hailing point, receiving a hailing signal including positional information of the hailing point, or accepting from a user a manipulation of hailing the agricultural machine to the hailing point; and, based on the hailing signal or the manipulation by the user, generating a travel route to be taken by the agricultural machine in order to head toward the hailing point in an area excluding an already-worked area of the agricultural machine.

A method to be executed by a computer according to another preferred embodiment of the present disclosure includes: (a) from a terminal device that hails a self-driving agricultural machine to a hailing point, receiving a hailing signal including positional information of the hailing point, or accepting from a user a manipulation of hailing the agricultural machine to the hailing point; and (b) based on the hailing signal or the manipulation by the user, generating a travel route to be taken by the agricultural machine in order to head toward the hailing point in an area excluding an already-worked area of the agricultural machine.

A non-transitory computer-readable medium according to a further preferred embodiment of the present disclosure includes a computer program that: (a) causes a computer to perform: from a terminal device that hails a self-driving agricultural machine to a hailing point, receiving a hailing signal including positional information of the hailing point, or accepting from a user a manipulation of hailing the agricultural machine to the hailing point; and (b) based on the hailing signal or the manipulation by the user, generating a travel route to be taken by the agricultural machine in order to head toward the hailing point in an area excluding an already-worked area of the agricultural machine.

Hereinafter, preferred embodiments will be described where the techniques according to the present disclosure are applied to a work vehicle (e.g., a tractor) as an example of an agricultural machine. The techniques according to the present disclosure are applicable not only to work vehicles such as tractors, but also to any agricultural machine that performs self-driving. The agricultural machine may be any non-tractor work vehicle, e.g., a harvester, a rice transplanter, a vehicle for crop management, a vegetable transplanter, a mower, a seeder, a spreader, or a mobile robot for agriculture, for example.

Preferred Embodiment 1

FIG. 1 is a diagram for describing an overview of an agricultural support system according to an illustrative embodiment of the present disclosure. FIG. 1 illustrates a work vehicle 100 and a hailing terminal 400 to hail the work vehicle 100 to a hailing point. The work vehicle 100 is an example of the aforementioned agricultural machine, and the hailing terminal 400 is an example of the aforementioned terminal device. In the present preferred embodiment, the work vehicle 100 is a tractor. The tractor can have an implement attached to its rear and/or its front. While performing agricultural work according to the particular type of implement, the tractor is able to automatically travel within a field. The agricultural work to be performed in the present preferred embodiment may be any task where the ground surface being stepped on by the work vehicle 100 after work may detract from the effect of the work, e.g., tilling, seeding, planting of crops. In the following description, a situation where the work vehicle 100 is controlling the implement to perform a task or work may be expressed as the "work vehicle 100 performing a task or work". The techniques according to the present preferred embodiment and any subsequent preferred embodiment are similarly applicable to agricultural machines other than tractors.

The work vehicle 100 has a self-driving function. In other words, the work vehicle 100 travels by the action of a controller, rather than manually. The controller according to the present preferred embodiment is provided inside the work vehicle 100, and is able to control both the speed and steering of the work vehicle 100.

The work vehicle 100 includes a positioning device 110, including a GNSS receiver. Based on the position of the work vehicle 100 as identified by the positioning device 110 and a target path previously stored in a storage device, the controller causes the work vehicle 100 to automatically travel. In addition to controlling the travel of the work vehicle 100, the controller also controls the operation of the implement. As a result, while automatically traveling, the work vehicle 100 is able to perform a task or work by using the implement.

The hailing terminal 400 may be a mobile apparatus such as a smartphone, a tablet computer, or a remote control. The hailing terminal 400 may be used by a user 10 who is at a remote position from the work vehicle 100 within a field. The user 10 may be a supervisor of the work vehicle 100, or a worker to perform tasks such as refilling of agricultural materials (e.g., fertilizers, agrochemicals, or seedlings) or refilling of the fuel, for example. The hailing terminal 400 includes a GNSS receiver. In response to a manipulation by the user 10, the hailing terminal 400 transmits a hailing signal including positional information of the hailing terminal 400 to the work vehicle 100. Upon receiving the hailing signal, the work vehicle 100 automatically moves to the hailing point indicated by the positional information of the hailing terminal 400.

The work vehicle 100 according to the present preferred embodiment includes a processing unit (also referred to as a "processor" or "path generating device") to generate a path along which the work vehicle 100 moves. The path generating device generates a path along which the work vehicle 100 travels when performing tasks within the field (hereinafter referred to as a "target path"). Furthermore, the path generating device also generates a travel route along which the work vehicle 100 heads toward the hailing point when hailed by the hailing terminal 400. The path generating device generates the travel route in an area excluding an already-worked area of the work vehicle 100. The already-worked area is an area in which agricultural work has been performed by the work vehicle 100. While the work vehicle 100 is performing tasked travel, an already-worked area is continuously recorded to a storage device by the path generating device or another processing unit. The already-worked area may be determined based on the position of the work vehicle 100 as identified by the positioning device 110 and the working breadth of the previously-set work vehicle 100, for example. The working breadth is the width of an area where work is to be performed by an implement linked to the work vehicle 100. Based on the positional information included in a hailing signal that has been transmitted from the hailing terminal 400 and the already-worked area that is stored in the storage device, the path generating device generates a travel route. The controller controls a drive device (e.g., a steering device, a transmission, and a power unit) of the work vehicle 100 along the generated travel route. As a result, the work vehicle 100 can move to the hailing point without going through the already-worked area.

Thus, upon receiving a hailing call from the hailing terminal 400, the work vehicle 100 according to the present preferred embodiment automatically moves to the hailing point for the hailing terminal 400. At this time, the work vehicle 100 heads toward the hailing point along a travel route that does not go through the already-worked area. This avoids loss of the effects of the work as may be caused by the work vehicle 100 stepping on the already-worked area.

Hereinafter, more specific examples of the configuration and operation of a system according to the present preferred embodiment will be described.

Figure 2:
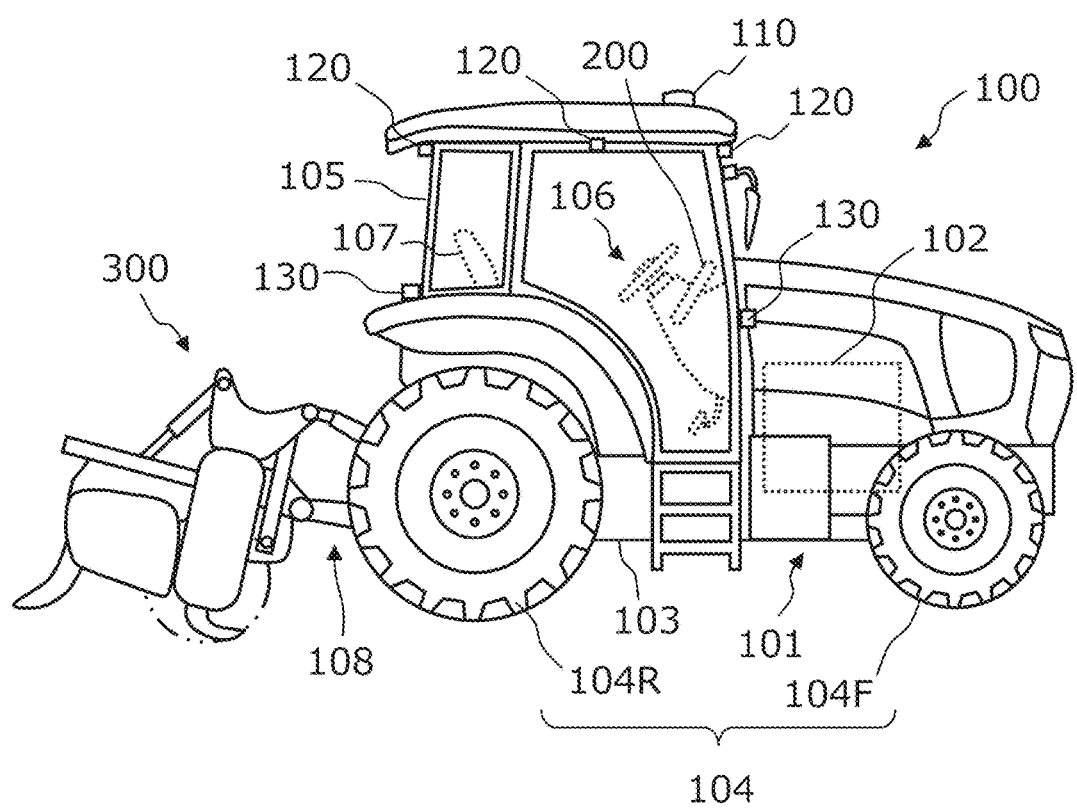
FIG. 2 is a side view schematically showing a work vehicle and an example of an implement.

FIG. 2 is a side view schematically showing the work vehicle 100 and an example implement 300 that is linked to the work vehicle 100. The work vehicle 100 according to the present preferred embodiment functions in both a manual driving mode and a self-driving mode. In the self-driving mode, the work vehicle 100 is able to perform unmanned travel.

As shown in FIG. 2, the work vehicle 100 includes a vehicle body 101, a prime mover (engine) 102, and a transmission 103. On the vehicle body 101, tires (wheels) 104 and a cabin 105 are provided. The tires 104 include a pair of front wheels 104F and a pair of rear wheels 104R. Inside the cabin 105, a driver's seat 107, a steering device 106, an operational terminal 200, and switches for manipulation are provided. The front wheels 104F and/or the rear wheels 104R may be crawlers, rather than tires.

The work vehicle 100 shown in FIG. 2 further includes a plurality of cameras 120. The cameras 120 may be provided at the front/rear/right/left of the work vehicle 100, for example. The cameras 120 capture images of the surrounding environment of the work vehicle 100, and generate image data. The images acquired by the cameras 120 may be transmitted to a computer for monitoring purposes (also referred to as "monitoring terminal") which is responsible for remote monitoring, for example. The images are used to monitor the work vehicle 100 during unmanned driving. The cameras 120 may be provided as necessary, and may be omitted if unnecessary.

The work vehicle 100 further includes the positioning device 110. The positioning device 110 includes a GNSS receiver. The GNSS receiver includes an antenna to receive a signal (s) from a GNSS satellite(s) and a processing circuit to determine the position of the work vehicle 100 based on the signal (s) received by the antenna. The positioning device 110 receives a GNSS signal (s) transmitted from a GNSS satellite (s), and performs positioning on the basis of the GNSS signal(s). GNSS is a general term for satellite positioning systems, such as GPS (Global Positioning System), QZSS (Quasi-Zenith Satellite System, e.g., MICHIBIKI), GLONASS, Galileo, BeiDou, and the like. Although the positioning device 110 in the present preferred embodiment is disposed above the cabin 105, it may be disposed at any other position.

Instead of or in addition to the GNSS receiver, the positioning device 110 may include any other type of device, such as a LiDAR sensor. The positioning device 110 may utilize the data acquired by the cameras 120 for positioning. When objects serving as characteristic points exist in the environment that is traveled by the work vehicle 100, the position of the work vehicle 100 can be estimated with a high accuracy based on data that is acquired with the LiDAR sensor or cameras 120 and an environment map that is previously recorded in the storage device. The LiDAR sensor or cameras 120 may be used together with the GNSS receiver. By correcting or complementing position data based on the GNSS signal (s) using the data acquired by the LiDAR sensor or cameras 120, it becomes possible to identify the position of the work vehicle 100 with a higher accuracy. Furthermore, the positioning device 110 may complement the position data by using a signal from an inertial measurement unit (IMU). The IMU can measure tilts and minute motions of the work vehicle 100. By complementing the position data based on the GNSS signal using the data acquired by the IMU, the positioning performance can be improved.

The work vehicle 100 further includes a plurality of obstacle sensors 130. In the example shown in FIG. 2, the obstacle sensors 130 are provided at the front and the rear of the cabin 105. The obstacle sensors 130 may be disposed at other positions. For example, one or more obstacle sensors 130 may be disposed at any position selected from among the sides, the front, and the rear of the vehicle body 101, and the cabin 105. The obstacle sensors 130 may be used to detect obstacles in the surroundings during self-traveling to come to a halt or detour around it.

The prime mover 102 may be a diesel engine, for example. Instead of a diesel engine, an electric motor may be used. The transmission 103 can change the propulsion and the moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the wheels responsible for steering, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force for changing the steering angle of the front wheels 104F. When automatic steering is performed, under the control of a controller disposed in the work vehicle 100, the steering angle may be automatically adjusted by the power of the hydraulic device or electric motor.

A linkage device 108 is provided at the rear of the vehicle body 101. The linkage device 108 may include, e.g., a three-point linkage (also referred to as a "three-point link" or a "three-point hitch"), a PTO (Power Take Off) shaft, a universal joint, and a communication cable. The linkage device 108 allows the implement 300 to be attached to or detached from the work vehicle 100. The linkage device 108 is able to raise or lower the three-point link with a hydraulic device, for example, thus changing the position or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided frontward of the vehicle body 101. In that case, the implement may be connected frontward of the work vehicle 100.

Although the implement 300 shown in FIG. 2 is a rotary tiller, the implement 300 is not limited to a rotary tiller. For example, any arbitrary implement such as a seeder, a spreader, a transplanter, a mower, a rake implement, a baler, a harvester, a sprayer, or a harrow, may be connected to the work vehicle 100 for use.

The work vehicle 100 shown in FIG. 2 is capable of human driving; alternatively, it may only support unmanned driving. In that case, component elements which are only required for human driving, e.g., the cabin 105, the steering device 106, and the driver's seat 107 do not need to be provided in the work vehicle 100. An unmanned work vehicle 100 may travel via autonomous driving, or by remote manipulation by a user.

Figure 3:
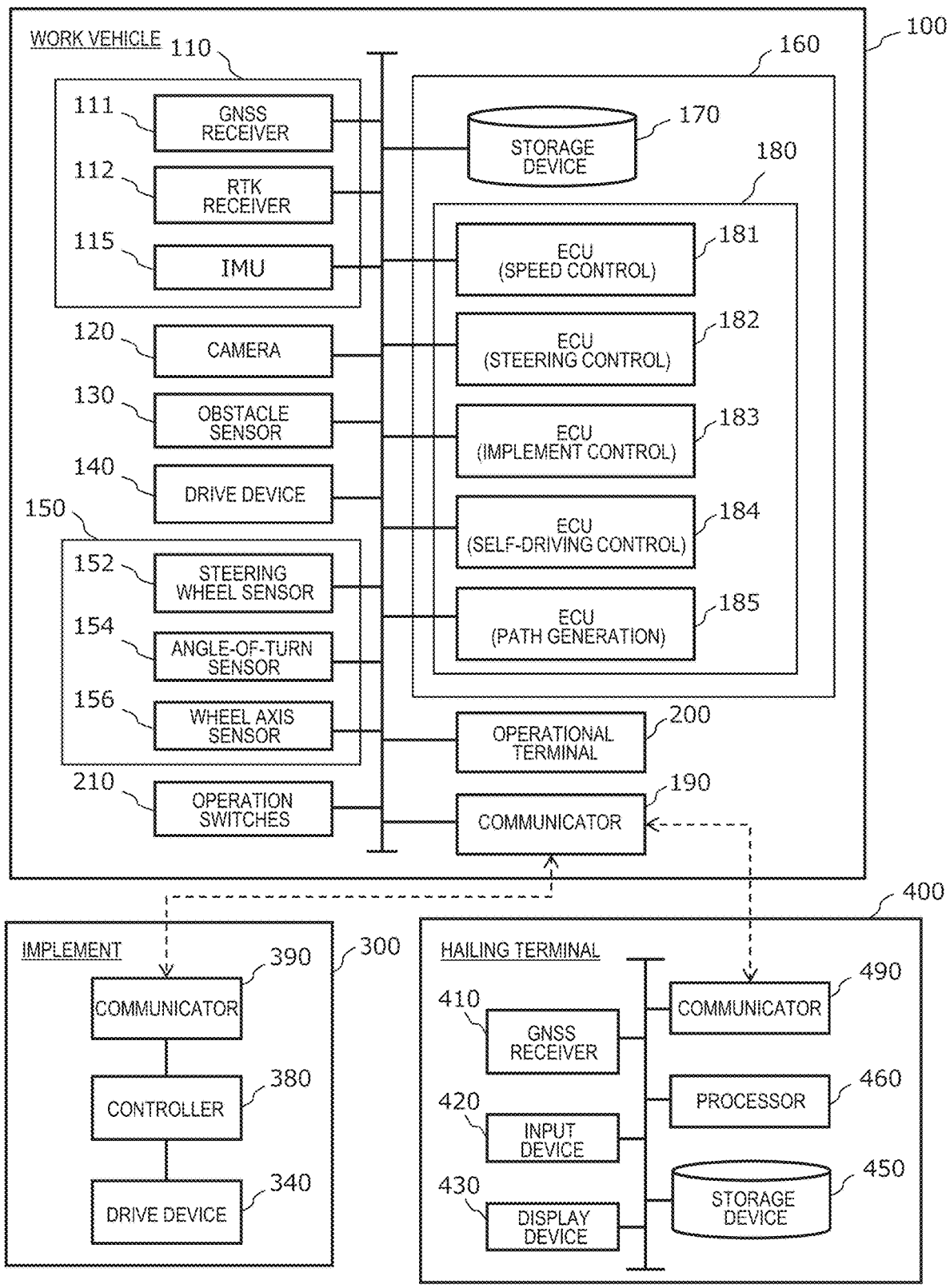
FIG. 3 is a block diagram showing an example configuration of the work vehicle, the implement, and a hailing terminal.

FIG. 3 is a block diagram showing an example configuration of the work vehicle 100, the implement 300, and the hailing terminal 400. The work vehicle 100 and the implement 300 can communicate with each other via a communication cable that is included in the linkage device 108. The work vehicle 100 and the hailing terminal 400 are able to communicate with each other via wireless communication.

In addition to the positioning device 110, the cameras 120, the obstacle sensors 130, and the operational terminal 200, the work vehicle 100 in the example of FIG. 3 includes a drive device 140, sensors 150 to detect the operating status of the work vehicle 100, a control system 160, a communicator 190, and operation switches 210. The positioning device 110 includes a GNSS receiver 111, an RIK receiver 112, and an inertial measurement unit (IMU) 115. The sensors 150 include a steering wheel sensor 152, an angle-of-turn sensor 154, and a wheel axis sensor 156. The control system 160 includes a storage device 170 and a controller 180. The controller 180 includes a plurality of electronic control units (ECU) 181 to 185. The implement 300 includes a drive device 340, a controller 380, and a communicator 390. The hailing terminal 400 includes a GNSS receiver 410, an input device 420, a display device 430, a storage device 450, a processor 460, and a communicator 490. Note that FIG. 3 shows component elements which are relatively closely related to the self-driving operation by the work vehicle 100, while other component elements are omitted from illustration.

Figure 4:
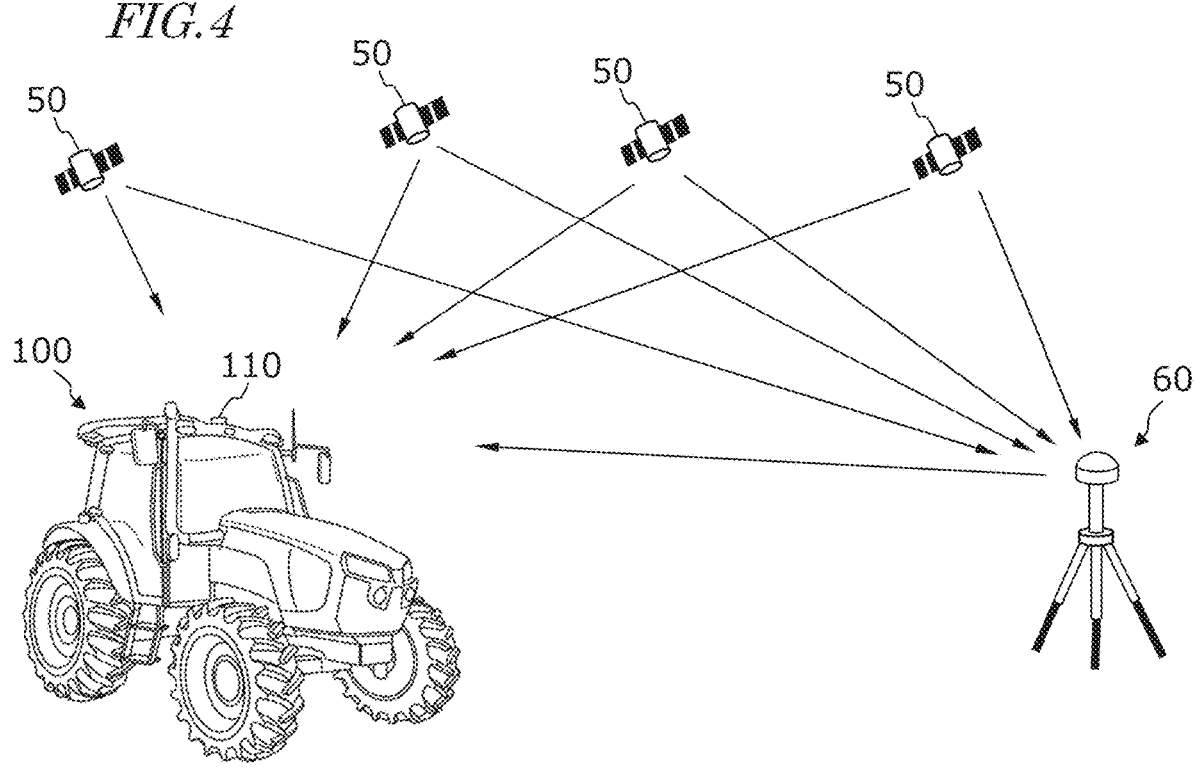
FIG. 4 is a conceptual diagram showing an example work vehicle which performs positioning based on an RTK-GNSS.

The positioning device 110 shown in FIG. 3 performs positioning of the work vehicle 100 by utilizing an RTK (Real Time Kinematic)-GNSS. FIG. 4 is a conceptual diagram showing an example of the work vehicle 100 which performs positioning based on an RTK-GNSS. In the positioning based on an RIK-GNSS, not only GNSS signals transmitted from multiple GNSS satellites 50, but also a correction signal that is transmitted from a reference station 60 is used. The reference station 60 may be disposed near the field that is traveled by the work vehicle 100 (e.g., at a position within 1 km of the work vehicle 100). The reference station 60 generates a correction signal of, e.g., an RTCM format based on the GNSS signals received from the multiple GNSS satellites 50, and transmits the correction signal to the positioning device 110. The GNSS receiver 111 in the positioning device 110 receives the GNSS signals transmitted from the multiple GNSS satellites 50. The RTK receiver 112, which includes an antenna and a modem, receives the correction signal transmitted from the reference station 60. The positioning device 110 may include a processor which calculates the position of the work vehicle 100 based on the GNSS signals and the correction signal, thus achieving positioning. Use of an RTK-GNSS enables positioning with an accuracy on the order of several cm of errors, for example. Positional information (including latitude, longitude, and altitude information) is acquired through the highly accurate positioning by an RTK-GNSS. The positioning device 110 may calculate the position of the work vehicle 100 as frequently as, e.g., one to ten times per second.

Note that the positioning method is not limited to an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the positioning device 110 may lack the RTK receiver 112.

The positioning device 110 in the present preferred embodiment further includes an IMU 115. The IMU 115 includes a 3-axis accelerometer and a 3-axis gyroscope. The IMU 115 may include a direction sensor such as a 3-axis geomagnetic sensor. The IMU 115 functions as a motion sensor which can output signals representing parameters such as acceleration, velocity, displacement, and attitude of the work vehicle 100. Based not only on the GNSS signals and the correction signal but also on a signal that is output from the IMU 115, the positioning device 110 can estimate the position and orientation of the work vehicle 100 with a higher accuracy. The signal that is output from the IMU 115 may be used for the correction or complementation of the position that is calculated based on the GNSS signals and the correction signal. The IMU 115 outputs a signal more frequently than the GNSS signals. Utilizing this highly frequent signal allows the position and orientation of the work vehicle 100 to be measured more frequently (e.g., about 10 Hz or above). Instead of the IMU 115, a 3-axis accelerometer and a 3-axis gyroscope may be separately provided. The IMU 115 may be provided as a separate device from the positioning device 110.

In addition to or instead of the GNSS receiver 111, the RTK receiver 112, and the IMU 115, the positioning device 110 may include other kinds of sensors, e.g., LiDAR sensors or image sensors. Depending on the environment that is traveled by the work vehicle 100, it is possible to estimate the position and orientation of the work vehicle 100 with a high accuracy based on data from such sensors.

In the example of FIG. 3, the processor of the positioning device 110 calculates the position of the work vehicle 100 based on signals which are output from the GNSS receiver 111, the RTK receiver 112, and the IMU 115. The positional calculation may instead be performed by any device other than the positioning device 110. For example, the controller 180 or an external computer may acquire output data from each receiver and each sensor as is required for positioning, and calculate the position of the work vehicle 100 based on such data.

In addition, each camera 120 is an imager that images the surrounding environment of the work vehicle 100, and includes image sensors, an optical system including one or more lenses and a signal processing circuit. During travel of the work vehicle 100, the cameras 120 image the surrounding environment of the work vehicle 100, and generate image data (e.g., motion pictures). The images generated by the cameras 120 may be used when a remote supervisor checks the surrounding environment of the work vehicle 100 with the monitoring terminal, for example. The images generated by the cameras 120 may also be used for the purpose of positioning or obstacle detection. As shown in FIG. 2, a plurality of cameras 120 may be provided at different positions on the work vehicle 100, or a single camera may be provided.

The obstacle sensors 130 detect objects around the work vehicle 100. Each obstacle sensor 130 may include a laser scanner or an ultrasonic sonar, for example. When an object exists at a position closer to the obstacle sensor 130 than a predetermined distance, the obstacle sensor 130 outputs a signal indicating the presence of an obstacle. A plurality of obstacle sensors 130 may be provided at different positions of the work vehicle 100. For example, a plurality of laser scanners and a plurality of ultrasonic sonars may be disposed at different positions of the work vehicle 100. Providing a multitude of obstacle sensors 130 can reduce blind spots in monitoring obstacles around the work vehicle 100.

The drive device 140 includes various devices that are needed for the traveling of the work vehicle 100 and the driving of the implement 300, e.g., the aforementioned prime mover 102, transmission 103, steering device 106, and linkage device 108. The prime mover 102 may include an internal combustion engine such as a diesel engine. Instead of an internal combustion engine or in addition to an internal combustion engine, the drive device 140 may include an electric motor that is dedicated to traction purposes.

The steering wheel sensor 152 measures the angle of rotation of the steering wheel of the work vehicle 100. The angle-of-turn sensor 154 measures the angle of turn of the front wheels 104F, which are the wheels responsible for steering. Measurement values by the steering wheel sensor 152 and the angle-of-turn sensor 154 are used for steering control by the controller 180.

The wheel axis sensor 156 measures the rotational speed, i.e., the number of revolutions per unit time, of a wheel axis that is connected to a tire 104. The wheel axis sensor 156 may be a sensor utilizing a magnetoresistive element (MR), a Hall generator, or an electromagnetic pickup, for example. The wheel axis sensor 156 may output a numerical value indicating the number of revolutions per minute (unit: rpm) of the wheel axis, for example. The wheel axis sensor 156 is used to measure the speed of the work vehicle 100.

The storage device 170 includes one or more storage media such as a flash memory or a magnetic disc. The storage device 170 stores various data generated by the positioning device 110, the cameras 120, the obstacle sensors 130, the sensors 150, and the controller 180. The data that is stored by the storage device 170 may include map data in the environment that is traveled by the work vehicle 100, data of a target path of during self-driving, and data representing an already-worked area. The storage device 170 also stores a computer program(s) to cause the ECUs in the controller 180 to perform various operations (to be described later). Such a computer program (s) may be provided for the work vehicle 100 via a storage medium (e.g., a semiconductor memory or an optical disc) or through telecommunication lines (e.g., the Internet). Such a computer program(s) may be marketed as commercial software.

The controller 180 includes a plurality of ECUs. The plurality of ECUs may include, for example, an ECU 181 for speed control, an ECU 182 for steering control, an ECU 183 for implement control, an ECU 184 for self-driving control, and an ECU 185 for path generation. The ECU 181 controls the prime mover 102, the transmission 103, and the brakes included in the drive device 140, thus controlling the speed of the work vehicle 100. The ECU 182 controls the hydraulic device or electric motor included in the steering device 106 based on a measurement value of the steering wheel sensor 152, thus controlling the steering of the work vehicle 100. In order to cause the implement 300 to perform a desired operation, the ECU 183 controls the operation of the three-point link, the PTO shaft, etc., that are included in the linkage device 108. Also, the ECU 183 generates a signal to control the operation of the implement 300, and transmits this signal from the communicator 190 to the implement 300. Based on signals which are output from the positioning device 110, the steering wheel sensor 152, the angle-of-turn sensor 154, and the wheel axis sensor 156, the ECU 184 performs computation and control for achieving self-driving. During self-driving, the ECU 184 sends the ECU 181 a command to change the speed, and sends the ECU 182 a command to change the steering angle. In response to the command to change the speed, the ECU 181 controls the prime mover 102, the transmission 103, or the brakes to change the speed of the work vehicle 100. In response to the command to change the steering angle, the ECU 182 controls the steering device 106 to change the steering angle. The ECU 185, which functions as the aforementioned processing unit (i.e., the path generating device), generates a target path for the work vehicle 100, and records it to the storage device 170. Furthermore, the ECU 185 generates a travel route that leads toward the hailing point when hailed from the hailing terminal 400. The ECU 184 sends necessary commands to the ECUs 181 and 182 so that the work vehicle 100 moves along the path generated by the ECU 185.

Through the action of these ECUs, the controller 180 realizes self-driving. During self-driving, the controller 180 controls the drive device 140 based on the position of the work vehicle 100 as measured or estimated by the positioning device 110 and the target path or travel route stored in the storage device 170. As a result, the controller 180 causes the work vehicle 100 to travel along the target path or travel route.

The plurality of ECUs included in the controller 180 may communicate with one another according to a vehicle bus standard such as CAN (Controller Area Network). Instead of CAN, faster communication methods may be used, e.g., Automotive Ethernet (registered trademark). Although the ECUs 181 to 185 are illustrated as individual corresponding blocks in FIG. 3, each of these functions may be implemented by a plurality of ECUs. Alternatively, an onboard computer that integrates the functions of at least some of the ECUs 181 to 185 may be provided. The controller 180 may include ECUs other than the ECUs 181 to 185, and any number of ECUs may be provided in accordance with functionality. Each ECU includes a processing circuit including one or more processors.

The communicator 190 is a circuit that performs communications with the communicator 390 of the implement 300. The communicator 190 includes circuitry to perform exchanges of signals complying with an ISOBUS standard such as ISOBUS-TIM, for example, between itself and the communicator 390 of the implement 300. This causes the implement 300 to perform a desired operation, or allows information to be acquired from the implement 300. The communicator 190 may further include a communication circuit and an antenna to exchange signals complying with any arbitrary wireless communication standard (e.g., Wi-Fi (registered trademark), 3G, 4G, 5G or other cellular mobile communication, or Bluetooth (registered trademark)) between itself and the communicator 490 of the hailing terminal 400. Moreover, the communicator 190 can communicate with an external computer via a wired or wireless network. The external computer may be a server computer which centralizes management of information concerning fields by using a cloud, and assists in agriculture by utilizing the data on the cloud, for example. Such an external computer may be configured to perform a part of the functionality of the work vehicle 100. For example, the path generation function of the ECU 185 may be performed by an external computer. In that case, the external computer functions as the aforementioned "processor" or "processing unit".

The operational terminal 200 is a terminal for the user to perform a manipulation related to the traveling of the work vehicle 100 and the operation of the implement 300, and may also be referred to as a virtual terminal (VT). The operational terminal 200 may include a display device such as a touch screen panel, and/or one or more buttons. The display device may be a display such as a liquid crystal or an organic light-emitting diode (OLED), for example. By manipulating the operational terminal 200, the user can perform various manipulations, such as switching ON/OFF the self-driving mode, setting a target path, recording or editing a map, and switching ON/OFF the implement 300. At least some of these manipulations can also be realized by manipulating the operation switches 210. The operational terminal 200 may be configured to be detachable from the work vehicle 100. A user who is remote from the work vehicle 100 may manipulate the detached operational terminal 200 to control the operation of the work vehicle 100. Instead of the operational terminal 200, the user may manipulate a smartphone, a tablet computer, or a personal computer (PC), or other apparatuses on which necessary application software is installed, to control the operation of the work vehicle 100. The hailing terminal 400 may cover the functionality of the operational terminal 200.

The drive device 340 in the implement 300 performs a necessary operation for the implement 300 to perform a predetermined task. The drive device 340 includes devices adapted to the intended use of the implement 300, e.g., a pump, a hydraulic device, an electric motor, or a pump. The controller 380 controls the operation of the drive device 340. In response to a signal that is transmitted from the work vehicle 100 via the communicator 390, the controller 380 causes the drive device 340 to perform various operations. Moreover, a signal that is in accordance with the state of the implement 300 may be transmitted from the communicator 390 to the work vehicle 100.

The hailing terminal 400 may be a mobile apparatus such as a smartphone, a tablet computer, or a remote control, for example. Based on signals transmitted from the multiple GNSS satellites, the GNSS receiver 410 in the hailing terminal 400 outputs data including information of the position of the hailing terminal 400. The GNSS receiver 410 may output data of an NMEA format, for example. The input device 420 is a device that accepts input operations from the user, and may include one or more buttons or switches. The display device 430 may be a display such as a liquid crystal or an OLED, for example. The input device 420 and the display device 430 may be implemented as a touch screen panel. The storage device 450 may include a semiconductor storage medium such as a flash memory, for example. The storage device 450 stores a computer program(s) to be executed by the processor 460 and various data that is generated by the processor 460. By executing the computer program(s) stored in the storage device 450, the processor 460 performs the following operation. In response to a hailing operation made by the user by using the input device 420, the processor 460 transmits a hailing signal including positional information of the hailing terminal 400 from the communicator 490 to the communicator 190 of the work vehicle 100. The positional information of the hailing terminal 400 is generated based on a signal that is output from the GNSS receiver 410.

Figure 5:
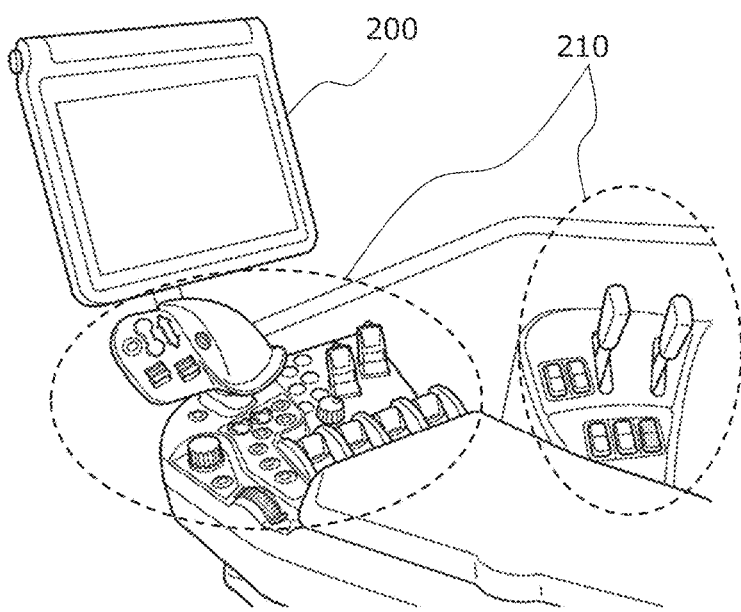
FIG. 5 is a schematic diagram showing an example of an operational terminal and operation switches.

FIG. 5 is a schematic diagram showing an example of the operational terminal 200 and operation switches 210 to be provided in the cabin 105. In the cabin 105, switches 210, which are a multitude of switches that are manipulable to the user, are disposed. The operation switches 210 may include, for example, a switch to select the gear shift as to a main gear shift or a range gear shift, a switch to switch between a self-driving mode and a manual driving mode, a switch to switch between forward travel and backward travel, a switch to raise or lower the implement 300, and the like. In the case where the work vehicle 100 only performs unmanned driving, and lacks human driving functionality, the work vehicle 100 does not need to include the operation switches 210.

Next, an example operation of the work vehicle 100 will be described.

Figure 6:
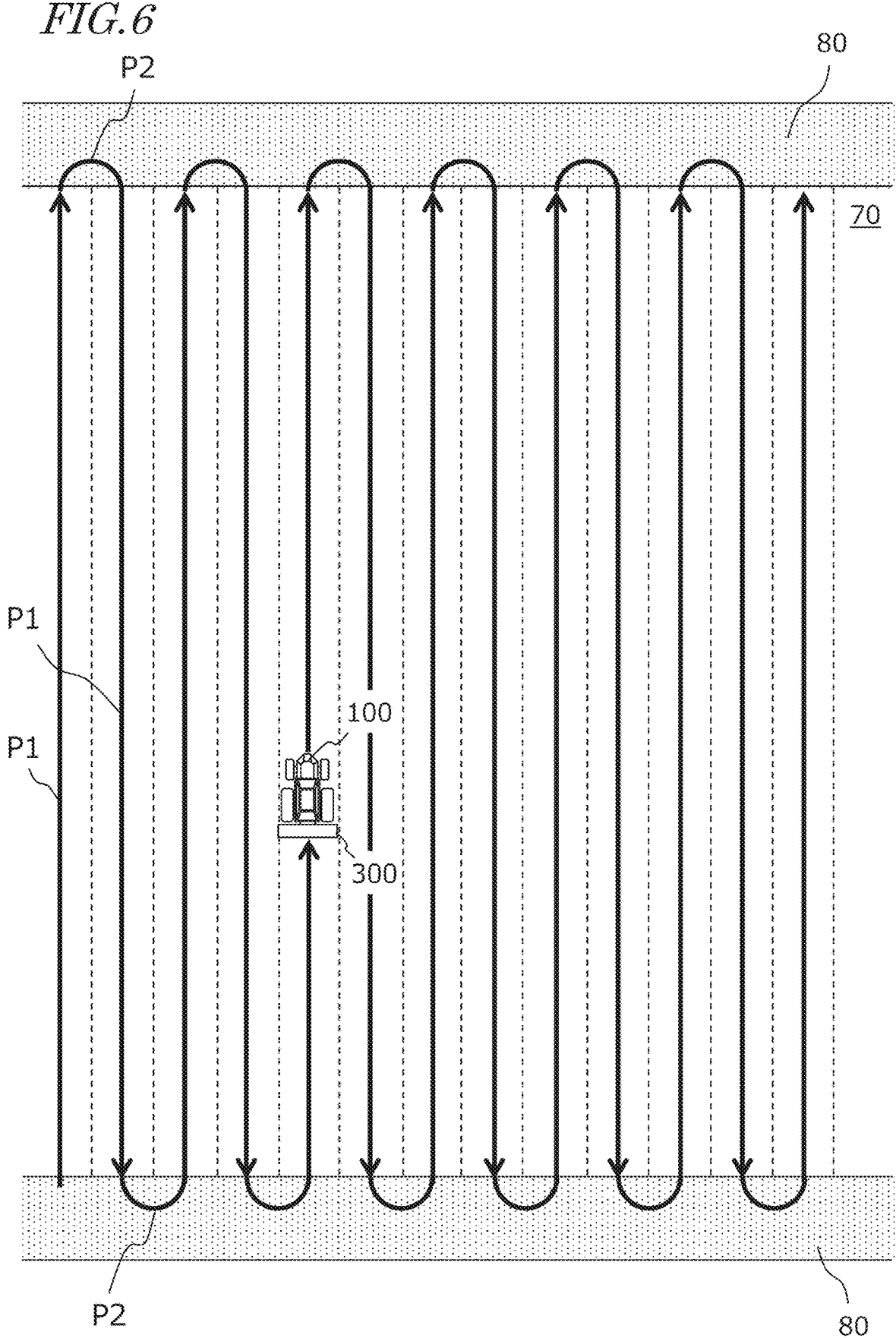
FIG. 6 is a diagram schematically showing an example of a work vehicle automatically traveling along a target path in a field.

FIG. 6 is a diagram schematically showing an example of a work vehicle 100 automatically traveling along a target path in a field. In this example, the field includes a work area 70 in which the work vehicle 100 performs a task by using the implement 300, and headlands 80 that are located near the outer peripheral edge of the field. The user may designate which regions on the map of the field would correspond to the work area 70 and the headlands 80 in advance. The target path in this example includes a plurality of parallel main paths P1 and a plurality of turning paths P2 interconnecting the plurality of main paths P1. The main paths P1 are located in the work area 70, whereas the turning paths P2 are located in the headlands 80. Although each main path P1 in FIG. 6 is illustrated as a linear path, each main path P1 may also include a curved portion (s). Broken lines in FIG. 6 depict the working breadth of the implement 300. The working breadth is previously set and recorded in the storage device 170. The working breadth may be set and recorded as the user manipulates the operational terminal 200. Alternatively, the working breadth may be automatically recognized and recorded when the implement 300 is connected to the work vehicle 100. The interval between the plurality of main paths P1 may be matched to the working breadth. The target path is generated by the ECU 185 based on the user's manipulation, before self-driving is begun. The target path may be generated so as to cover the entire work area 70 in the field, for example. Along the target path shown in FIG. 6, the work vehicle 100 automatically travels in repetitive reciprocations, from a beginning point of work to an ending point of work. Note that the target path shown in FIG. 6 is only an example, and the target path may be arbitrarily determined.

It is also possible to designate a previously-recorded sequence of operations so as to be executed by the work vehicle 100 when turning at the headlands 80. A program defining this sequence of operations is referred to as the "operation sequence" in the present specification. The operation sequence may be set by the user, and recorded in the storage device 170. When the work vehicle 100 turns along a turning path, the controller 180 may cause the work vehicle 100 to execute the sequence of operations in accordance with the previously-recorded operation sequence. Respectively different operation sequences may be recorded when beginning a headland turn at an end of a main path P1 (upon "field-out"), and when finishing the headland turn and beginning to travel along the next main path P1 (upon "field-in"). As the operation sequence, the following example operations may be recorded:

raising/lowering three-point link
    turning PTO rotation ON/OFF
    turning locking differential ON/OFF
    switching between 4WD/2WD
    increasing/decreasing engine revolutions
    switching transmission The control system 160 has functionality as a headland management system (HMS) to manage the sequence of operations to be executed during a headland turn. The sequence of operations may include a field-out operation to be performed at the beginning of a turn and a field-in operation to be performed at the finish of a turn. The field-out operation may include at least one of the operations of raising the implement 300 that is linked to the work vehicle 100, suspending output of motive power to the implement 300, disabling the locking differential function of the work vehicle 100, switching from the two-wheel drive mode to the four-wheel drive mode, and lowering the engine revolutions of the work vehicle 100, for example. The field-in operation may include at least one of the operations of lowering the implement 300, starting output of motive power to the implement 300, starting the locking differential function; switching from the four-wheel drive mode to the two-wheel drive mode, and increasing the engine revolutions, for example. The controller 180 can cause a setting screen to be displayed on the display device of the operational terminal 200 or the like, on which the user is able to set the contents of the sequence of operations. The controller 180 causes the storage device 170 to store an operation sequence that is based on the contents of the sequence of operations having been set.

During turns at the headlands 80, the controller 180 controls the operation of the implement 300 in accordance with a previously-recorded operation sequence. This allows automatic turns at the headlands 80 to be performed smoothly. Not only during turns at the headlands 80, but also in a turn within the work area 70 that is made when hailed from the hailing terminal 400, the controller 180 may perform operations such as raising the implement 300 or suspending output of motive power to the implement 300, similarly to upon field-out.

Next, an example control by the controller 180 during self-driving will be described.

Figure 7:
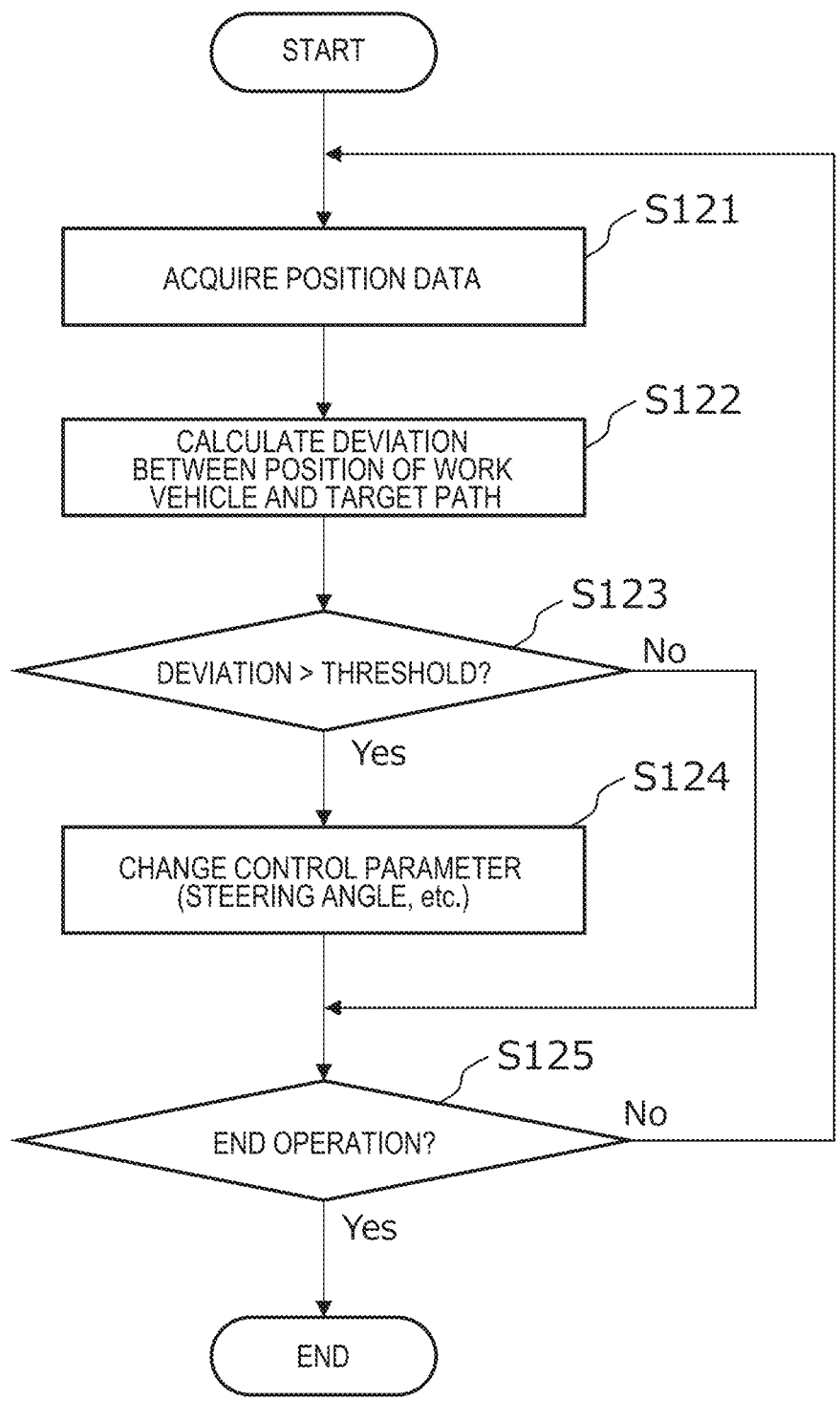
FIG. 7 is a flowchart showing an example operation of steering control during self-driving.

FIG. 7 is a flowchart showing an example operation of steering control to be performed by the controller 180 during self-driving. During travel of the work vehicle 100, the controller 180 performs automatic steering by performing the operation from steps S121 to S125 shown in FIG. 7. The speed will be maintained at a previously-set speed, for example. First, during travel of the work vehicle 100, the controller 180 acquires data representing the position of the work vehicle 100 that is generated by the positioning device 110 (step S121). Next, the controller 180 calculates a deviation between the position of the work vehicle 100 and the target path (step S122). The deviation represents the distance between the position of the work vehicle 100 and the target path at that moment. The controller 180 determines whether the calculated deviation in position exceeds the previously-set threshold or not (step S123). If the deviation exceeds the threshold, the controller 180 changes a control parameter of the steering device included in the drive device 140 so as to reduce the deviation, thus changing the steering angle (step S124). If the deviation does not exceed the threshold at step S123, the operation of step S124 is omitted. At the following step S125, the controller 180 determines whether a command to end operation has been received or not. The command to end operation may be given when the user has instructed that self-driving be suspended through remote manipulations, or when the work vehicle 100 has arrived at the destination, for example. If the command to end operation has not been issued, the control returns to step S121 and performs a similar operation based on a newly measured position of the work vehicle 100. The controller 180 repeats the operation from steps S121 to S125 until a command to end operation is given. The aforementioned operation is executed by the ECUs 182 and 184 in the controller 180.

In the example shown in FIG. 7, the controller 180 controls the drive device 140 based only on a deviation between the position of the work vehicle 100 as identified by the positioning device 110 and the target path. However, a deviation in terms of directions may further be considered in the control. For example, when a directional deviation exceeds a previously-set threshold, where the directional deviation is an angle difference between the orientation of the work vehicle 100 as identified by the positioning device 110 and the direction of the target path, the controller 180 may change the control parameter (e.g., steering angle) of the steering device of the drive device 140 in accordance with the deviation.

Hereinafter, with reference to FIGS. 8A to 8D, an example of steering control by the controller 180 will be described more specifically.

Figure 8A:
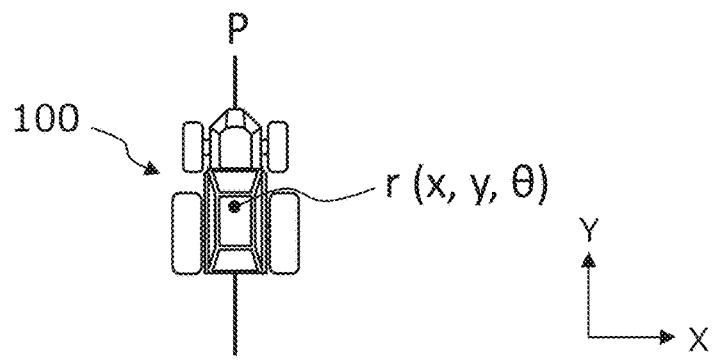
FIG. 8A is a diagram showing an example of a work vehicle that travels along a target path.
Figure 8B:
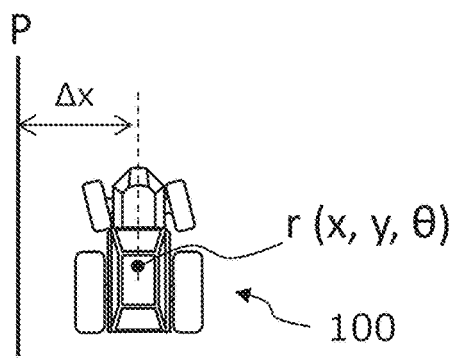
FIG. 8B is a diagram showing an example of a work vehicle at a position which is shifted rightward from the target path.
Figure 8C:
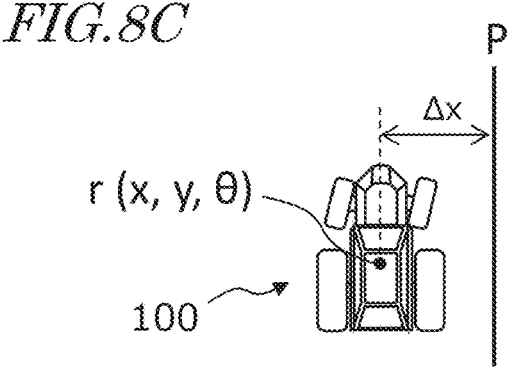
FIG. 8C is a diagram showing an example of a work vehicle at a position which is shifted leftward from the target path.
Figure 8D:
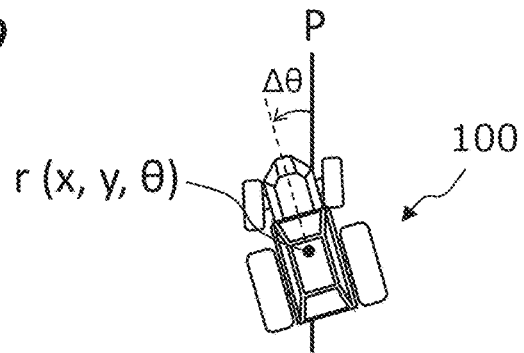
FIG. 8D is a diagram showing an example of a work vehicle which is oriented in an inclined direction with respect to the target path.

FIG. 8A is a diagram showing an example of a work vehicle 100 that travels along a target path P. FIG. 8B is a diagram showing an example of a work vehicle 100 at a position which is shifted rightward from the target path P. FIG. 8C is a diagram showing an example of a work vehicle 100 at a position which is shifted leftward from the target path P. FIG. 8D is a diagram showing an example of a work vehicle 100 which is oriented in an inclined direction with respect to the target path P. In these figures, the pose, i.e., the position and orientation, of the work vehicle 100 as measured by the positioning device 110 is expressed as r(x, y, θ). Herein, (x, y) are coordinates representing the position of a reference point on the work vehicle 100, in an XY coordinate system which is a two-dimensional coordinate system being fixed to the globe. In the examples shown in FIGS. 8A to 8D, the reference point on the work vehicle 100 is at a position on the cabin where a GNSS antenna is disposed, but the reference point may be at any arbitrary position. θ is an angle representing the measured orientation of the work vehicle 100. Although the target path P is shown parallel to the Y axis in the examples illustrated in these figures, generally speaking, the target path P may not necessarily be parallel to the Y axis.

As shown in FIG. 8A, in the case where the position and orientation of the work vehicle 100 are not deviated from the target path P, the controller 180 maintains the steering angle and speed of the work vehicle 100 without changing them.

As shown in FIG. 8B, when the position of the work vehicle 100 is shifted rightward from the target path P, the controller 180 changes the steering angle so that the traveling direction of the work vehicle 100 will be inclined leftward, thus bringing the work vehicle 100 closer to the path P. Herein, not only the steering angle but also the speed may be changed. The magnitude of the steering angle may be adjusted in accordance with the magnitude of a positional deviation Δx, for example.

As shown in FIG. 8C, when the position of the work vehicle 100 is shifted leftward from the target path P, the controller 180 changes the steering angle so that the traveling direction of the work vehicle 100 will be inclined rightward, thus bringing the work vehicle 100 closer to the path P. In this case, too, not only the steering angle but also the speed may be changed. The amount of change of the steering angle may be adjusted in accordance with the magnitude of the positional deviation Δx, for example.

As shown in FIG. 8D, in the case where the position of the work vehicle 100 is not considerably deviated from the target path P but its orientation is nonetheless different from the direction of the target path P, the controller 180 changes the steering angle so that the directional deviation 40 will become smaller. In this case, too, not only the steering angle but also the speed may be changed. The magnitude of the steering angle may be adjusted in accordance with the magnitudes of the positional deviation Δx and the directional deviation 40, for example. For instance, the amount of change of the steering angle (which is in accordance with the directional deviation 40) may be increased as the absolute value of the positional deviation Δx decreases. When the positional deviation Δx has a large absolute value, the steering angle will be changed greatly in order for the work vehicle 100 to return to the path P, so that the directional deviation Δθ will inevitably have a large absolute value. Conversely, when the positional deviation Δx has a small absolute value, the directional deviation 40 needs to become closer to zero. Therefore, it may be advantageous to introduce a relatively large weight (i.e., control gain) for the directional deviation 40 in determining the steering angle.

For the steering control and speed control of the work vehicle 100, control techniques such as PID control or MPC (Model Predictive Control) may be applied. Applying these control techniques will make for smoothness of the control of bringing the work vehicle 100 closer to the target path P.

Note that, when an obstacle is detected by one or more obstacle sensors 130 during travel, the controller 180 halts the work vehicle 100. Alternatively, when an obstacle is detected, the controller 180 may control the drive device 140 so as to avoid the obstacle.

Next, an example operation in the case where the work vehicle 100, while performing self-driving, is hailed from the hailing terminal 400 will be described.

Once hailed from the hailing terminal 400, the work vehicle 100 according to the present preferred embodiment stops its work, and moves to the hailing point for the hailing terminal 400. At this time, the work vehicle 100 moves along a travel route that is a path that reaches the hailing point without having to step on any already-worked area where its work has been completed. The travel route is to be generated based on the positional relationship between the hailing point, the work vehicle 100 at the time when hailed, and the already-worked area.

Figure 9A:
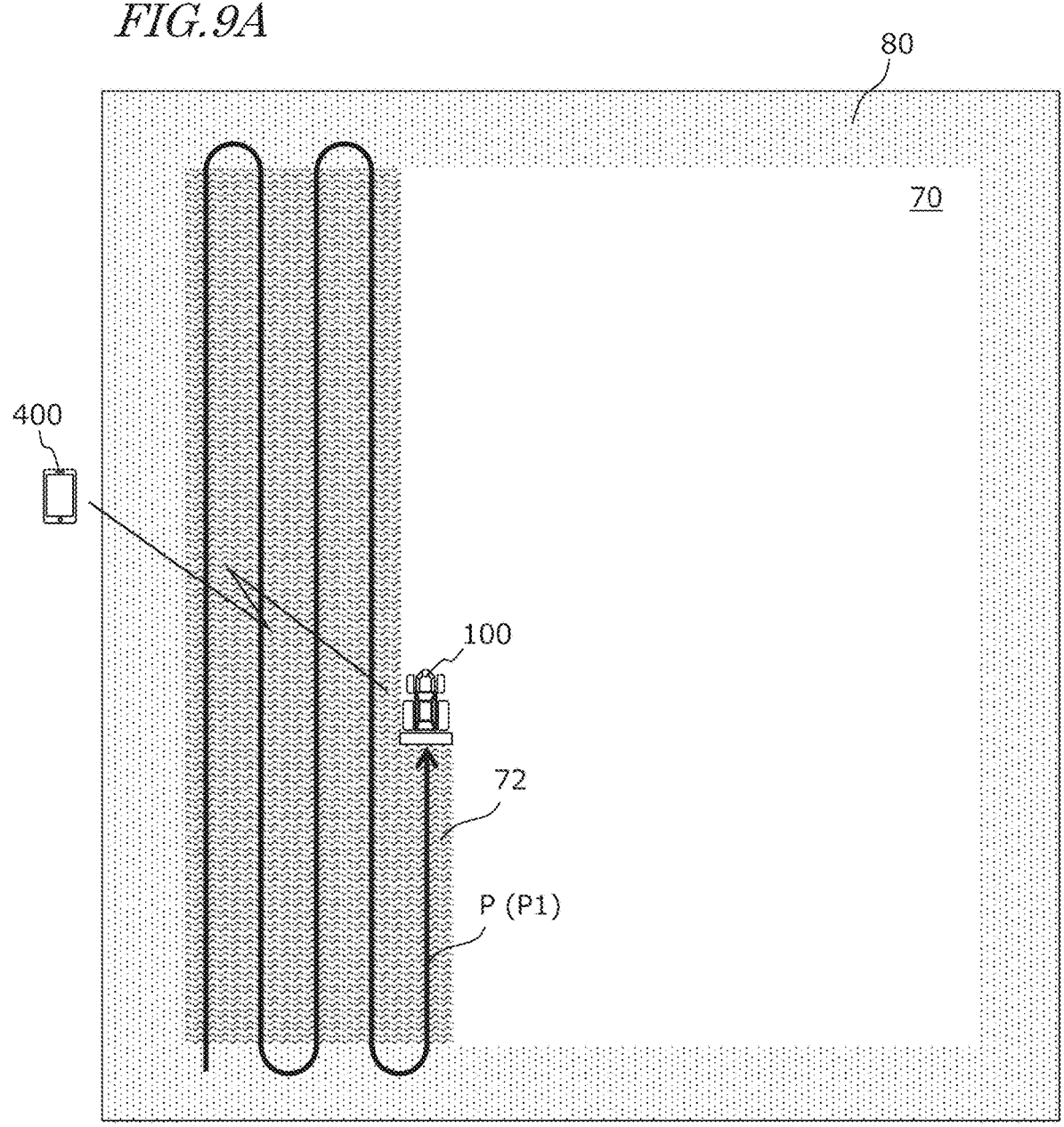
FIG. 9A is a diagram schematically showing an example situation where a work vehicle is hailed from a hailing terminal.

FIG. 9A is a diagram schematically showing an example situation where a work vehicle 100 that is self-traveling within a field is hailed from the hailing terminal 400. In this example, while performing work in an unmanned manner, the work vehicle 100 is traveling along one main path P1 that is included within the target path P. In this state, a user who is outside the work area 70 performs a manipulation of hailing the work vehicle 100 by using the hailing terminal 400. The hailing terminal 400 in this example is a smartphone, on which software for hailing the work vehicle 100 is previously installed. By using the hailing terminal 400, the user performs a manipulation of hailing the work vehicle 100 in order to refill agricultural materials (seeds, fertilizers, seedlings, etc.) that are necessary for the work by the work vehicle 100, or to ride on the work vehicle 100 and manually drive it. Once a hailing operation is performed, the hailing terminal 400 transmits a hailing signal including positional information of the hailing terminal 400, which is output from the GNSS receiver 410, to the work vehicle 100. Upon receiving the hailing signal, the work vehicle 100 determines a hailing point based on its positional information, and travels toward the hailing point. At this time, the work vehicle 100 generates a travel route that leads toward the hailing point without stepping on an already-worked area 72 where its work has been completed, and travels along this travel route. The travel route is generated by the ECU 185 in the controller 180.

Information of the already-worked area 72 is necessary for generating a travel route. Therefore, while the work vehicle 100 is traveling along the target path P, the ECU 185 in the present preferred embodiment causes the already-worked area 72 to be stored to the storage device 170. The already-worked area 72 may be calculated based on the position of the work vehicle 100 as identified by the positioning device 110 and the working breadth of the previously-set work vehicle 100. During travel of the work vehicle 100, the ECU 185 causes information indicating the span of the already-worked area 72 (e.g., information of a coordinate range on a map) to be stored to the storage device 170. Note that recording of the already-worked area 72 may be performed not only by the ECU 185, but also by another ECU or another computer, e.g., an external server.

When generating a travel route, the ECU 185 first finalizes the hailing point to move to. The ECU 185 may straightforwardly regard the point that is indicated by the positional information included in the hailing signal that has been transmitted from the hailing terminal 400 as the hailing point. However, positioning results by the GNSS receiver 410 in the hailing terminal 400 generally include errors, and in some cases the positioning error may be several meters or greater. Therefore, when the positional information included in the hailing signal is used straightforwardly, a point that is very remote from the actual position of the hailing terminal 400 may happen to be determined as the hailing point. For example, a point inside the already-worked area 72, or a point on a road outside the field may happen to be determined as the hailing point. In order to avoid such situations, when the position that is indicated by the positional information included in the hailing signal points to a position inside the already-worked area 72 or on a road, the ECU 185 may correct the position indicated by the positional information to a position which is inside the field but which is outside the already-worked area 72, and determine the corrected position as the position of the hailing point. As a result, even if the positioning error of the GNSS receiver 410 is large, the hailing point can be set to an appropriate position. When such a correction has been made, the ECU 185 may transmit to the hailing terminal 400 a notification indicating that the hailing point has been corrected.

Once determining the hailing point, the ECU 185 determines a travel route based on the position of the hailing point, the position of the work vehicle 100 as identified by the positioning device 110, and the information of the already-worked area 72 stored in the storage device 170. As the travel route, the ECU 185 determines a path that leads toward the hailing point from the position of the work vehicle 100 when hailed, without going through the already-worked area 72.

Figure 9B:
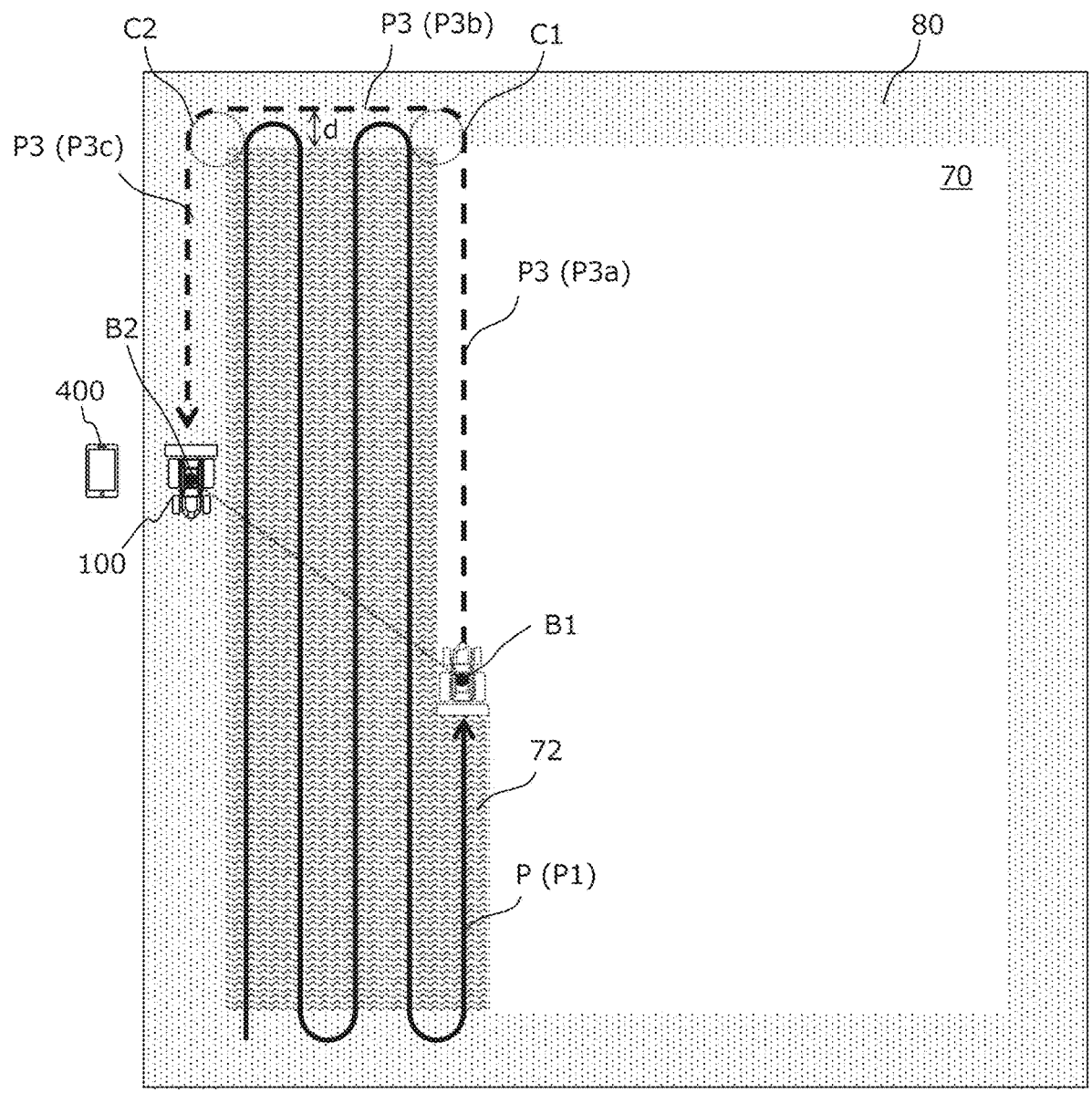
FIG. 9B is a diagram showing an example of a travel route that is generated in the example of FIG. 9A.

FIG. 9B is a diagram showing an example situation where the work vehicle 100 moves toward a hailing point B2 along a travel route P3. In this example, the hailing point B2 is determined at a point in one of the headlands 80 that is near the hailing terminal 400. An already-worked area 72 exists between the position B1 of the work vehicle 100 when hailed and the hailing point B2. In other words, a straight line (a dotted line in FIG. 9B) connecting the position B1 of the work vehicle 100 when hailed and the hailing point B2 overlaps the already-worked area 72. In such a case, the ECU 185 determines a path that leads toward the hailing point B2 from the position B1 along the outer periphery of the already-worked area 72 as the travel route P3.

The ECU 185 may be configured to determine, as the travel route P3, a shortest path that reaches the hailing point B2 along the outer periphery of the already-worked area 72, for example. In the example of FIG. 9B, what is determined as the travel route P3 is a path that, after going straight along a main path P1 during travel from the position B1 of the work vehicle 100 when hailed, leads toward the hailing point B2 along the outer periphery of the already-worked area 72. The travel route P3 shown in FIG. 10B is generated by connecting: a first straight line P3a that extends along the main path P1 toward a headland 80; an arc of a first circle C1 that is tangent to the first straight line P3a; a second straight line P3b that is tangent to the first circle C1 and extends essentially in parallel to a border line between the work area 70 and the headland 80; an arc of a second circle C2 that is tangent to the second straight line P3b; and a third straight line P3c that is tangent to the second circle C2 and extends to the hailing point B2. The radii of the first circle C1 and the second circle C2 may be set to predetermined values, such as the smallest radius around which the work vehicle 100 is capable of turning, for example. The distance d between the border line between the work area 70 and headland 80 and the straight line P3b may be set to a predetermined value, such as a half of the width of the headland 80, for example.

The travel route P3 in the example of FIG. 9B includes: a portion of the target path P that has not been traveled yet at the time when the work vehicle 100 is hailed, that is, a portion is located in the traveling direction of the work vehicle 100. Thus, when hailed, the ECU 185 may determine as the travel route P3 a path including a portion of the target path P that is located in the traveling direction of the work vehicle 100. Such a method of path determination is quite different from a conventional method disclosed in Japanese Laid-Open Patent Publication No. 2020-22429, for example. In Japanese Laid-Open Patent Publication No. 2020-22429, a path for discharging or refilling is determined so as to avoid the unworked area, thereby preventing unharvested crops (e.g., rice) from being stepped on by a harvester. On the other hand, in the present preferred embodiment, the travel route P3 is determined so as to avoid the already-worked area 72, and the travel route P3 may include some unworked area. In the present preferred embodiment, the travel route P3 is generated in an area excluding the already-worked area 72, thereby avoiding loss of the effects of the work as may be caused by the work vehicle 100 stepping on the already-worked area 72.

In the present preferred embodiment, when the work vehicle 100 begins to travel along the travel route P3, the controller 180 causes the work by the implement 300 to stop. For example, the controller 180 may stop the PTO rotation, and raise the three-point link, thereby stopping the work by the implement 300. Instead of such an operation, while traveling in a portion of the travel route P3 that overlaps the main paths P1 of the target path P, the work vehicle 100 may continue work without stopping the implement 300. For example, in the example of FIG. 9B, after the work vehicle 100 is hailed, the work vehicle 100 may continue work in at least a portion of a section in which the work vehicle 100 travels along a main path P1. Through such an operation, the efficiency of work can be improved.

Depending on the positional relationship between the hailing point B2, the position B1 of the hailed work vehicle 100, and the already-worked area 72, the ECU 185 in the present preferred embodiment generates a travel route by different methods. Hereinafter, several example methods of generating a travel route will be described.

Figure 10A:
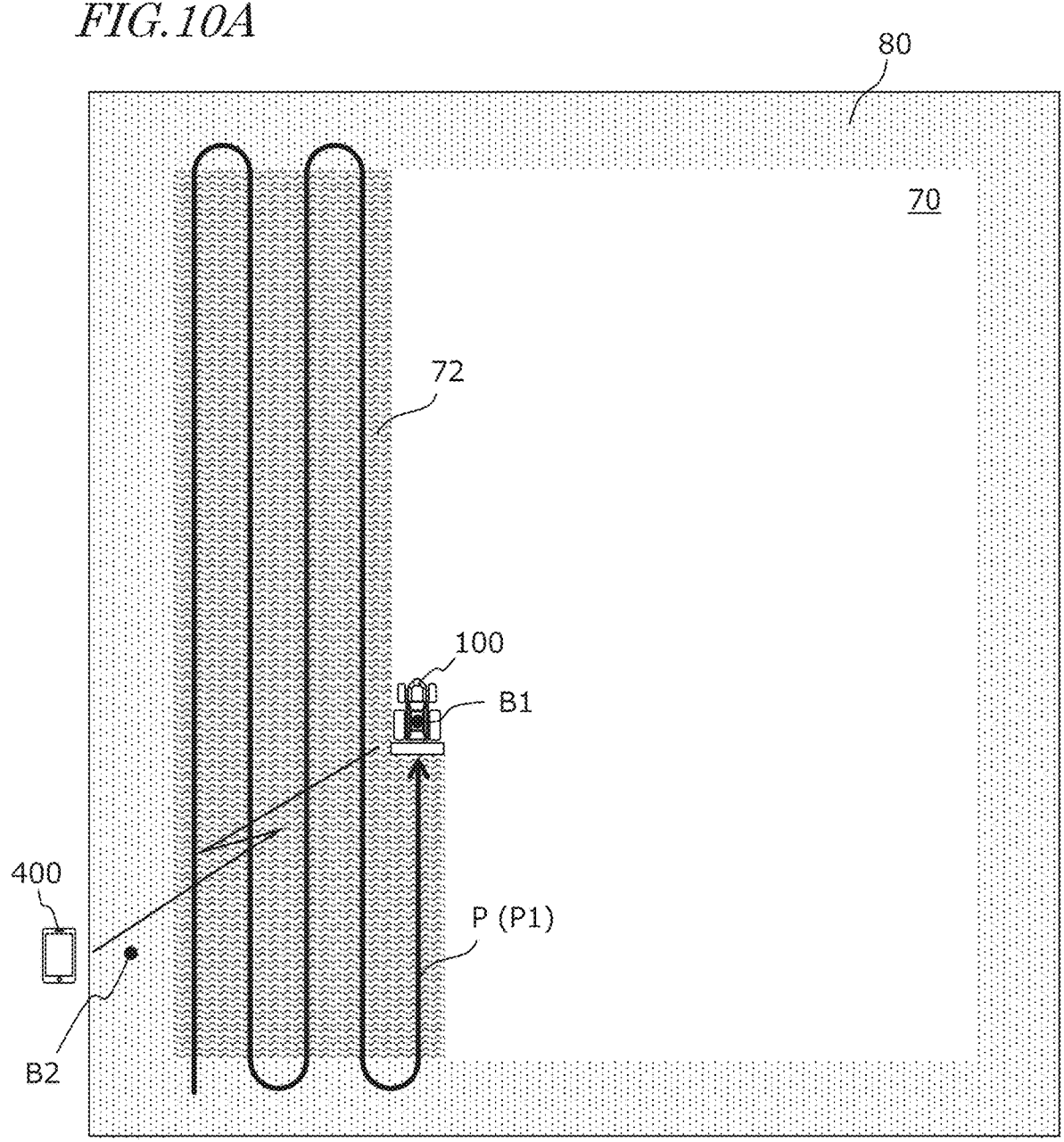
FIG. 10A is a diagram schematically showing another example situation where a work vehicle is hailed from a hailing terminal.
Figure 10B:
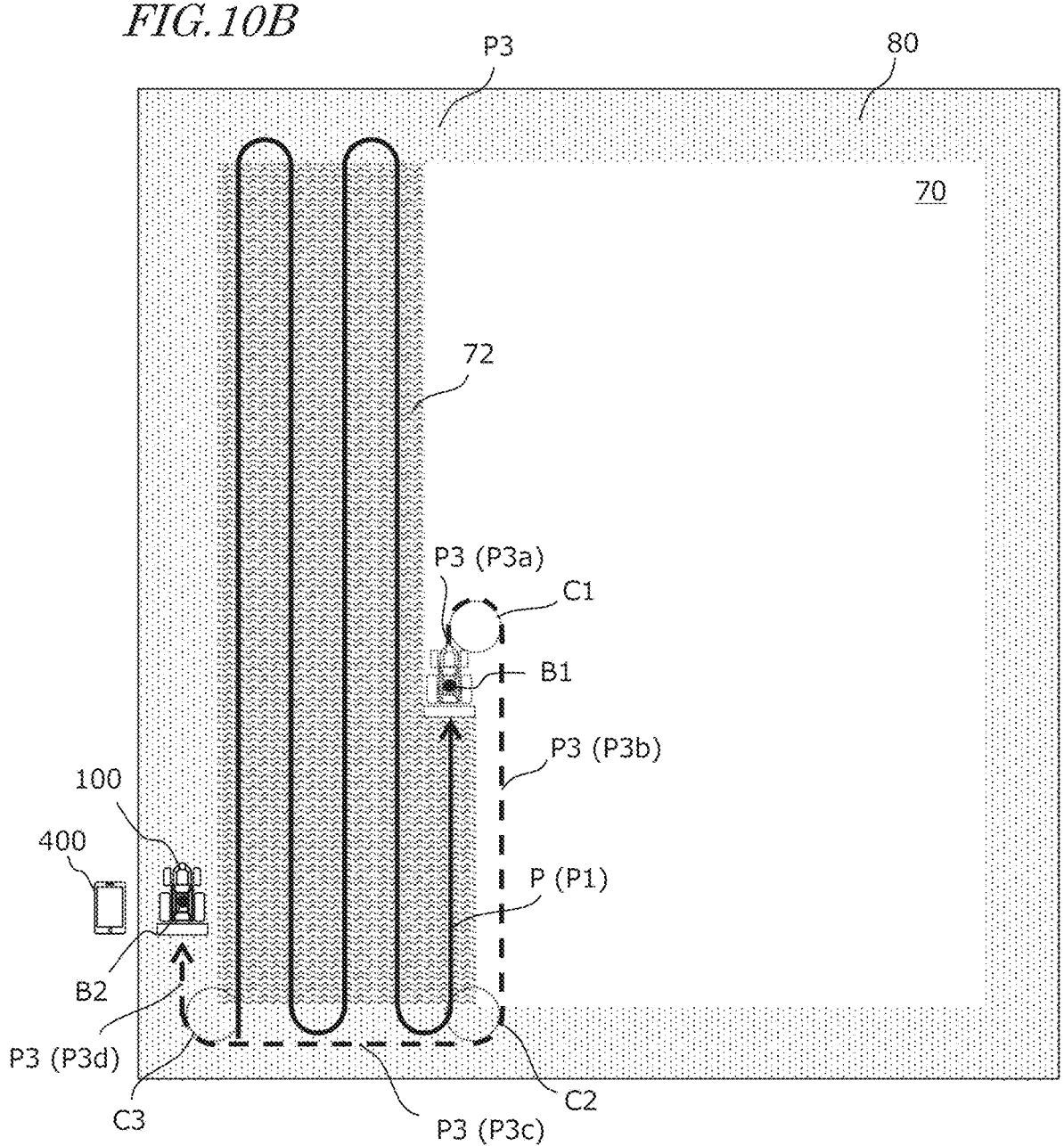
FIG. 10B is a diagram showing is a diagram showing an example of a travel route that is generated in the example of FIG. 10A.

FIG. 10A is a diagram showing another example where the already-worked area 72 exists between the position B1 of the hailed work vehicle 100 and the hailing point B2. In the example of FIG. 10A, as compared to the example of FIG. 9A, the position of the hailing terminal 400 is more in the opposite direction than in the traveling direction of the work vehicle 100. In such a case, the work vehicle 100 will need a long time until arriving at the hailing point B2 if the travel route is generated by a similar method to the method described in FIG. 9B. Therefore, in this example, as shown in FIG. 10B, the ECU 185 determines as the travel route P3 a path that turns from the position B1 of the work vehicle 100 when hailed toward an opposite side of where the already-worked area 72 exists, goes straight in an opposite direction, and thereafter leads toward the hailing point B2 along the outer periphery of the already-worked area 72. In this example, too, similarly to the example of FIG. 9B, the ECU 185 generates as the travel route P3 a path that combines a plurality of straight lines and a plurality of circular arcs. Specifically, the travel route P3 shown in FIG. 10B may be generated by connecting: a first straight line P3a that extends a relatively short predetermined distance (e.g., about 1 m) along the main paths P1 from the position B1 of the hailed work vehicle 100; an arc of a first circle C1 with a predetermined radius that is tangent to the first straight line P3a; a second straight line P3b that extends from a point of completing a 180° turn along the arc of the first circle C1 to a headland 80 that is in the opposite direction of the traveling direction of the work vehicle 100 before turning; an arc of a second circle C2 with a predetermined radius that is tangent to the second straight line P3b; a third straight line P3c that is tangent to the second circle C2 and extends in parallel to a border line between the work area 70 and the headland 80; an arc of a third circle C3 that is tangent to the third straight line P3c; and a fourth straight line P3d that is tangent to the third circle C3 and extends to the hailing point B2.

Figure 11A:
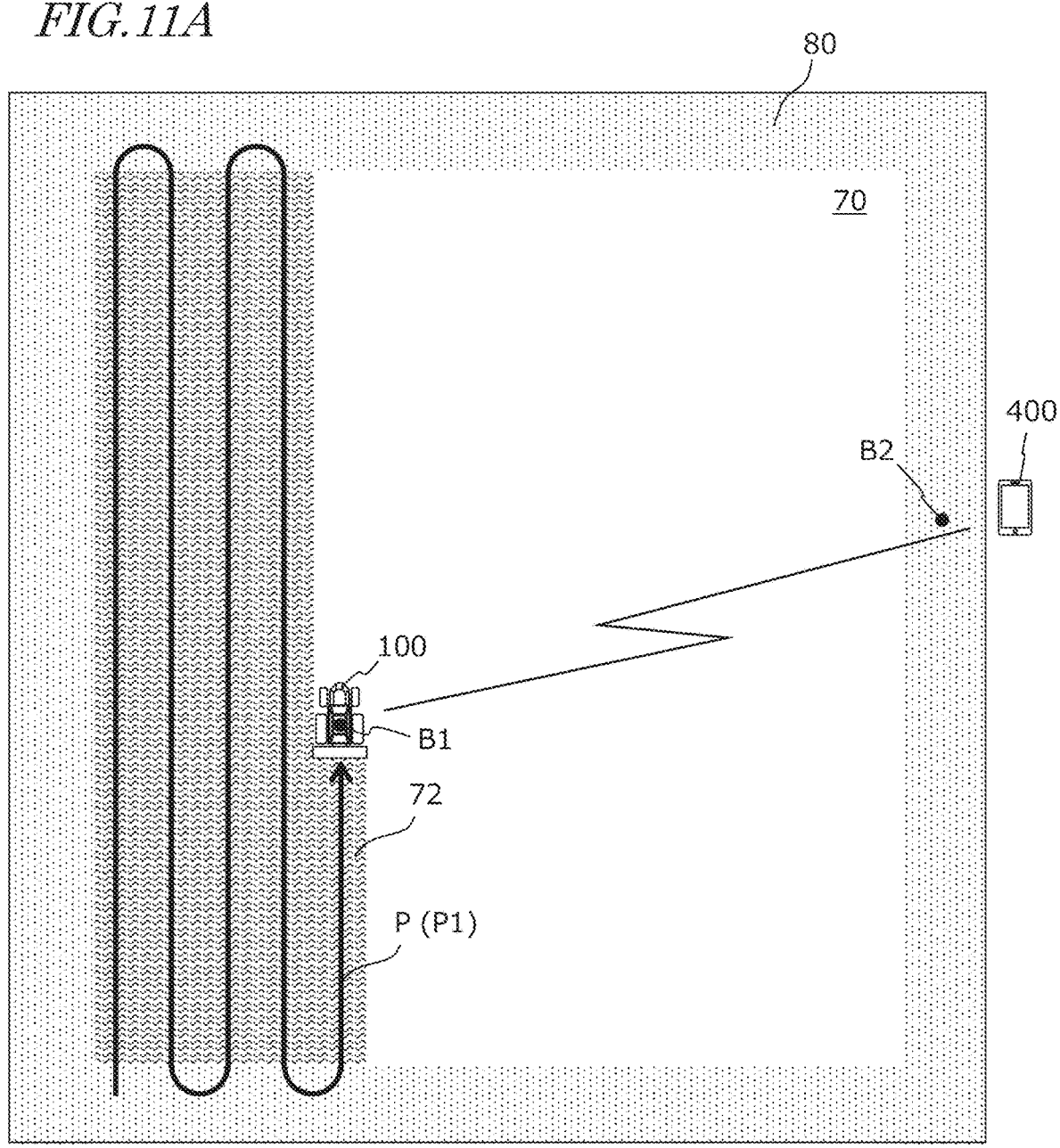
FIG. 11A is a diagram schematically showing still another example situation where a work vehicle is hailed from a hailing terminal.
Figure 11B:
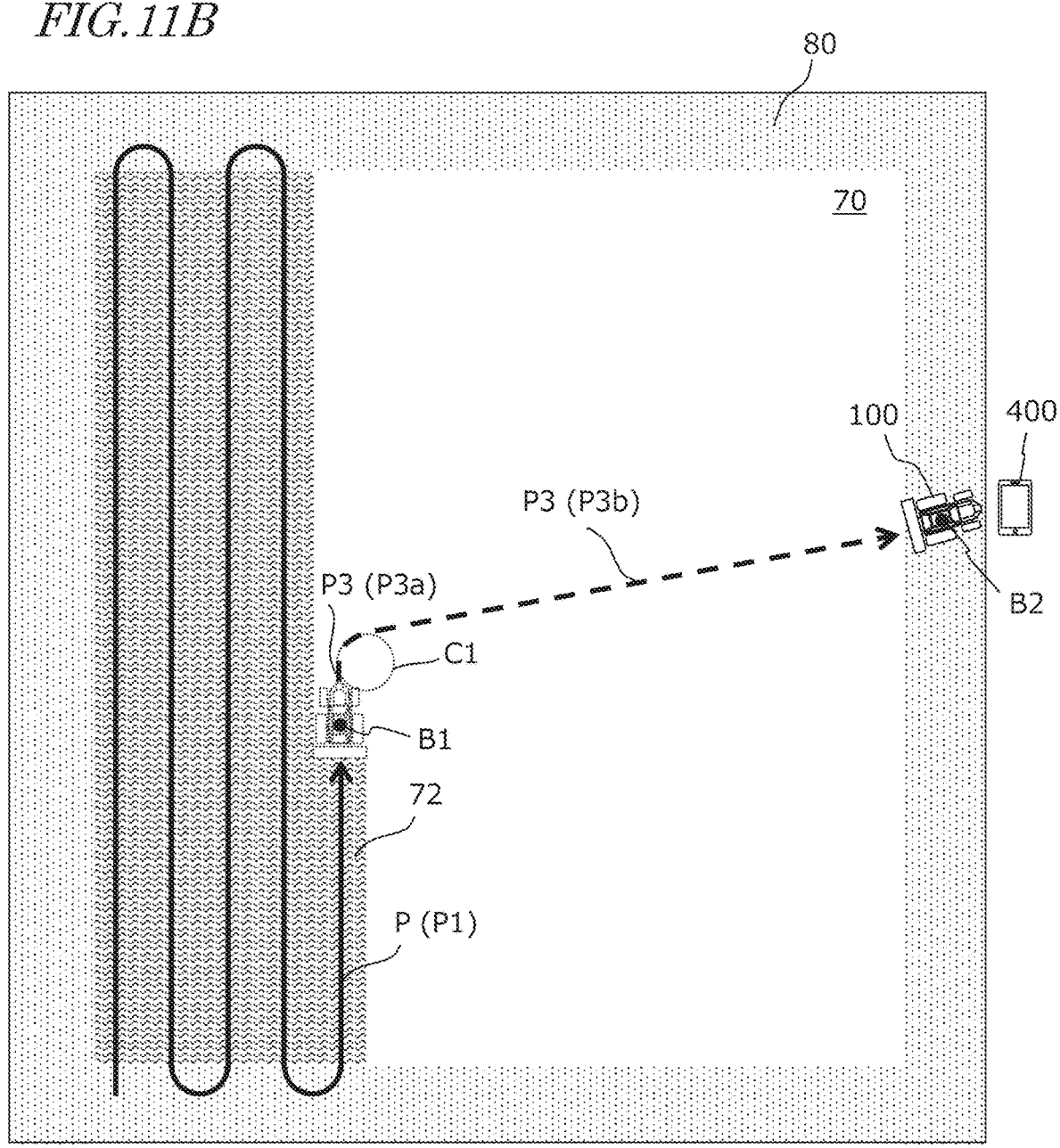
FIG. 11B is a diagram showing an example of a travel route that is generated in the example of FIG. 11A.

FIG. 11A is a diagram showing an example case where no already-worked area 72 exists between the position B1 of the hailed work vehicle 100 and the hailing point B2. In this case, as shown in FIG. 11B, the ECU 185 determines as the travel route a linear path P3 that goes from the position B1 of the work vehicle 100 when hailed to the hailing point B2. For example, a path that connects the following may be determined as a travel route P3: a straight line P3a that extends a relatively short predetermined distance (e.g., about 1 m) along the main paths P1 from the position B1 of the work vehicle 100 when hailed; an arc of a circle C1 with a predetermined radius that is tangent to the straight line P3a; and a straight line P3b that is tangent to the circle C1 and extends to the hailing point B2.

In each of the above examples, the work vehicle 100 is being hailed while traveling along a linear main path P1 within the work area 70. Without being limited to such examples, the work vehicle 100 may be hailed while turning in a headland 80. Hereinafter, several example methods of generating a travel route in such a case will be described.

Figure 12A:
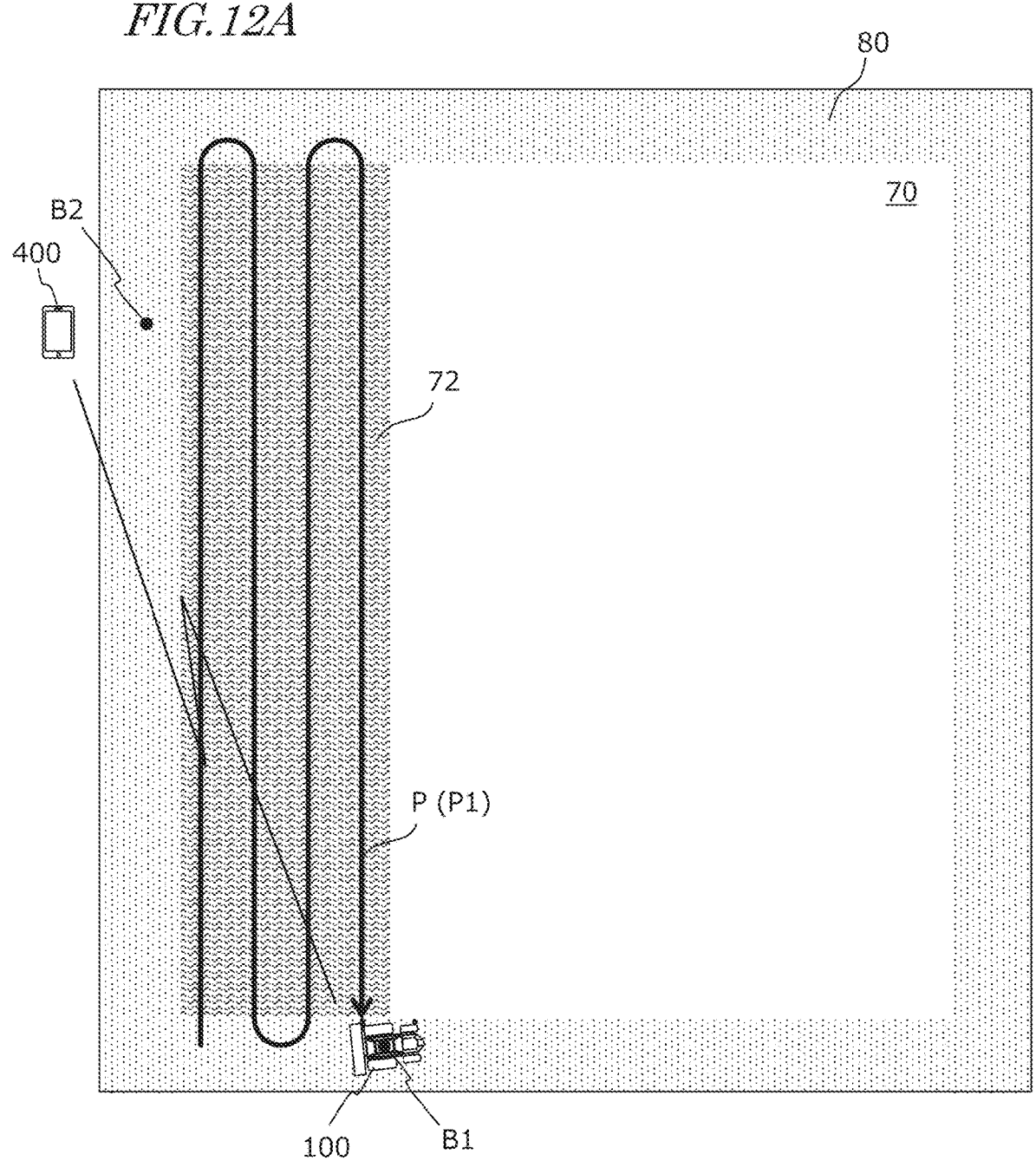
FIG. 12A is a diagram schematically showing still another example situation where a work vehicle is hailed from a hailing terminal.
Figure 12B:
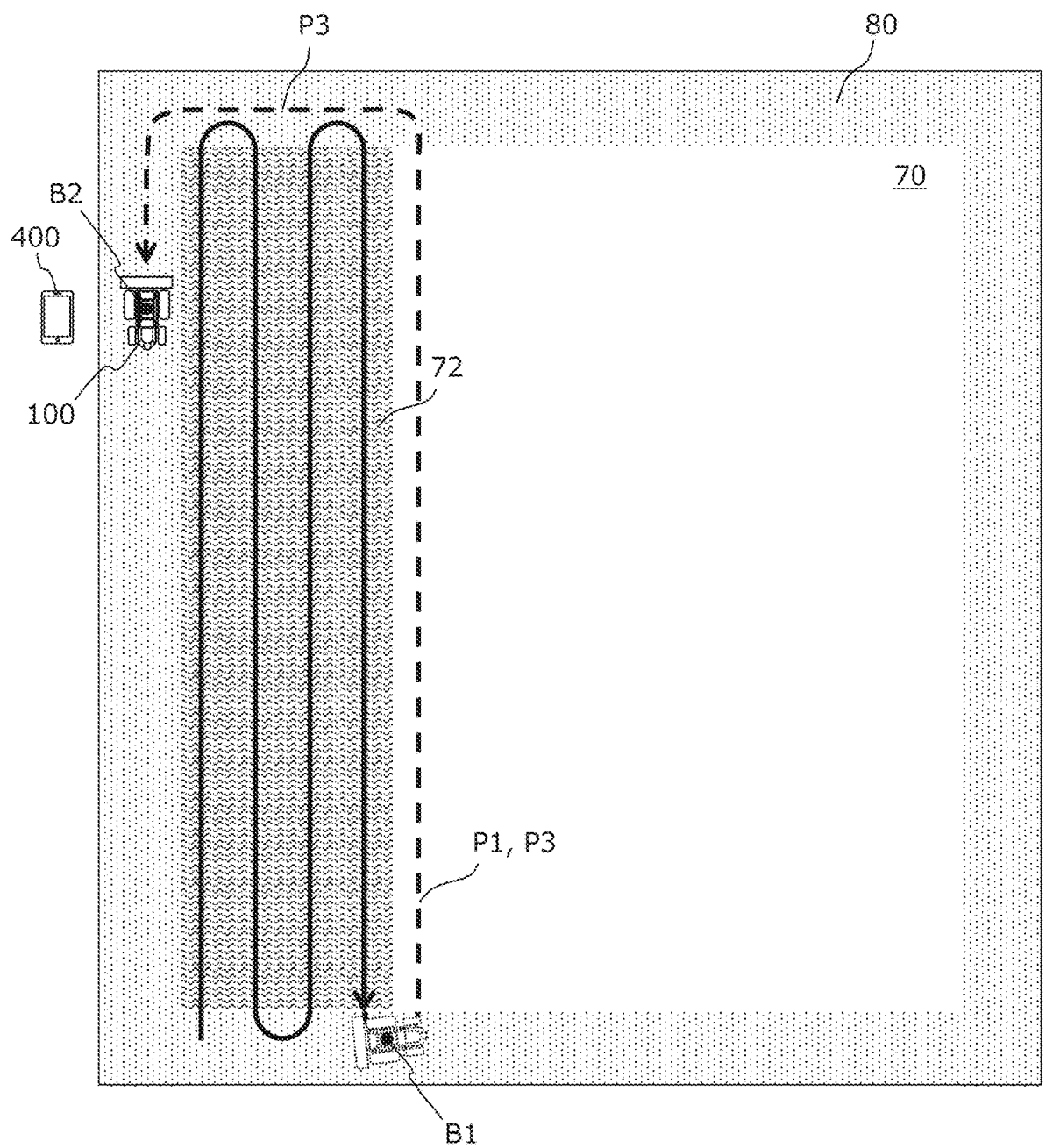
FIG. 12B is a diagram showing an example of a travel route that is generated in the example of FIG. 12A.

FIG. 12A is a diagram showing an example case where the work vehicle 100 is hailed from the hailing terminal 400 while turning in a headland 80. In such an example, the ECU 185 generates a travel route only after the work vehicle 100 finishes the turn and begins traveling along the next main path P1. In the example of FIG. 12A, an already-worked area 72 exists between the position B1 of the work vehicle 100 and the hailing point B2, and the hailing point B2 is relatively far from the work vehicle 100. In such a case, as shown in FIG. 12B, the ECU 185 determines as the travel route P3 a path that goes straight along the next main path P1 to the headland 80 on the opposite side and leads toward the hailing point B2 along the outer periphery of the already-worked area 72. The method of path generation in this case is similar to that of the example shown in FIG. 9B.

Figure 13A:
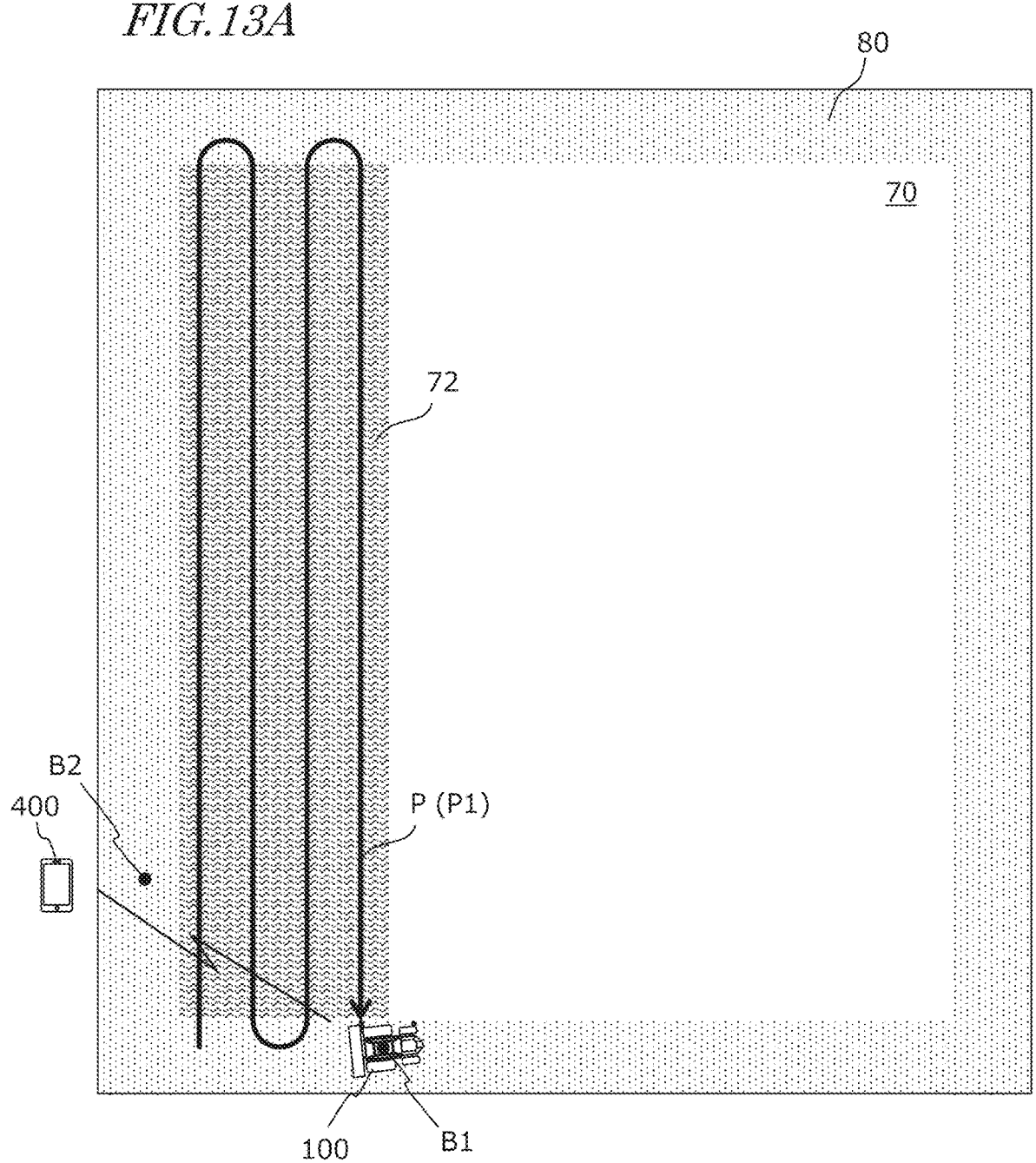
FIG. 13A is a diagram schematically showing still another example situation where a work vehicle is hailed from a hailing terminal.
Figure 13B:
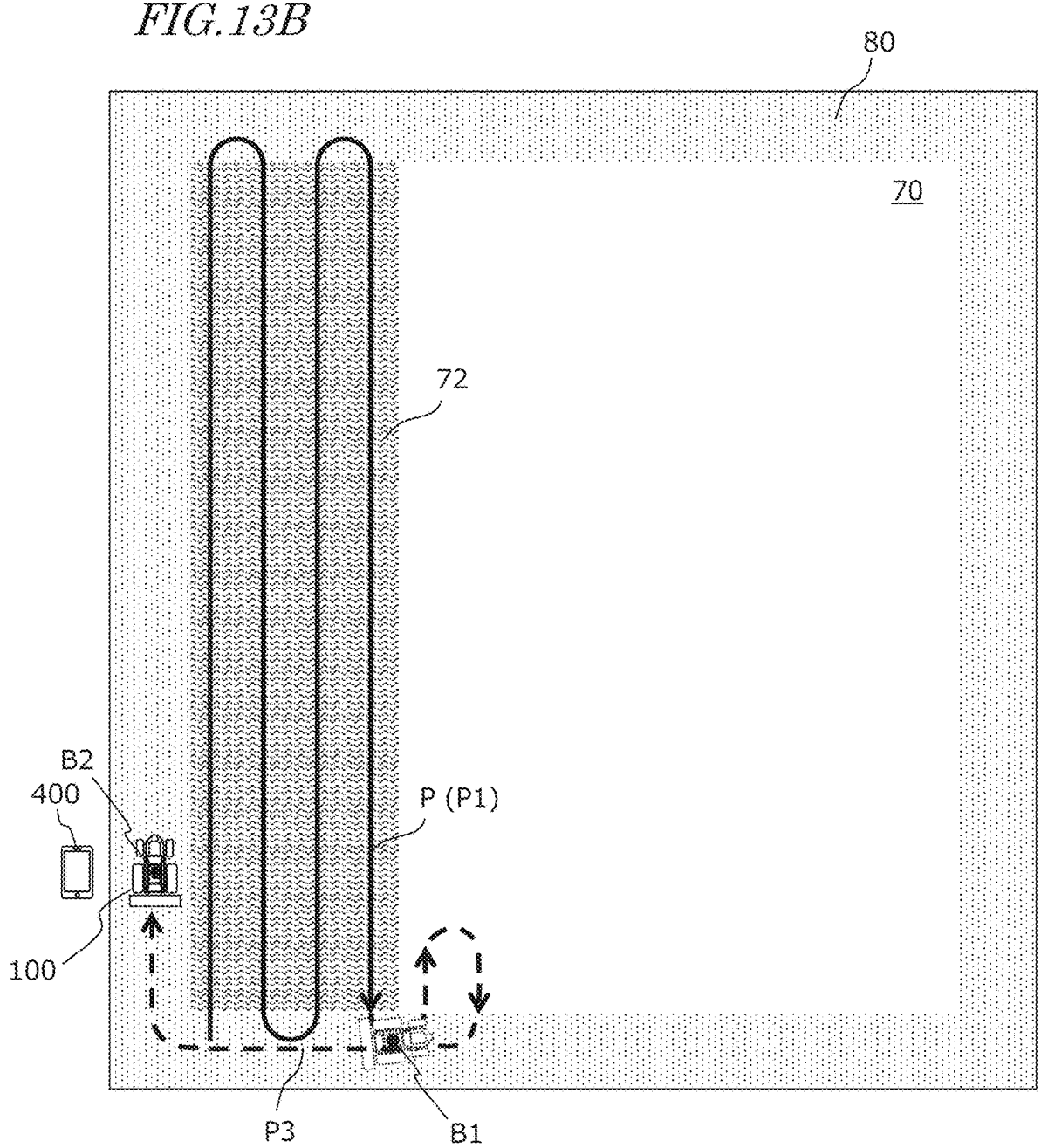
FIG. 13B is a diagram showing an example of a travel route that is generated in the example of FIG. 13A.

FIG. 13A is a diagram showing another example case where the work vehicle 100 is hailed from the hailing terminal 400 while turning in a headland 80. In this example, an already-worked area 72 exists between the position B1 of the work vehicle 100 and the hailing point B2, and the hailing point B2 is relatively close to the work vehicle 100. In this case, too, the ECU 185 generates a travel route only after the work vehicle 100 finishes the turn and begins traveling along the next main path P1. As shown in FIG. 13B, the ECU 185 determines as the travel route P3 a path that once goes a predetermined distance (e.g., about 1 m) along the next main path P1, thereafter turns toward an opposite side of where the already-worked area 72 exists and then goes straight in the opposite direction, and thereafter leads toward the hailing point B2 along the outer periphery of the already-worked area 72. The method of path generation in this case is similar to that of the example shown in FIG. 10B.

Figure 13C:
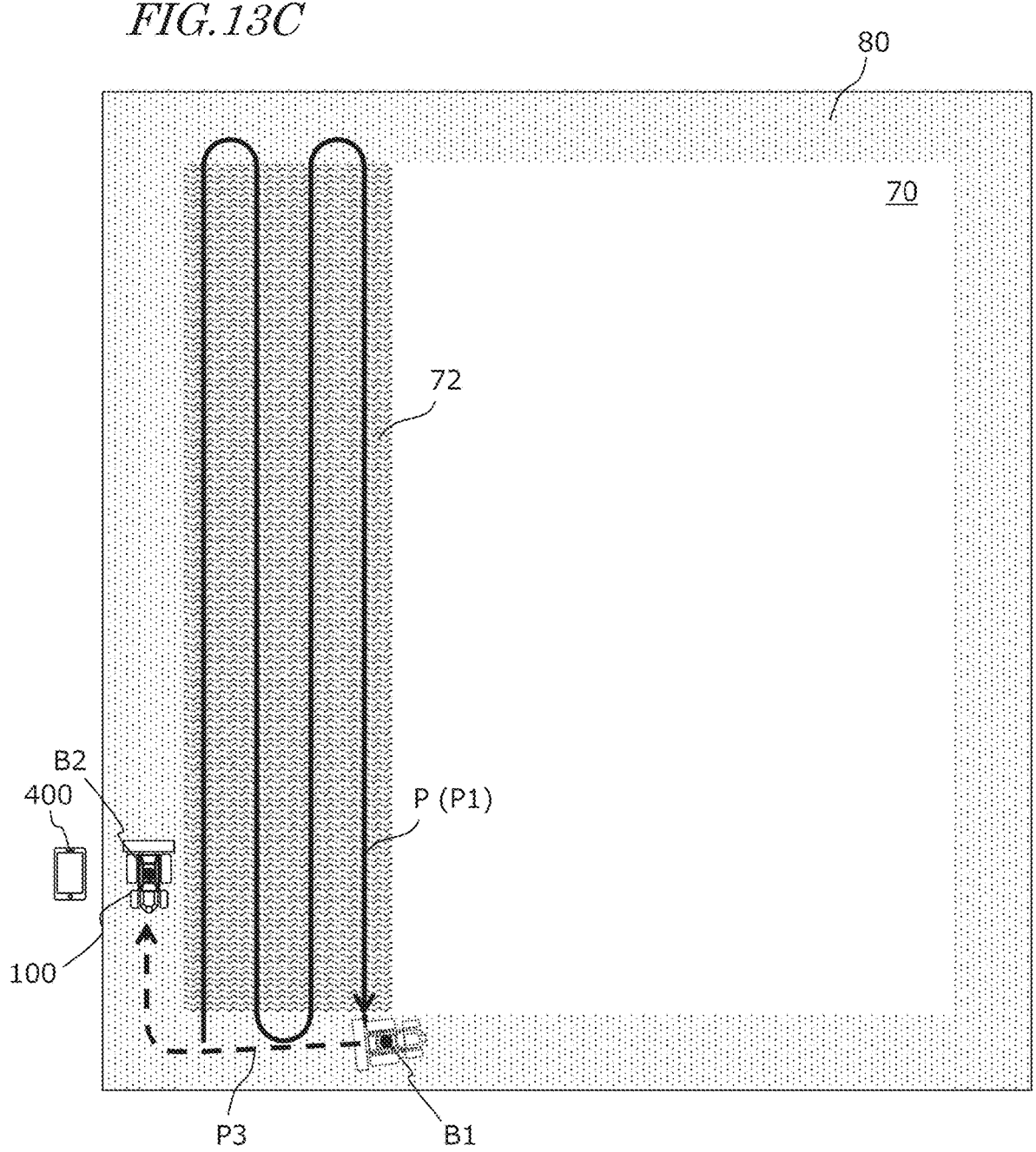
FIG. 13C is a diagram showing another example of a travel route that is generated in the example of FIG. 13A.

When the hailing point B2 is close to the position B1 of the hailed work vehicle 100 and the hailing point B2 is closer to the rear side of the work vehicle 100, as in the example of FIG. 13B, the work vehicle 100 may travel backward, i.e., back up, to head toward the hailing point. For example, as shown in FIG. 13C, the ECU 185 may generate a travel route P3 such that the work vehicle 100 travels backward to head for the hailing point B2. In this example, too, the travel route P3 may be generated by connecting a plurality of straight lines and a circular arc. In this case, the ECU 184 causes the work vehicle 100 to move to the hailing point B2 by traveling backward along the travel route P3. Thus, when the relative positions concerning the position of the hailed work vehicle 100 and the hailing point B2 and the orientation of the work vehicle 100 satisfy a predetermined condition, the controller 180 may cause the work vehicle 100 to move toward the hailing point B2 by traveling backward. This allows for reducing the length of time before arriving at the hailing point B2.

Figure 14A:
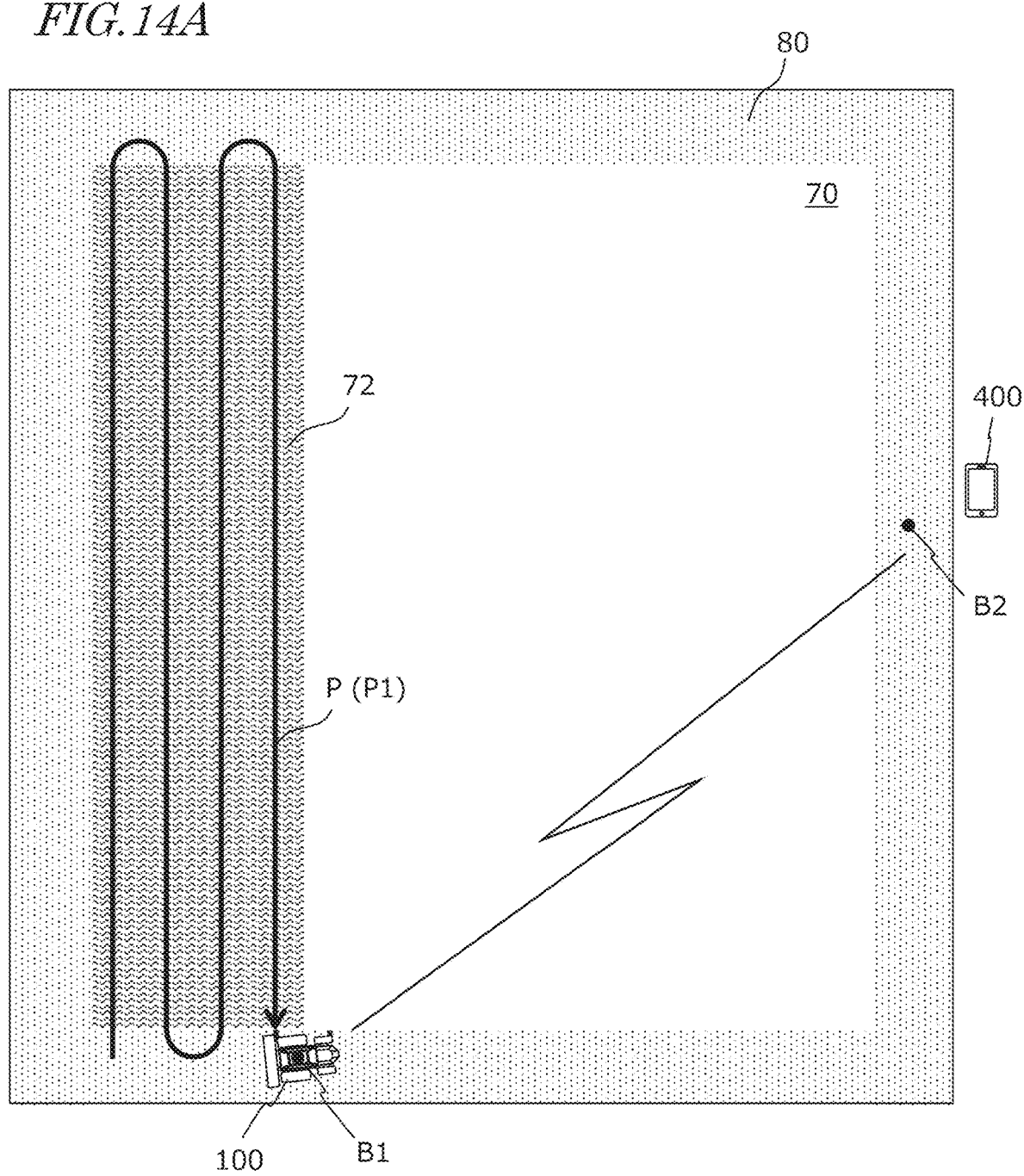
FIG. 14A is a diagram schematically showing still another example situation where a work vehicle is hailed from a hailing terminal.
Figure 14B:
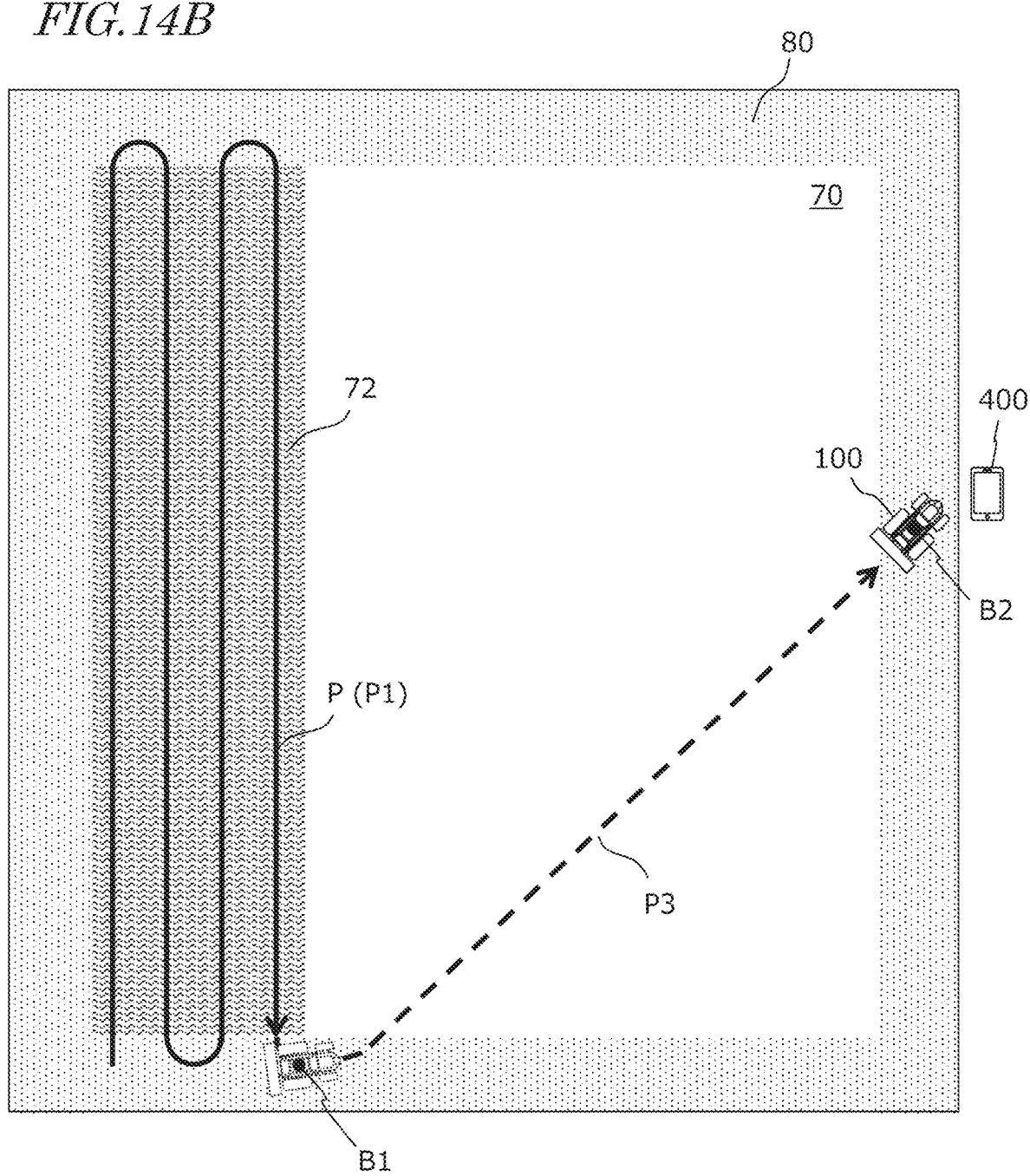
FIG. 14B is a diagram showing an example of a travel route that is generated in the example of FIG. 14A.

FIG. 14A is a diagram showing still another example case where the work vehicle 100 is hailed from the hailing terminal 400 while turning in a headland 80. In this example, no already-worked area 72 exists between the position B1 of the work vehicle 100 and the hailing point B2. In such a case, as shown in FIG. 14B, the ECU 185 determines as the travel route P3 a linear path that goes from the position B1 to the position B2. The method of path generation in this case is similar to that of the example shown in FIG. 11B.

Through the above operation, without stepping on the already-worked area 72, the work vehicle 100 is able to arrive at the hailing point B2 in a short time. Note that the method of generating the travel route P3 in each of the above examples is only exemplary. The travel route P3 may be generated by methods which are different from those described above.

Next, with reference to FIG. 15, an example method of generating a travel route by the ECU 185 will be described in more detail.

Figure 15:
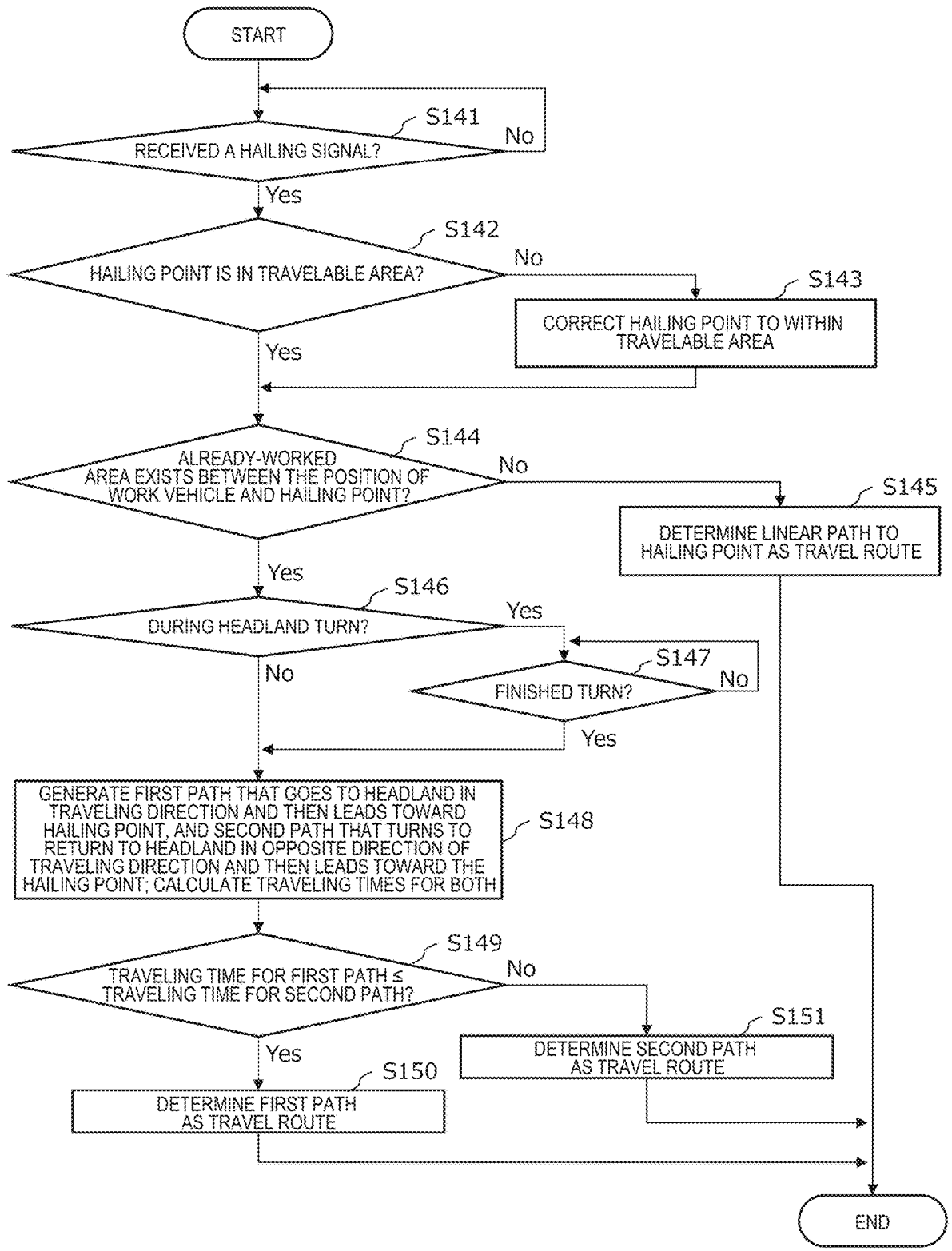
FIG. 15 is a flowchart showing an example method of generating a travel route.

FIG. 15 is a flowchart showing an example method of generating a travel route by the ECU 185. In this example, while the work vehicle 100 is automatically performing tasked travel, the ECU 185 determines whether the communicator 190 has received a hailing signal or not (step S141). If a hailing signal is received, the ECU 185 determines whether or not a hailing point indicated by the positional information included in the hailing signal is within a travelable area or not (step S142). A travelable area means a region of the field in which travel of the work vehicle 100 is permitted. A travelable area may be a region that is inside the field but is outside the already-worked area, such that the region is at a certain distance or more from both of the outer periphery of the field and the already-worked area, for example. The certain distance may have a value that is greater than a half of the working breadth of the work vehicle 100, for example. The travelable distance may be previously set, e.g., before self-driving is begun. If the hailing point is within the travelable area, control proceeds to step S144. If the hailing point is not within the travelable area, control proceeds to step S143. At step S143, the ECU 185 corrects the hailing point to a point within the travelable area. The correction may be made so that the distance between the original hailing point and the corrected hailing point becomes smallest, for example. After step S143, control proceeds to step S144.

At step S144, the ECU 185 determines whether an already-worked area exists between the position of the work vehicle 100 and the hailing point or not. For example, the ECU 185 determines whether a straight line connecting the position of the work vehicle 100 as identified by the positioning device 110 and the hailing point overlaps an already-worked area or not, the straight line having a predetermined width (e.g., the working breadth or a greater width). If such a straight line overlaps an already-worked area, it may be determined that the already-worked area exists between the position of the work vehicle 100 and the hailing point. If no already-worked area exists between the position of the work vehicle 100 and the hailing point, the ECU 185 determines as the travel route a linear path that goes from the position of the work vehicle 100 to the hailing point (step S145). Herein, the "linear path" may not only be a completely linear path, but also be a path that partly includes a curved or bent-line portion as illustrated in FIG. 11B or FIG. 14B. The ECU 185 may adjust the angle and length of any straight line, the position and radius of curvature of any curved portion, etc., in the travel route so that the work vehicle 100 does not step on the already-worked area.

If any already-worked area exists between the position of the work vehicle 100 and the hailing point, the ECU 185 determines whether the work vehicle 100 is turning in a headland or traveling along a main path (step S146). If the work vehicle 100 is traveling along a main path, control proceeds to step S148. If the work vehicle 100 is turning in a headland, control waits until the work vehicle 100 finishes the turn and begins traveling along a main path (step S147). Once the work vehicle 100 finishes the turn and begins traveling along a main path, control proceeds to step S148.

At step S148, the ECU 185 generates a first path that goes toward the headland in the traveling direction of the work vehicle 100 and then leads toward the hailing point along the outer periphery of the already-worked area, and a second path that turns to return to the headland in the opposite direction of the traveling direction and then leads toward the hailing point along the outer periphery of the already-worked area, and calculates traveling times for both. The first path is a path such as the travel route P3 shown in FIG. 9B and FIG. 12B, for example. The second path is a path such as the travel route P3 shown in FIG. 10B and FIG. 13B, for example. The ECU 185 compares the traveling time for the first path and the traveling time for the second path (step S149). If the traveling time for the first path is equal to or shorter than the traveling time for the second path, the ECU 185 determines the first path as the travel route (step S150). On the other hand, if the traveling time for the first path is longer than the traveling time for the second path, the ECU 185 determines the second path as the travel route (step S151).

Through the above operation, the ECU 185 can generate an appropriate travel route in accordance with the position of the work vehicle 100 when hailed, the position of the hailing point, and the already-worked area. By traveling along the travel route that is generated through such an operation, the work vehicle 100 is able to arrive at the hailing point in a relatively short time without stepping on the already-worked area.

Note that the method path generation shown in FIG. 15 is only an example, and permits modification as necessary. For example, instead of performing the operation from steps S148 to S151, only the first path may be generated, and this may be determined as the travel route. Alternatively, as in the example of FIG. 13C, a path that goes backward and leads toward the hailing point may be determined as the travel route when a predetermined condition is satisfied.

The system may be configured so that the user is able to change the hailing point while the work vehicle 100 is traveling along the travel route. For example, the system may be configured so that a user holding the hailing terminal 400 is allowed to move while the work vehicle 100 is moving along the travel route, and again perform a hailing manipulation at the point to which the user has moved, thus being able to change the hailing point. In that case, the ECU 185 may be configured to, after generating the travel route and upon again receiving a hailing signal, again perform the operation shown in FIG. 15, for example, and modify the travel route. The modified travel route is also generated so as not to go through the already-worked area.

The work vehicle 100 stops upon arriving at the hailing point. The work vehicle 100 also stops when the obstacle sensors 130 detect the user of the hailing terminal 400 or any other obstacle before arriving at the hailing point. When it has stopped upon detecting an obstacle, the work vehicle 100 may again start moving toward the hailing point as the obstacle goes out of the detectable range. In each of the above examples, the orientation of the stopping work vehicle 100 depends on the direction of the end of the travel route. The orientation of the stopping work vehicle 100 can be designated by the user. For example, the user may have the ability to designate the orientation of the stopping work vehicle 100 by manipulating the hailing terminal 400, so that the work vehicle 100 will stop in an orientation that is suitable for refilling the material or performing other tasks, or in an orientation that permits easy riding. The designation of the stopping orientation may be made before hailing the work vehicle 100, or while the work vehicle 100 is traveling along the travel route. When the user performs a manipulation of designating the stopping orientation, the hailing terminal 400 transmits to the work vehicle 100 a hailing signal including not only the positional information of the hailing point but also information for designating the orientation of the work vehicle 100 at the hailing point. The ECU 185 generates the travel route so as to halt the work vehicle 100 in the orientation that is indicated by the information.

In each of the above examples, the ECU 185 determines as the position of the hailing point a position that is determined by the GNSS receiver 410 of the hailing terminal 400, or a position that results from correcting this position. In other words, the ECU 185 determines the position of the hailing point based on the positional information of the hailing terminal 400 itself. However, the present disclosure is not limited to such an implementation. For example, the user may be able to designate a desired position as the hailing point by manipulating the hailing terminal 400.

Figure 16A:
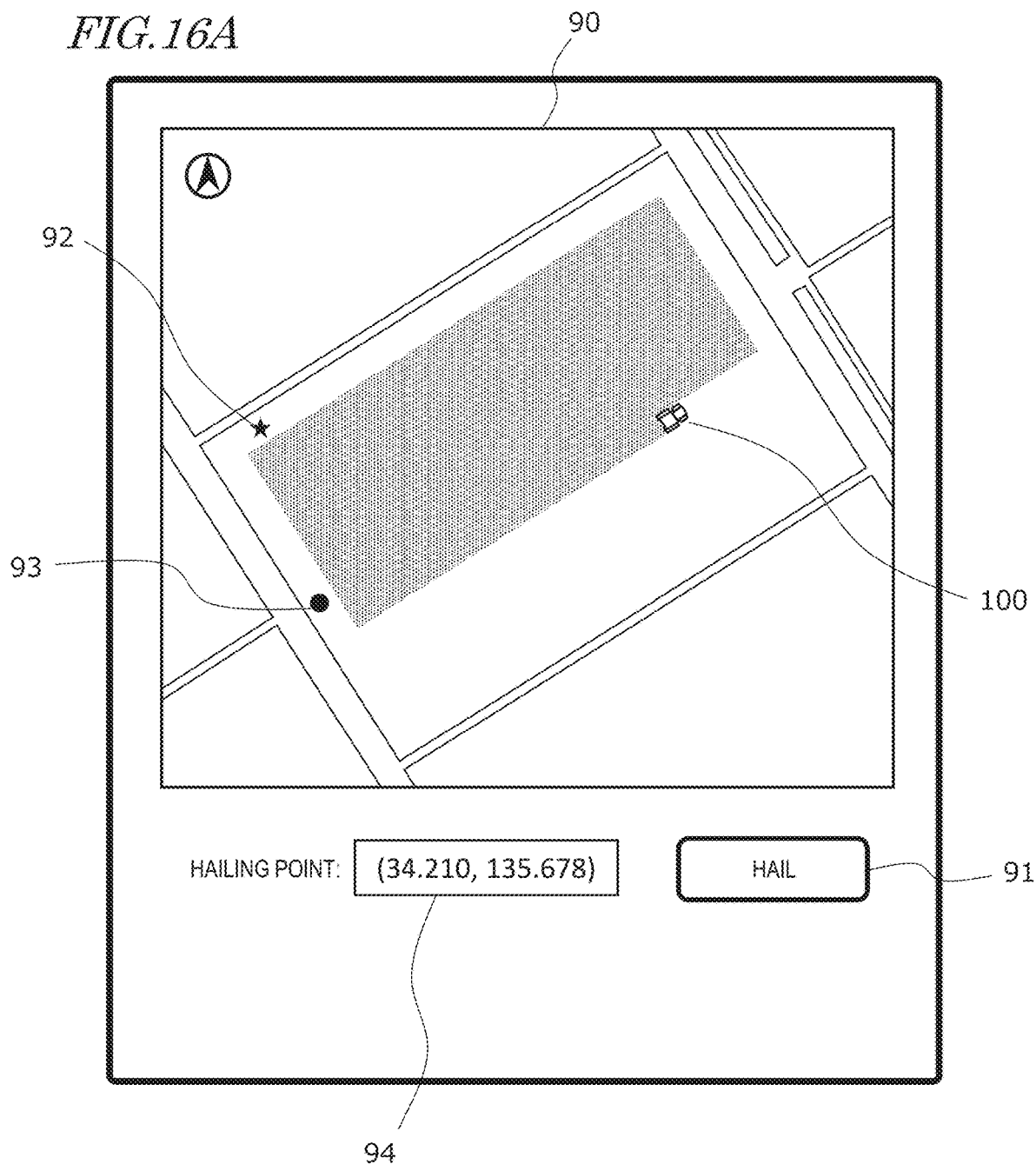
FIG. 16A is a diagram showing an example of a graphical user interface (GUI) that allows a user to designate a hailing point in hailing the work vehicle.

FIG. 16A is a diagram showing an example of a graphical user interface (GUI) that allows a user to designate a hailing point in hailing the work vehicle 100. A display screen as shown in FIG. 16A may be displayed on the display device 430 of the hailing terminal 400. This display screen includes a map 90 of the field (e.g., an areal photograph), and a button 91 for instructing the work vehicle 100 to be hailed. By performing a manipulation of tapping or clicking, etc., on a desired point on the map 90 of the field, the user can designate a hailing point. In the example of FIG. 16A, a mark 92 representing the designated hailing point and a mark 93 representing the current position are displayed on the map 90, together with coordinates (e.g., latitude and longitude) of the designated hailing point. After designating the hailing point, the user may press the button 91 to hail the work vehicle 100 to the hailing point. In this example, when the button 91 is pressed, the hailing terminal 400 transmits a hailing signal including positional information (e.g., coordinate values such as latitude and longitude) of the designated hailing point to the work vehicle 100. Upon receiving the hailing signal, the controller 180 of the work vehicle 100 generates a travel route, and causes a travel along the travel route to begin.

The system may be configured so that the user is able to designate one or more passage points for the travel route to go through. For example, the GUI shown in FIG. 16A may further implement a function of designating a passage point (s). In that case, the hailing terminal 400 transmits to the work vehicle 100 a hailing signal that includes information indicating one or more passage points in addition to the positional information of the hailing point. The controller 180 of the work vehicle 100 generates a travel route so as to go through the passage point (s), and controls the work vehicle 100 so as to head toward the hailing point by going through the one or more passage points.

FIG. 16B is a diagram showing an example of a GUI that allows the hailing point to be changed after a hailing operation is performed. After the user has performed a hailing operation and the work vehicle 100 has begun traveling along the travel route, a screen as shown in FIG. 16B may be displayed on the hailing terminal 400. The user is able to change the designated hailing point. On the map 90 of the field, the user may perform a manipulation of tapping on a position corresponding to the changed hailing point and press a "CHANGE HAILING POINT" button 96, thus being able to change the hailing point. When the button 96 is pressed, the hailing terminal 400 transmits a hailing signal including positional information of the changed hailing point to the work vehicle 100. Upon receiving this hailing signal, the ECU 185 of the work vehicle 100 modifies the travel route so as to head toward the changed hailing point. The ECU 184 controls the work vehicle 100 so as to head toward the changed hailing point along the modified travel route. The display screen shown in FIG. 16B also includes a cancel button 95. By pressing the cancel button 95, the user is able to cancel hailing of the work vehicle 100. When the button 95 is pressed, the work vehicle 100 stops heading toward the hailing point. In this case, the work vehicle 100 may automatically return to the point at which it was hailed during tasked travel and restart the tasked travel, or stop in its place to wait for an instruction from the user.

The work vehicle 100 may be configured to, after the refilling or other tasks at the hailing point are completed, automatically return to the point at which it stopped its tasked travel because of being hailed, and restarted the tasked travel. For example, work vehicle 100 may be configured to restart tasked travel as the user having finished refilling or other tasks performs a manipulation of restarting the tasked travel by using the hailing terminal 400.

FIG. 16C is a diagram showing an example of a GUI for causing the work vehicle 100 to restart tasked travel. In this example, when the work vehicle 100 arrives at a hailing point, a screen as shown in FIG. 16C is displayed on the hailing terminal 400. By pressing a "RESTART TASKED TRAVEL" button 97, the user is able to instruct the work vehicle 100 to restart tasked travel. When the button 97 is pressed, the hailing terminal 400 transmits to the work vehicle 100 a signal for causing tasked travel to be restarted (hereinafter referred to as a "return signal"). Upon receiving this return signal, the controller 180 of the work vehicle 100 controls the drive device 140 to return to the point at which the work vehicle 100 stopped tasked travel and to restart tasked travel.

In the case of implementing this function, when the work vehicle 100 has stopped agricultural work, the controller 180 causes the position of that point (hereinafter referred to as a "stopping point") to be stored to the storage device 170. The controller 180 causes the work vehicle 100 to stop agricultural work when causing the work vehicle 100 to begin moving along the travel route in response to the hailing signal or while causing the work vehicle 100 to move along the travel route. At the timing of stopping, the controller 180 causes the position of the stopping point to be stored to the storage device 170. After the work vehicle 100 has been hailed to the hailing point, upon receiving a return signal, the ECU 185 of the controller 180 generates a return route that goes back to the stopping point without going through the already-worked area. The return route may be a path that goes in the opposite direction along the travel route, for example. If it is difficult to turn at the hailing point and travel forward in the opposite direction along the travel route, it may be permitted to go back to the stopping point by simply traveling backward along the travel route. The ECU 184 of the controller 180 controls the drive device 140 so that the work vehicle 100 moves to the stopping point by traveling forward or traveling backward along the return route, and that the work vehicle 100 restarts tasked travel from the stopping point. Note that, when the work vehicle 100 returns to the stopping point along the return route and restarts agricultural work, it is difficult to return to the stopping point without stepping on the already-worked area at all. Therefore, the work vehicle 100 moving along the return route is allowed to slightly step on the already-worked area. This similarly applies to when the work vehicle 100 moves along the travel route.

Figure 17:
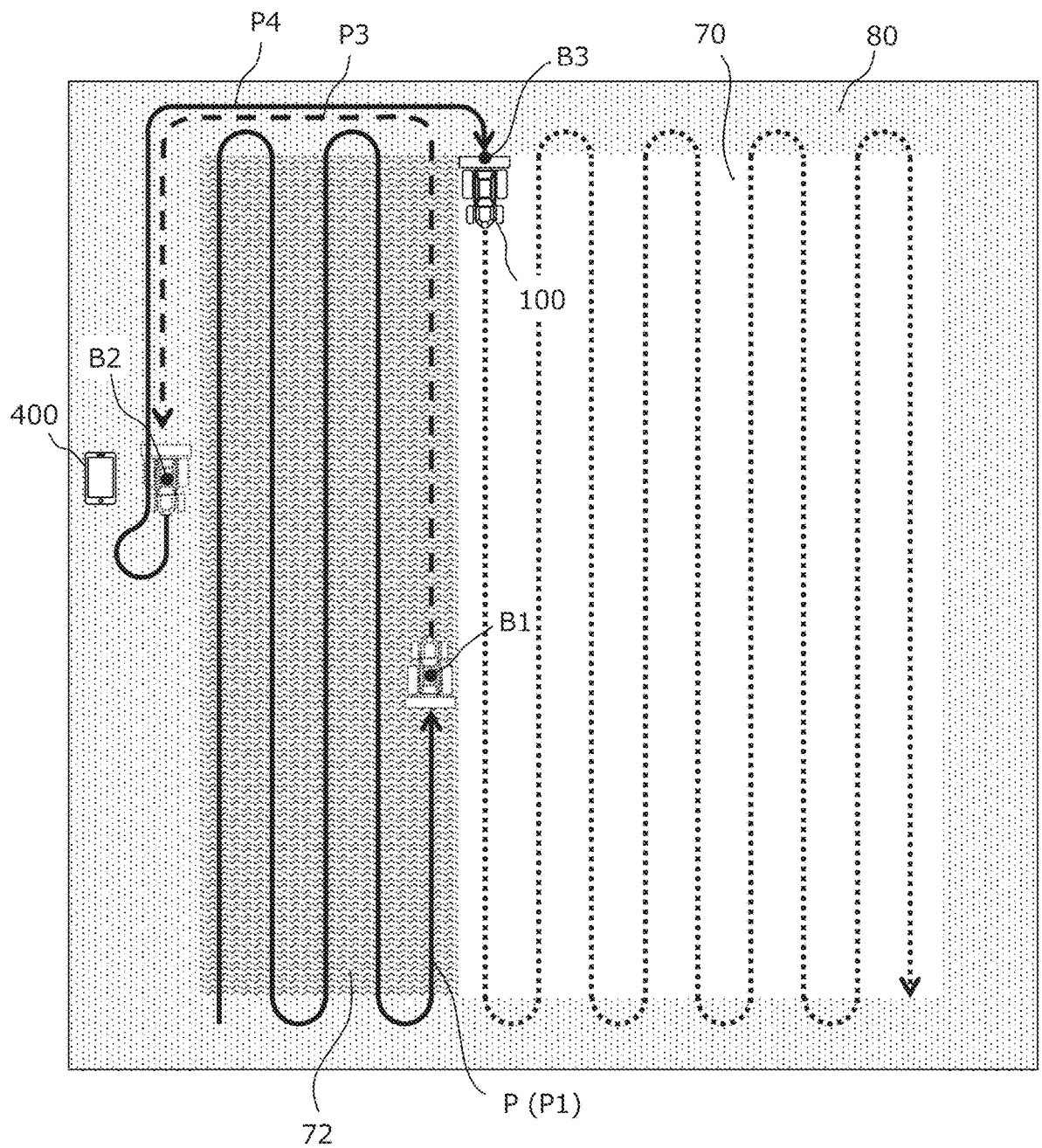
FIG. 17 is a diagram showing an example of a work vehicle that returns from the hailing point to a stopping point along a return route.
Figure 18:
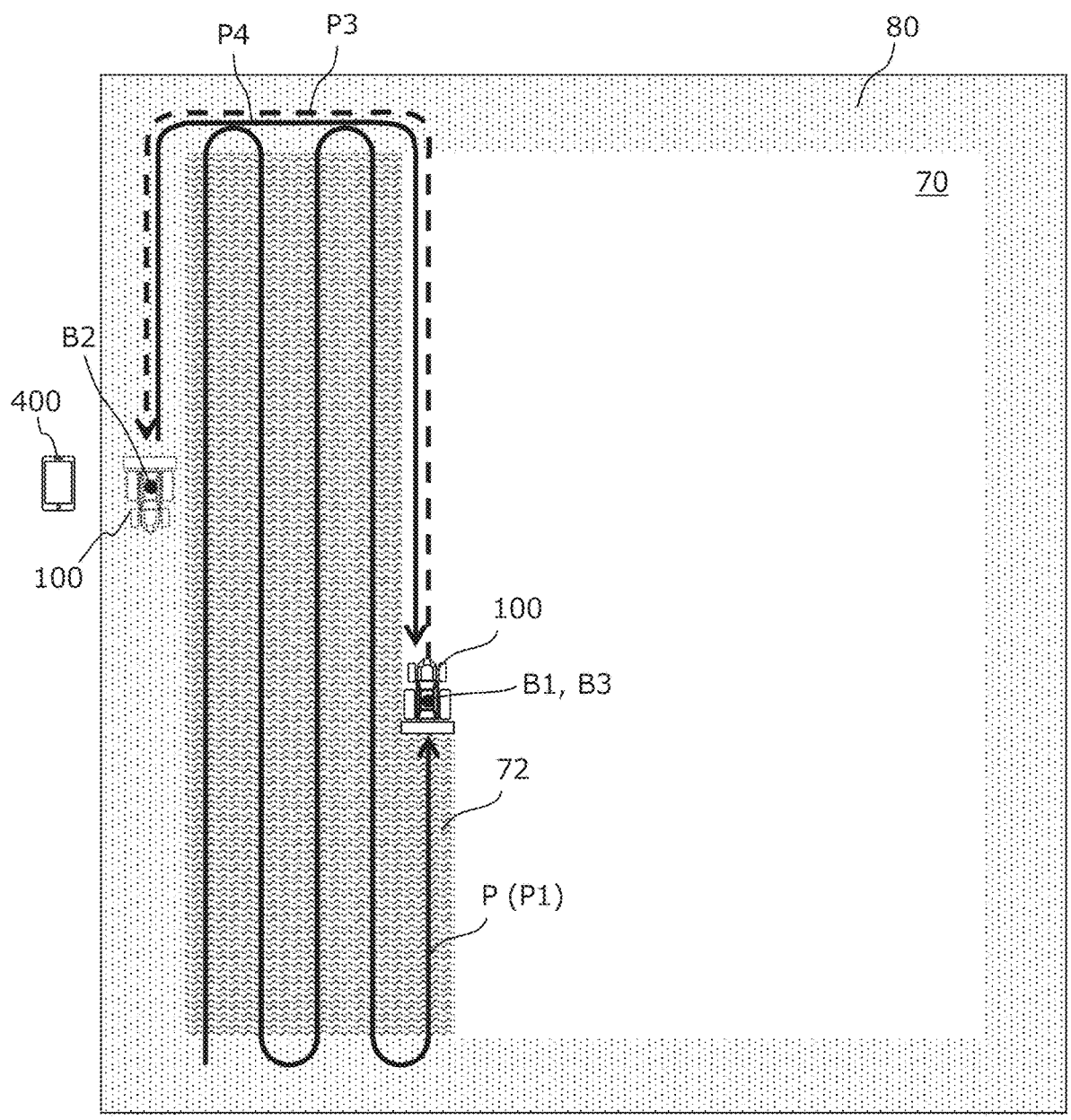
FIG. 18 is a diagram showing another example of a work vehicle that returns from the hailing point to a stopping point along a return route.

FIG. 17 is a diagram showing an example of a work vehicle 100 that returns from the hailing point B2 to a stopping point B3 along a return route P4. In this example, after being hailed at the position B1, the work vehicle 100 continues work while moving along main paths P1 in the target path P, even when moving along the travel route P3 in order to head toward the hailing point B2. After finishing refilling or other tasks at the hailing point B2, the work vehicle 100 generates the return route P4 upon receiving a return signal, and moves to the stopping point B3 along the return route P4. In this example, the work by the work vehicle 100 does not stop in the middle of a row along a main path P1 but is continued through to the end of that row. In such a case, the beginning of the next row is recorded as the stopping point B3, as shown in FIG. 17. In the example of FIG. 17, as compared to the example of FIG. 9B, the space at the hailing point B2 is so wide that a sufficient space exists for the work vehicle 100 to turn. In the case where a sufficient space for turning does not exist unlike in this example, as shown in e.g. FIG. 18, the controller 180 may generate a return route P4 that is a version of the travel route P3 being reversed in direction, and cause the work vehicle 100 to travel backward, i.e., back up, along the return route P4, thus causing it to move to the stopping point B3. In the example of FIG. 18, the work vehicle 100 stops its work when hailed at the position B1, and the position of the stopping point B3 coincides with the position B1.

In each of the above examples, only one work vehicle 100 performs tasked travel within a single field; however, a plurality of work vehicles may simultaneously perform tasked travel within a single field. In that case, if another already-worked area exists in which agricultural work has been performed by another work vehicle when receiving a hailing signal, the ECU 185 in the controller 180 generates a travel route so as to lead toward the hailing point without going through either already-worked area. Hereinafter, such an example case will be described.

Figure 19:
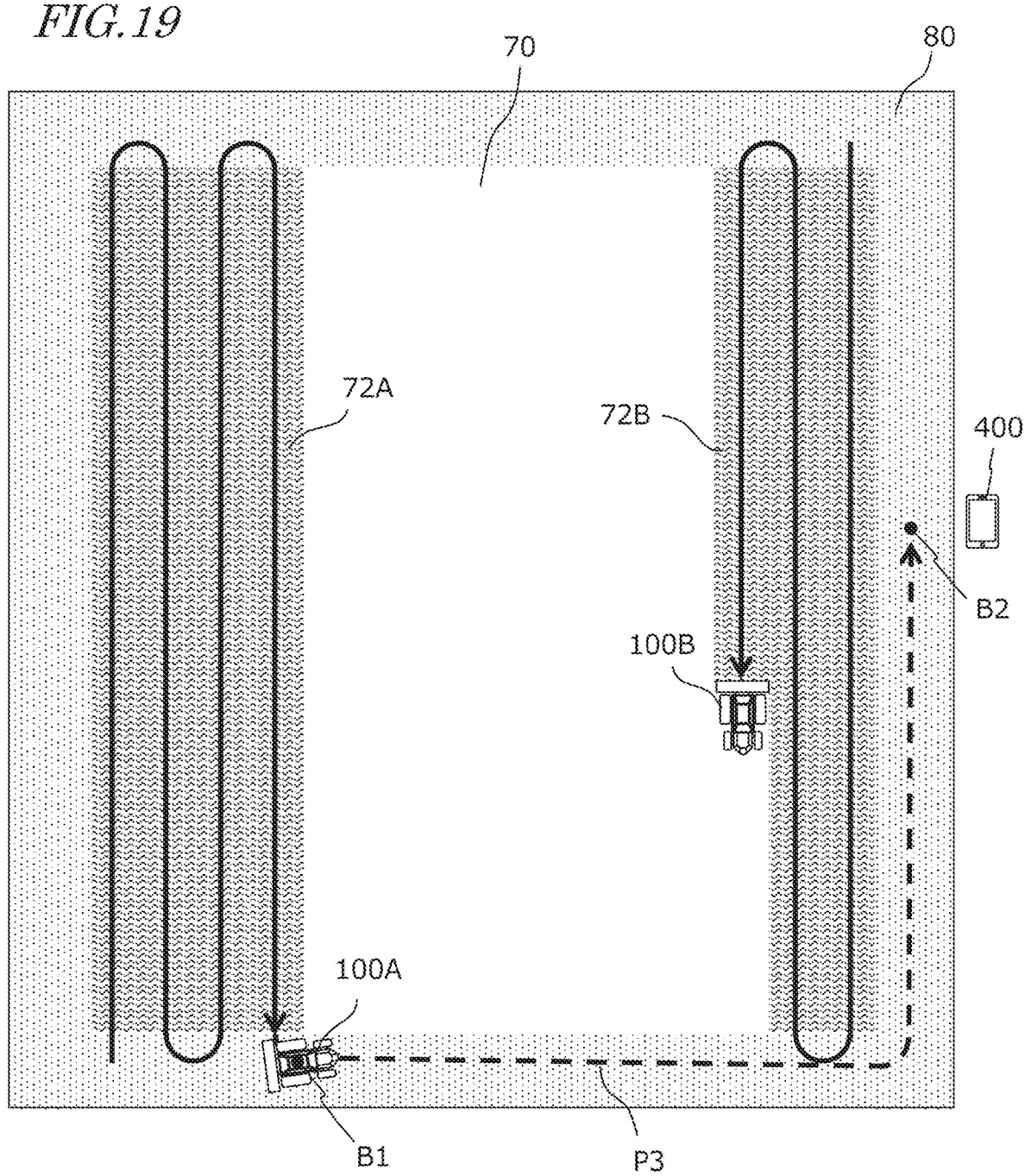
FIG. 19 is a diagram showing an example of a travel route in the case where a plurality of work vehicles perform tasked travel within a single field.

FIG. 19 is a diagram schematically showing an example situation where a first work vehicle 100A and a second work vehicle 100B are simultaneously performing tasked travel within a single field. In this example, the first work vehicle 100A and the second work vehicle 100B are performing work while reciprocating at opposite sides of the field. In such a situation, suppose the first work vehicle 100A is hailed from the hailing terminal 400 in the middle of a turn being made in a headland 80. In this case, unlike in the example shown in FIG. 14B, heading toward the hailing point B2 through a linear path from the position B1 of the hailed first work vehicle 100A will involve going through an already-worked area 72B in which the second work vehicle 100B has performed work. In such a case, the controller 180 of the first work vehicle 100A generates a travel route P3 so as to go through neither the already-worked area 72A, in which the first work vehicle 100A has performed work, nor the already-worked area 72B, in which the second work vehicle 100B has performed work. In the example of FIG. 19, a travel route P3 of an inverted L-shape that follows along the headlands 80 is generated so as to be able to arrive at the hailing point B2 in the shortest time.

Other Preferred Embodiments

Next, other preferred embodiments of the present disclosure will be described.

In the above preferred embodiments, the controller 180 of the work vehicle 100 performs generation of a travel route and the control to cause the work vehicle 100 to travel along the travel route. However, travel route generation may be performed by a device that is distinct from the controller 180. For example, an external computer, e.g., a server, that communicates with the work vehicle 100 may generate a travel route.

Figure 20:
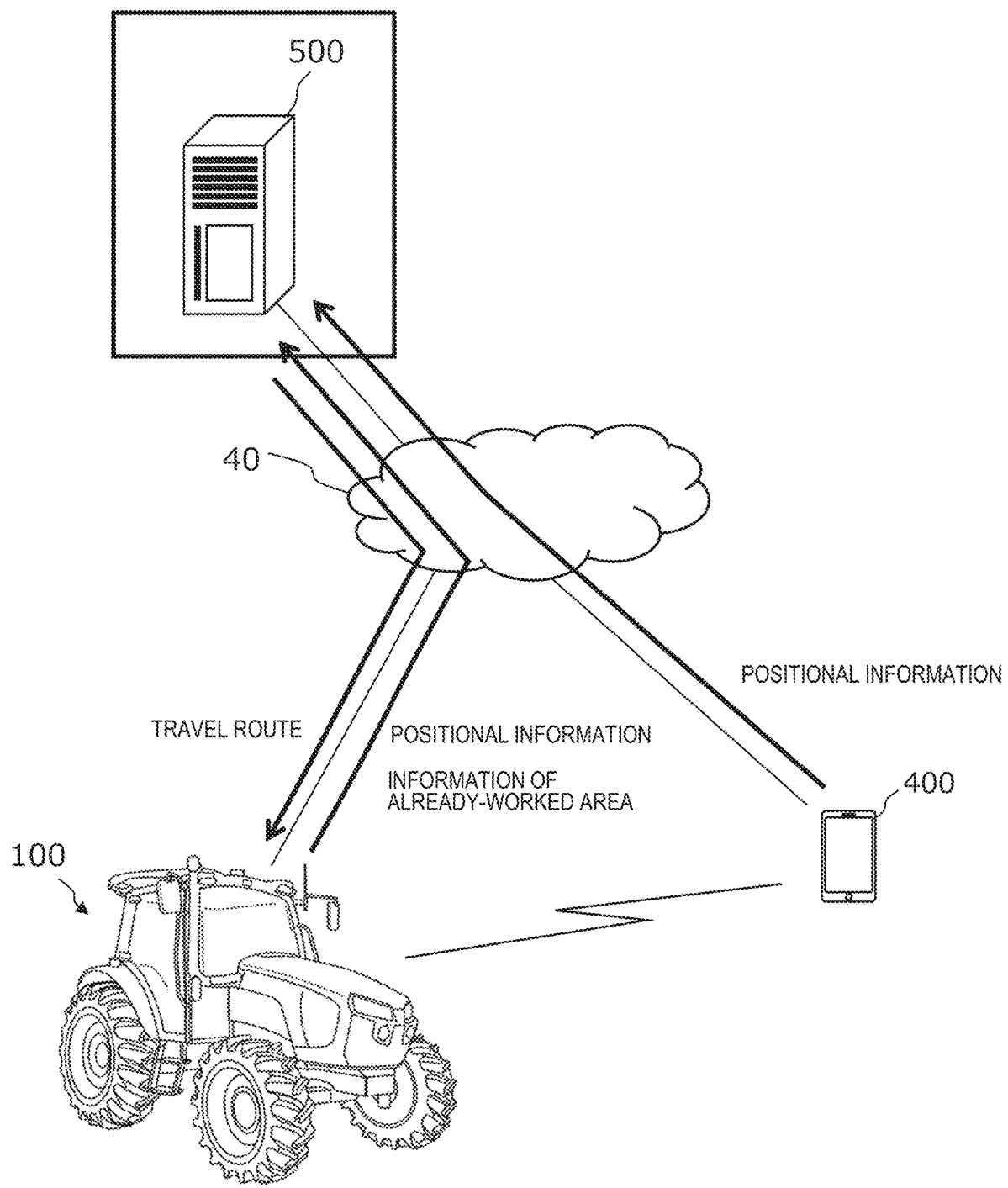
FIG. 20 is a diagram schematically showing an example configuration of a system in which a processing unit that communicates with the work vehicle via a network generates a travel route.

FIG. 20 is a diagram schematically showing the configuration of a system in which a processing unit 500 that communicates with the work vehicle 100 via the network 40 generates a travel route. In this example, rather than the controller 180 of the work vehicle 100, the external processing unit 500 generates a travel route, and transmits this information to the work vehicle 100. The processing unit 500 may be a computer such as a cloud server.

Figure 21:
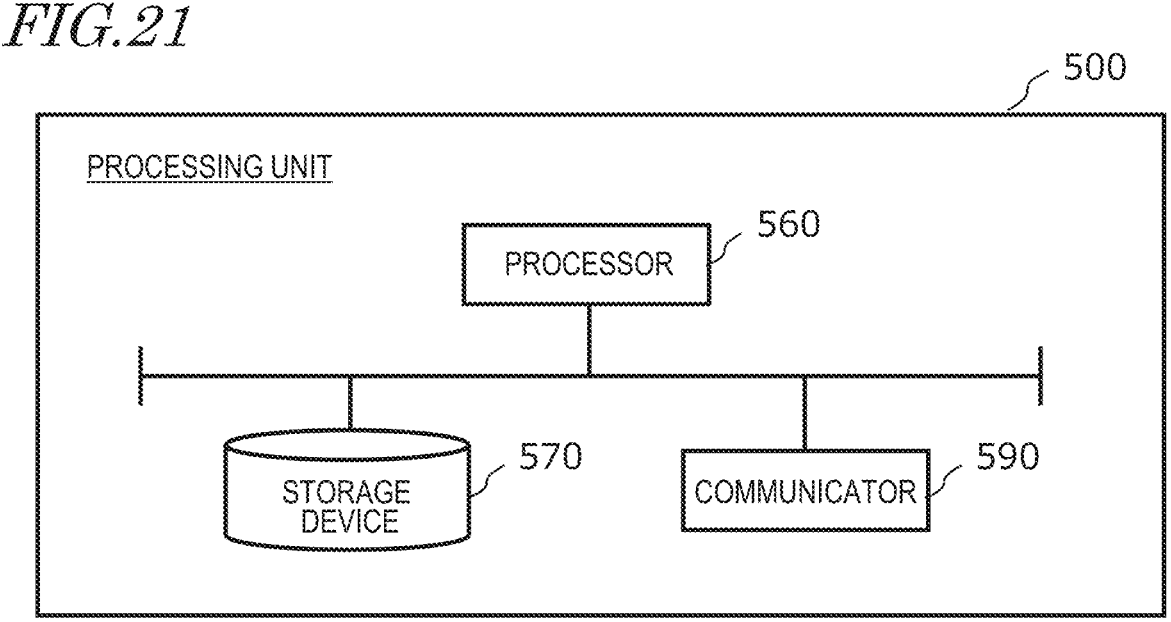
FIG. 21 is a block diagram showing an example configuration for the processing unit.

FIG. 21 is a block diagram showing the configuration of the processing unit 500. The processing unit 500 includes one or more processors 560, a storage device 570, and a communicator 590. The storage device 570 includes a memory in which a computer program to be executed by the processor 560 is stored. The communicator 590 exchanges signals with the communicator 190 of the work vehicle 100 and with the communicator 490 in the hailing terminal 400. In this preferred embodiment, when the hailing terminal 400 hails the work vehicle 100, a signal including positional information of a hailing point is transmitted to the processing unit 500 via the network 40. Based on this positional information and the positional information of the work vehicle 100 and information indicating the already-worked area acquired from the work vehicle 100, the processor 560 of the processing unit 500 generates a travel route by a method similar to that of the foregoing preferred embodiment. The communicator 590 of the processing unit 500 transmits information of the travel route to the work vehicle 100. The work vehicle 100 moves to the hailing point along the travel route. The processor 560 of the processing unit 500 may generate not only the travel route, but also a target path for tasked travel. In that case, the work vehicle 100 may lack the ECU 185 for path generation purposes that is shown in FIG. 3.

Instead of the processing unit 500, the hailing terminal 400 may generate the travel route. In that case, the hailing terminal 400 acquires positional information of the work vehicle 100 and information of the already-worked area from the work vehicle 100 or the processing unit 500. Based on the positional information of the work vehicle 100, the positional information of the hailing point, and the information of the already-worked area, the processor 460 of the hailing terminal 400 generates a travel route. The hailing terminal 400 transmits a hailing signal including the positional information of the hailing point and information of the travel route to the work vehicle 100. Through such an operation, effects similar to those of each of the aforementioned preferred embodiments can be obtained.

In each of the above preferred embodiments, instead of the hailing terminal 400, a monitoring terminal for monitoring the work vehicle 100 may perform the operation of hailing the work vehicle 100. Such a monitoring terminal may be provided at the home or the office of a user who monitors the work vehicle 100, for example.

Figure 22:
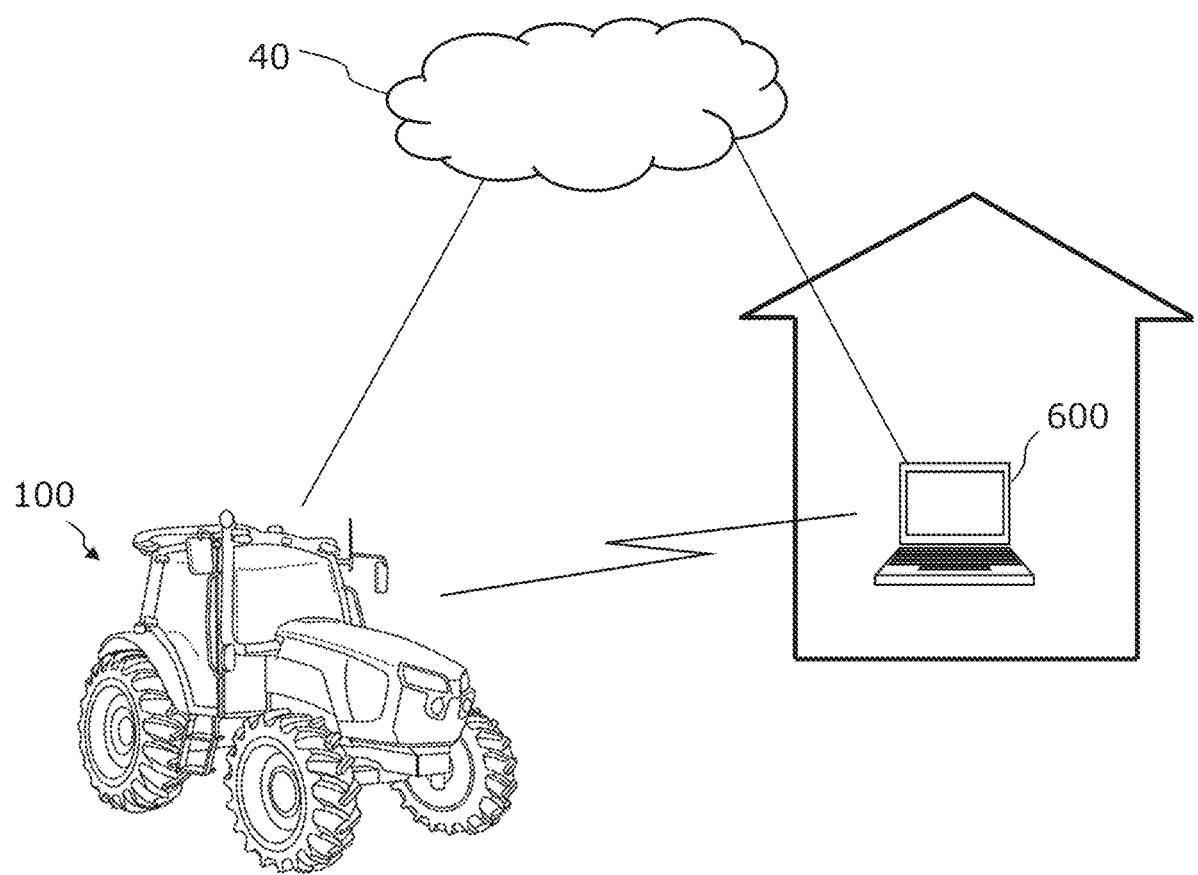
FIG. 22 is a diagram schematically showing an example of a system in which a monitoring terminal hails the work vehicle.

FIG. 22 is a diagram schematically showing an example of a system in which the monitoring terminal 600 hails the work vehicle 100. The monitoring terminal 600 is a laptop computer or a personal computer, for example, and is able to communicate with the work vehicle 100 via the network 40. Note that the monitoring terminal 600 may be a mobile computer such as a smartphone or a tablet computer. By manipulating the monitoring terminal 600, the user is able to hail the work vehicle 100 to a desired point, as in each of the above preferred embodiments. The configuration of the monitoring terminal 600 is similar to the configuration of the hailing terminal 400 shown in FIG. 3. In this example, the configuration of the work vehicle 100 is similar to that in Preferred Embodiment 1. Instead of the ECU 185 in the controller 180 of the work vehicle 100, the monitoring terminal 600 may generate the travel route. In that case, the monitoring terminal 600 acquires positional information of the work vehicle 100 and information of the already-worked area from the work vehicle 100. Based on the positional information of the hailing point, the positional information of the work vehicle 100, and the information of the already-worked area, the monitoring terminal 600 generates the travel route, and transmits this information to the work vehicle 100.

Figure 23:
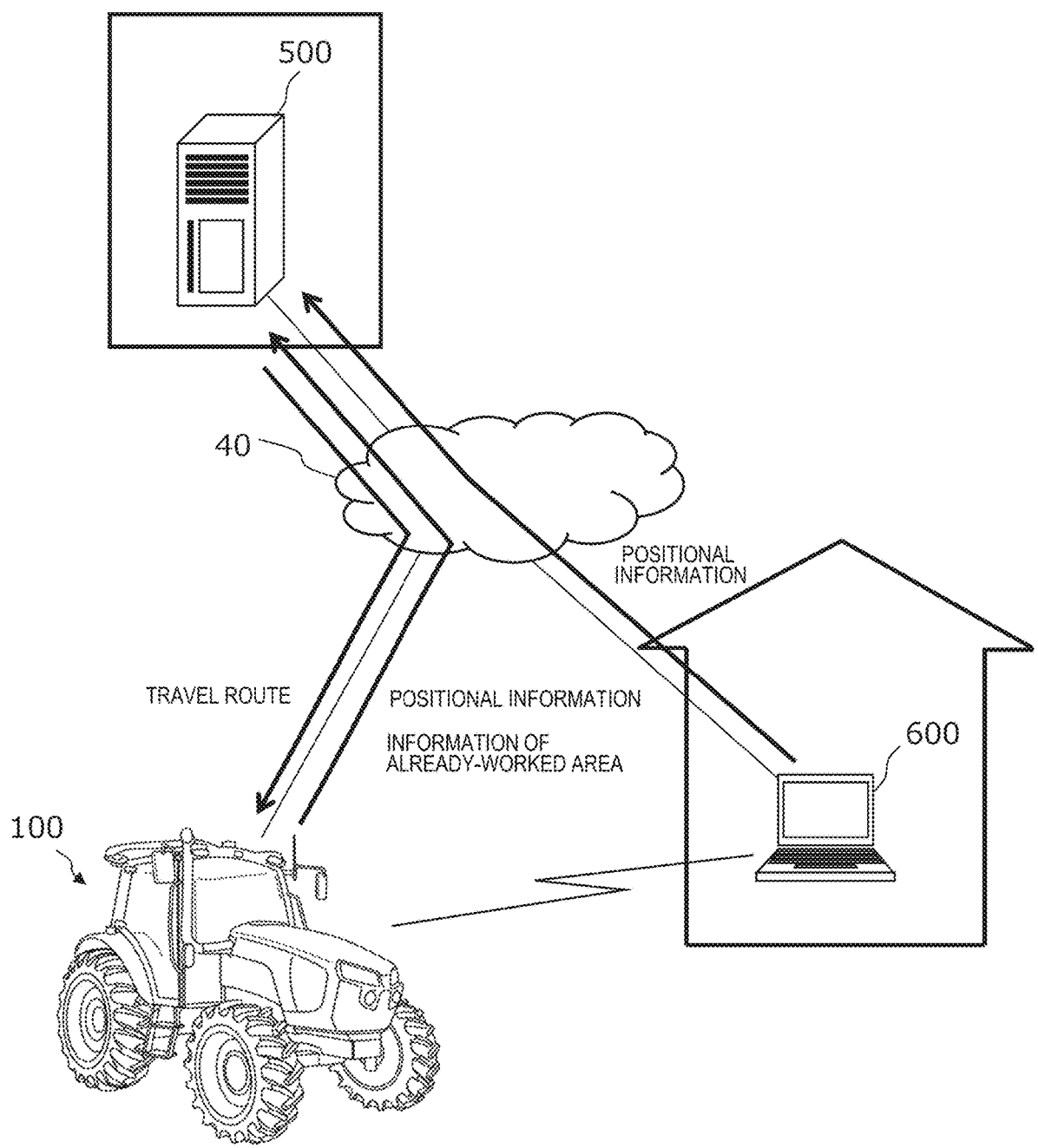
FIG. 23 is a diagram schematically showing another example of a system in which a monitoring terminal hails the work vehicle.

FIG. 23 is diagram schematically showing another example of a system in which the monitoring terminal 600 hails the work vehicle 100. This system corresponds to the system shown in FIG. 20 except that the hailing terminal 400 is replaced by the monitoring terminal 600. In this system, the monitoring terminal 600 transmits positional information of a hailing point to the processing unit 500 on the basis of a user's manipulation. The processing unit 500 generates a travel route similarly to the example of FIG. 20, and transmits it to the work vehicle 100. In this example, too, instead of the processing unit 500, the monitoring terminal 600 may generate the already-worked area, and transmit this information to the work vehicle 100.

Although the work vehicle 100 according to each preferred embodiment may be a tractor, the techniques according to each preferred embodiment is also applicable to vehicles other than tractors as well as to agricultural machines other than vehicles. For example, the techniques according to each preferred embodiment may also be applied to harvesters, rice transplanters, vehicles for crop management, vegetable transplanters, mowers, mobile robots for agriculture, or other agricultural machines.

A device to generate a travel route, and a device to control movement of an agricultural machine according to a travel route in each of the above preferred embodiments can be mounted on an agricultural machine lacking such functions as an add-on. Such a device may be manufactured and sold independently from the agricultural machine. A computer program for use in such a device may also be manufactured and sold independently from the agricultural machine. The computer program may be provided in a form stored in a computer-readable, non-transitory storage medium, for example. The computer program may also be provided through downloading via telecommunication lines (e.g., the Internet).

Thus, the present disclosure encompasses systems, devices, methods, and computer programs as recited in the following examples.

Example A1

An agricultural support system includes a terminal to hail a self-driving agricultural machine to a hailing point, and a processor to generate, in an area excluding an already-worked area of the agricultural machine, a travel route for the agricultural machine to head toward the hailing point.

Example A2

The agricultural support system of Example A1 further includes a controller to control an operation of the agricultural machine so that the agricultural machine moves along the travel route.

Example A3

In the agricultural support system of Example 2, the controller is configured or programmed to cause the agricultural machine to move along the travel route while controlling the agricultural machine to at least partly stop agricultural work.

Example A4

The agricultural support system of any of Examples A1 to A3 further includes a storage to store as the already-worked area an area in which agricultural work has been performed by the agricultural machine, wherein the terminal is operable to transmit a hailing signal including positional information of the hailing point to the processor, and the processor is configured or programmed to generate the travel route based on the positional information and the already-worked area stored in the storage.

Example A5

In the agricultural support system of Example A4, while the agricultural machine is moving along a previously-set target path, the processor is configured or programmed to determine the already-worked area and cause the already-worked area to be stored to the storage based on a position of the agricultural machine as identified by a position sensor and a working breadth of the agricultural machine.

Example A6

In the agricultural support system of any of Examples A1 to A5, when a hailing call is received from the terminal while the agricultural machine is moving along a previously-set target path, the processor is configured or programmed to determine as the travel route a path including a portion of the target path that is located in the traveling direction of the agricultural machine.

Example A7

In the agricultural support system of any of Examples A1 to A6, when the already-worked area does not exist between a position of the agricultural machine when receiving a hailing call from the terminal and the hailing point, the processor is configured or programmed to determine as the travel route a linear path that leads toward the hailing point, and when the already-worked area exists between the position of the agricultural machine and the hailing point, the processor is configured or programmed to determine as the travel route a path that leads toward the hailing point along an outer periphery of the already-worked area.

Example A8

In the agricultural support system of any of Examples A1 to A7, the agricultural machine is controlled so as to move along a target path that includes a plurality of parallel main paths and one or more turning paths interconnecting the plurality of main path, and if a hailing call is received from the terminal while the agricultural machine is moving along one of the plurality of main paths and if the already-worked area exists between a position of the agricultural machine when receiving the hailing call and the hailing point, the processor is configured or programmed to determine as the travel route a shorter one of: a path that, after going straight along the main path from the position of the agricultural machine, leads toward the hailing point along an outer periphery of the already-worked area; and a path that turns from the position of the agricultural machine toward an opposite side of the already-worked area, goes straight in an opposite direction, and thereafter leads toward the hailing point along the outer periphery of the already-worked area.

Example A9

In the agricultural support system of any of Examples A1 to A8, the terminal is a mobile terminal including a GNSS receiver to transmit a hailing signal including positional information of the mobile terminal as generated by the GNSS receiver to the processor, and the hailing point is a point indicated by the positional information.

Example A10

In the agricultural support system of any of Examples A1 to A8, the terminal is a monitoring computer to remote-monitor the agricultural machine, and, in response to a manipulation by a user using the monitoring computer, transmit to the processor a hailing signal including positional information of the hailing point.

Example A11

In the agricultural support system of any of Examples A1 to A8, the processor is provided in the terminal device.

Example A12

In the agricultural support system of any of Examples A1 to 11, the agricultural machine includes a tractor and an implement linked to the tractor, and the already-worked area is an area in which agricultural work has been performed by the implement.

Example A13

A processing system includes one or more processors, and a memory storing a computer program, wherein the computer program causes the one or more processors to perform: from a terminal device that hails a self-driving agricultural machine to a hailing point, receiving a hailing signal including positional information of the hailing point, or accepting from a user a manipulation of hailing the agricultural machine to the hailing point; and based on the hailing signal or the manipulation by the user, generating a travel route to be taken by the agricultural machine in order to head toward the hailing point in an area excluding an already-worked area of the agricultural machine.

Example A14

A method to be executed by a computer includes, from a terminal device that hails a self-driving agricultural machine to a hailing point, receiving a hailing signal including positional information of the hailing point, or accepting from a user a manipulation of hailing the agricultural machine to the hailing point, and based on the hailing signal or the manipulation by the user, generating a travel route to be taken by the agricultural machine in order to head toward the hailing point in an area excluding an already-worked area of the agricultural machine.

Example B1

An agricultural machine to move while performing agricultural work includes a communicator, and a controller to control the agricultural machine, wherein the controller is configured or programmed to cause the agricultural machine to move along a previously-set first path while causing the agricultural machine to perform the agricultural work, and in response to a hailing call to a hailing point that is located outside an already-worked area in which the agricultural work has been performed by the agricultural machine, the hailing call being received by the communicator from an external device, cause the agricultural machine to move along a second path that, without going through the already-worked area, leads toward the hailing point from a position at which the agricultural machine received the hailing call.

Example B2

In the agricultural machine of Example B1, the hailing call includes positional information indicating the hailing point, and in response to the hailing call, the controller is configured or programmed to determine the second path based on a position of the agricultural machine as identified by a position sensor, the already-worked area as stored in a storage, and the positional information, and cause the agricultural machine to move along the second path.

Example B3

The agricultural machine of Example B1 further includes a position sensor, and a storage to store the first path and the already-worked area, wherein the hailing call includes positional information indicating the hailing point, and the controller is configured or programmed to cause the agricultural machine to move along the first path based on the position of the agricultural machine as identified by the positioning device and the first path as stored in the storage device, and in response to the hailing call, determine the second path based on the position of the agricultural machine as identified by the positioning device, the already-worked area as stored in the storage device, and the positional information indicating the hailing point, and cause the agricultural machine to move along the second path.

Example B4

In the agricultural machine of Example B2 or B3, while causing the agricultural machine to move along the first path, the controller is configured or programmed to cause the already-worked area to be stored to the storage based on the position of the agricultural machine as identified by the position sensor.

Example B5

In the agricultural machine of any of Examples B2 to B4, when receiving a hailing call that includes positional information indicating a hailing point located inside the already-worked area, the controller is configured or programmed to correct a position of the hailing point to a position outside the already-worked area, and determine the second path by regarding the corrected position as the position of the hailing point.

Example B6

In the agricultural machine of Example B5, when correcting the position of the hailing point, the controller is configured or programmed to cause the communicator to transmit information indicating the corrected position to the external device.

Example B7

In the agricultural machine of any of Examples B2 to B6, when receiving the hailing call, if another already-worked area exists in which agricultural work has been performed by another agricultural machine, the controller is configured or programmed to determine the second path so as to lead toward the hailing point without going through the already-worked area or the other already-worked area.

Example B8

In the agricultural machine of Example B1, the second path is determined by the external device or by another device that is connected to the external device via a network, the hailing call includes information indicating the second path, and the controller is configured or programmed to cause the agricultural machine to move in accordance with the information indicating the second path.

Example B9

In the agricultural machine of any of Examples B1 to B8, in response to the hailing call, the controller is configured or programmed to cause the agricultural machine to move along the second path while controlling the agricultural machine to stop the agricultural work.

Example B10

In the agricultural machine of any of Examples B1 to B9, the second path includes a portion of the first path.

Example B11

In the agricultural machine of Example B10, wherein the controller is configured or programmed to cause the agricultural machine to perform the agricultural work in at least a portion of a section in which the agricultural machine is caused to move along the portion of the first path.

Example B12

In the agricultural machine of any of Examples B2 to B7, the controller is configured or programmed to determine whether the already-worked area exists or not between the position of the agricultural machine when receiving the hailing call and the hailing point, and, if the already-worked area does not exist between the position of the agricultural machine and the hailing point, determine as the second path a linear path that leads toward the hailing point.

Example B13

In the agricultural machine of any of Examples B2 to B7, and B12, when the already-worked area exists between the position of the agricultural machine and the hailing point, the controller is configured or programmed to determine as the second path a path that leads toward the hailing point along an outer periphery of the already-worked area.

Example B14

In the agricultural machine of any of Examples B2 to B7, B12, and B13, the first path includes a plurality of parallel main paths and one or more turning paths interconnecting the plurality of main paths, and if the hailing call is received while the agricultural machine is moving along one of the plurality of main paths, the controller is configured or programmed to determine as the second path a path including a portion of the first path that is located in the traveling direction of the agricultural machine from the position of the agricultural machine when receiving the hailing call.

Example B15

In the agricultural machine of any of Examples B2 to B7, and B12 to B14, the first path includes a plurality of parallel main paths and one or more turning paths interconnecting the plurality of main paths, and if the hailing call is received while the agricultural machine is moving along one of the plurality of main paths and if the already-worked area exists between the position of the agricultural machine when receiving the hailing call and the hailing point, the controller is configured or programmed to determine as the second path a shorter one of: a path that, after going straight along the main path from the position, leads toward the hailing point along an outer periphery of the already-worked area; and a path that turns from the position toward an opposite side of the already-worked area, goes straight in an opposite direction, and thereafter leads toward the hailing point along the outer periphery of the already-worked area.

Example B16

In the agricultural machine of any of Examples B2 to B7, and B12 to B15, the first path includes a plurality of parallel main paths and one or more turning paths interconnecting the plurality of main paths, and if the hailing call is received while the agricultural machine is moving along one of the turning paths and if the already-worked area exists between the position of the agricultural machine when receiving the hailing call and the hailing point, the controller is configured or programmed to determine as the second path a shorter one of: a path that, after going straight along a main path that is connected to the turning path, leads toward the hailing point along an outer periphery of the already-worked area; and a path that, after going straight along the main path that is connected to the turning path, turns from the position toward an opposite side of the already-worked area, goes straight in an opposite direction, and thereafter leads toward the hailing point along the outer periphery of the already-worked area.

Example B17

In the agricultural machine of any of Examples B1 to B16, when relative positions of the hailing point and the agricultural machine and an orientation of the agricultural machine satisfy a predetermined condition, the controller is configured or programmed to cause the agricultural machine to move toward the hailing point by traveling backward.

Example B18

In the agricultural machine of any of Examples B1 to B17, the external device is a mobile terminal including a GNSS receiver, the hailing call includes positional information of the mobile terminal as generated by the GNSS receiver, and the positional information indicates a position of the hailing point.

Example B19

In the agricultural machine of any of Examples B1 to B17, the external device is a monitoring terminal to remote monitor the agricultural machine, the hailing call is transmitted in response to a manipulation by a user using the monitoring terminal, and the hailing point is designated by the user.

Example B20

In the agricultural machine of any of Examples B1 to B19, the controller is configured or programmed to cause the agricultural machine to stop agricultural work when causing the agricultural machine to begin moving along the second path in response to the hailing call or while causing the agricultural machine to move along the second path, and cause a position of a stopping point at which the agricultural work was stopped to be stored to the storage device, and after the agricultural machine has been hailed to the hailing point, in response to a return command, cause the agricultural machine to move along a third path that goes back to the stopping point without going through the already-worked area, and causes the agricultural machine to restart the agricultural work from the stopping point.

Example B21

In the agricultural machine of Example B20, wherein the third path is a path that goes in an opposite direction along the second path.

Example B22

In the agricultural machine of any of Examples B1 to B21, if the communicator receives a hailing call to another hailing point distinct from the hailing point while the agricultural machine is moving along the second path, the controller is configured or programmed to cause the agricultural machine to move along a path that leads toward the other hailing point from a position at which the agricultural machine received the other hailing call without going through the already-worked area.

Example B23

In the agricultural machine of any of Examples B1 to 22, the hailing call includes information designating an orientation of the agricultural machine at the hailing point, and the controller is configured or programmed to cause the agricultural machine to stop in the orientation that is indicated by the information.

Example B24

In the agricultural machine of any of Examples B1 to B23, the hailing call includes information of one or more passage points for the second path to go through, and the controller is configured or programmed to head toward the hailing point by going through the one or more passage points.

Example B25

In the agricultural machine of any of Examples B1 to B24, the agricultural machine includes a tractor and an implement linked to the tractor, and the already-worked area is an area in which the agricultural work has been performed by the implement.

Example B26

A device to generate information for use in controlling an agricultural machine that automatically moves while performing agricultural work includes one or more processors, a memory storing a computer program, and a communication circuit to communicate with the agricultural machine, wherein, by executing the computer program, in response to a command from a user who instructs the agricultural machine to move to a hailing point that is located outside an already-worked area in which the agricultural work has been performed by the agricultural machine, while the agricultural machine is moving along a previously-set first path while performing the agricultural work, the one or more processors is configured or programmed to acquire information of the already-worked area from a storage device storing the already-worked area, acquire positional information of the agricultural machine from a positioning device, determine a second path that leads toward the hailing point from a position of the agricultural machine without going through the already-worked area, and output information indicating the second path.

Example B27

In the device of Example B26, the one or more processors is configured or programmed to transmit to a drive device of the agricultural machine a control signal to cause the agricultural machine to move along the second path.

Example B28

In the device of Example B26, the one or more processors is configured or programmed to transmit to the agricultural machine a hailing command including the information indicating the second path.

Example B29

A device to control one or more agricultural machines that automatically move while performing agricultural work includes one or more processors, a memory storing a computer program, and a communication circuit to communicate with the one or more agricultural machines, wherein the one or more processors is configured or programmed to, while the one or more agricultural machines are each moving along a first path that is set therefor while performing the agricultural work, acquire positional information of the agricultural machine from a positioning device, and cause an already-worked area in which the agricultural work has been performed by the one or more agricultural machines to be stored to a storage device based on the positional information, and in response to a command from a user who instructs a designated one of the one or more agricultural machines to move to a hailing point that is located outside the already-worked area, acquire information of the already-worked area from the storage device, acquire positional information of the designated agricultural machine from the positioning device, determine a second path that leads toward the hailing point from a position of the designated agricultural machine without going through the already-worked area, and transmit to the designated agricultural machine a control signal for causing the designated agricultural machine to move along the second path.

Example B30

A method of controlling an agricultural machine that moves while performing agricultural work includes causing the agricultural machine to move along a previously-set first path while causing the agricultural machine to perform the agricultural work, and in response to a hailing call to a hailing point that is located outside an already-worked area in which the agricultural work has been performed by the agricultural machine, the hailing call being transmitted from an external device, causing the agricultural machine to move along a second path that, without going through the already-worked area, leads toward the hailing point from a position at which the agricultural machine received the hailing call.

Example B31

A method of generating information for use in controlling an agricultural machine that automatically moves while performing agricultural work includes, while the agricultural machine is moving along a previously-set first path while performing the agricultural work, in response to a command from a user who instructs the agricultural machine to move to a hailing point that is located outside an already-worked area in which the agricultural work has been performed by the agricultural machine, acquiring information of the already-worked area from a storage device storing the already-worked area, acquiring positional information of the agricultural machine from a positioning device, determining a second path that leads toward the hailing point from a position of the agricultural machine without going through the already-worked area, and outputting information indicating the second path.

Example B32

A method of controlling one or more agricultural machines that automatically move while performing agricultural work includes, while the one or more agricultural machines are each moving along a first path that is set therefor while performing the agricultural work, acquiring positional information of the agricultural machine from a positioning device, and causing an already-worked area in which the agricultural work has been performed by the one or more agricultural machines to be stored to a storage device based on the positional information, and in response to a command from a user who instructs a designated one of the one or more agricultural machines to move to a hailing point that is located outside the already-worked area, acquiring information of the already-worked area from the storage device, acquiring positional information of the designated agricultural machine from the positioning device, determining a second path that leads toward the hailing point from a position of the designated agricultural machine without going through the already-worked area, transmitting to the designated agricultural machine a control signal for causing the designated agricultural machine to move along the second path.

Example B33

A non-transitory computer-readable medium includes a computer program for controlling an agricultural machine that moves while performing agricultural work, the computer program causing a computer to execute causing the agricultural machine to move along a previously-set first path while causing the agricultural machine to perform the agricultural work, and in response to a hailing call to a hailing point that is located outside an already-worked area in which the agricultural work has been performed by the agricultural machine, the hailing call being transmitted from an external device, causing the agricultural machine to move along a second path that, without going through the already-worked area, leads toward the hailing point from a position at which the agricultural machine received the hailing call.

Example B34

A non-transitory computer-readable medium includes a computer program for generating information for use in controlling an agricultural machine that automatically moves while performing agricultural work, the computer program causing a computer to execute, while the agricultural machine is moving along a previously-set first path while performing the agricultural work, in response to a command from a user who instructs the agricultural machine to move to a hailing point that is located outside an already-worked area in which the agricultural work has been performed by the agricultural machine acquiring information of the already-worked area from a storage device storing the already-worked area, acquiring positional information of the agricultural machine from a positioning device, determining a second path that leads toward the hailing point from a position of the agricultural machine without going through the already-worked area, and outputting information indicating the second path.

Example B35

A non-transitory computer-readable medium includes a program for controlling one or more agricultural machines that automatically move while performing agricultural work, the program causing a computer to execute, while the one or more agricultural machines are each moving along a first path that is set therefor while performing the agricultural work, acquiring positional information of the agricultural machine from a positioning device, and causing an already-worked area in which the agricultural work has been performed by the one or more agricultural machines to be stored to a storage device based on the positional information; and in response to a command from a user who instructs a designated one of the one or more agricultural machines to move to a hailing point that is located outside the already-worked area, acquiring information of the already-worked area from the storage device, acquiring positional information of the designated agricultural machine from the positioning device, determining a second path that leads toward the hailing point from a position of the designated agricultural machine without going through the already-worked area, and transmitting to the designated agricultural machine a control signal for causing the designated agricultural machine to move along the second path.

The techniques of the present disclosure are applicable to an agricultural machine, such as a tractor, a harvester, a rice transplanter, a vehicle for crop management, a vegetable transplanter, a mower, a seeder, a spreader, or an agricultural robot, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural support system comprising:
   a controller configured or programmed to control an operation of an agricultural machine so that the agricultural machine moves along a travel route, the agricultural machine being self-driving;
   a storage to store an already-worked area in which agricultural work has been performed by the agricultural machine;
   a terminal to hail the agricultural machine to a hailing point; and
   a processor to generate, based on a positional information of the hailing point and the already-worked area stored in the storage, in an area excluding the already-worked area of the agricultural machine, the travel route for the agricultural machine to head toward the hailing point; wherein
   the terminal is configured to transmit a hailing signal including the positional information of the hailing point to the processor; and the processor is configured or programmed to:
    control the agricultural machine to move along a target path that includes a plurality of parallel main paths and one or more turning paths interconnecting the plurality of parallel main paths; and
    if a hailing call is received from the terminal while the agricultural machine is moving along one of the plurality of parallel main paths and if the already-worked area exists between a position of the agricultural machine when receiving the hailing call and the hailing point, determine as the travel route a shorter one of: (1) a path that, after going straight along the one of the plurality of parallel main paths from the position of the agricultural machine, leads toward the hailing point along an outer periphery of the already-worked area, and (2) a path that turns from the position of the agricultural machine toward an opposite side of the already-worked area, goes straight in an opposite direction, and thereafter leads toward the hailing point along the outer periphery of the already-worked area.

2. The agricultural support system of claim 1, wherein the controller is configured or programmed to cause the agricultural machine to move along the travel route while controlling the agricultural machine to at least partly stop agricultural work.

3. The agricultural support system of claim 1, wherein, while the agricultural machine is moving along the target path, which was previously set, the processor is configured or programmed to determine the already-worked area and cause the already-worked area to be stored to the storage based on a position of the agricultural machine as identified by a position sensor and a working breadth of the agricultural machine.

4. The agricultural support system of claim 1, wherein, when the hailing call is received from the terminal while the agricultural machine is moving along the target path, which was previously set, the processor is configured or programmed to determine as the travel route a path including a portion of the target path that is located in a traveling direction of the agricultural machine.

5. The agricultural support system of claim 1, wherein,
    when the already-worked area does not exist between the position of the agricultural machine when receiving the hailing call from the terminal and the hailing point, the processor is configured or programmed to determine as the travel route a linear path that leads toward the hailing point; and
    when the already-worked area exists between the position of the agricultural machine and the hailing point, the processor is configured or programmed to determine as the travel route a path that leads toward the hailing point along the outer periphery of the already-worked area.

6. The agricultural support system of claim 1, wherein, the terminal includes a mobile terminal including a GNSS receiver to transmit the hailing signal including positional information of the mobile terminal as generated by the GNSS receiver to the processor; and
    the hailing point is a point indicated by the positional information.

7. The agricultural support system of claim 1, wherein the terminal includes a monitoring computer to remote-monitor the agricultural machine, and, in response to a manipulation by a user using the monitoring computer, transmit to the processor the hailing signal including positional information of the hailing point.

8. The agricultural support system of claim 1, wherein the processor is provided in the terminal.

9. The agricultural support system of claim 1, wherein the agricultural machine includes:
    a tractor; and
    an implement linked to the tractor; and
    the already-worked area is an area in which agricultural work has been performed by the implement.

10. A processor system comprising:
    one or more processors; and
    a memory storing a computer program; wherein
    the computer program causes the one or more processors to perform:
        controlling an operation of an agricultural machine so that the agricultural machine moves along a travel route by a controller, the agricultural machine being self-driving;
        storing in a storage an already-worked area in which agricultural work has been performed by the agricultural machine;
        from a terminal that hails the agricultural machine to a hailing point, receiving a hailing signal including positional information of the hailing point, or accepting from a user a manipulation of hailing the agricultural machine to the hailing point; and
        based on the hailing signal or the manipulation by the user, generating the travel route to be taken by the agricultural machine in order to head toward the hailing point in an area excluding the already-worked area of the agricultural machine stored in the storage; wherein
    the controlling the operation of the agricultural machine includes moving the agricultural machine along a target path that includes a plurality of parallel main paths and one or more turning paths interconnecting the plurality of parallel main paths; and
    the generating the travel route includes, if a hailing call is received from the terminal while the agricultural machine is moving along one of the plurality of parallel main paths and if the already-worked area exists between a position of the agricultural machine when receiving the hailing call and the hailing point, determining as the travel route a shorter one of: (1) a path that, after going straight along the one of the plurality of parallel main paths from the position of the agricultural machine, leads toward the hailing point along an outer periphery of the already-worked area, and (2) a path that turns from the position of the agricultural machine toward an opposite side of the already-worked area, goes straight in an opposite direction, and thereafter leads toward the hailing point along the outer periphery of the already-worked area.

11. A method to be executed by a computer, the method comprising:
    controlling an operation of an agricultural machine so that the agricultural machine moves along a travel route by a controller, the agricultural machine being self-driving;
    storing in a storage an already-worked area in which agricultural work has been performed by the agricultural machine;
    from a terminal that hails the agricultural machine to a hailing point, receiving a hailing signal including positional information of the hailing point, or accepting from a user a manipulation of hailing the agricultural machine to the hailing point; and based on the hailing signal or the manipulation by the user, generating the travel route to be taken by the agricultural machine in order to head toward the hailing point in an area excluding the already-worked area of the agricultural machine stored in the storage; wherein the controlling the operation of the agricultural machine includes moving the agricultural machine along a target path that includes a plurality of parallel main paths and one or more turning paths interconnecting the plurality of parallel main paths; and the generating the travel route includes, if a hailing call is received from the terminal while the agricultural machine is moving along one of the plurality of parallel main paths and if the already-worked area exists between a position of the agricultural machine when receiving the hailing call and the hailing point, determining as the travel route a shorter one of: (1) a path that, after going straight along the one of the plurality of parallel main paths from the position of the agricultural machine, leads toward the hailing point along an outer periphery of the already-worked area, and (2) a path that turns from the position of the agricultural machine toward an opposite side of the already-worked area, goes straight in an opposite direction, and thereafter leads toward the hailing point along the outer periphery of the already-worked area.

* * * * *